(12) United States Patent
Harris et al.

(10) Patent No.: US 8,821,994 B2
(45) Date of Patent: *Sep. 2, 2014

(54) LIQUID CRYSTAL DISPLAY HAVING IMPROVED WAVELENGTH DISPERSION CHARACTERISTICS

(75) Inventors: Frank W. Harris, Boca Raton, FL (US); Jiaokai Alexander Jing, Uniontown, OH (US); Ted Calvin Germroth, Kingsport, TN (US); Xiaoliang Joe Zheng, Akron, OH (US); Brian Michael King, Jonesborough, TN (US); Dong Zhang, Uniontown, OH (US); Thauming Kuo, Kingsport, TN (US); Qifeng Zhou, Beijing (CN)

(73) Assignee: Akron Polymer Systems, Akron, OH (US)

( * ) Notice: Subject to any disclaimer, the term of this patent is extended or adjusted under 35 U.S.C. 154(b) by 2130 days.

This patent is subject to a terminal disclaimer.

(21) Appl. No.: 11/731,142

(22) Filed: Mar. 29, 2007

(65) Prior Publication Data

US 2008/0241427 A1    Oct. 2, 2008

(51) Int. Cl.
*C09K 19/00* (2006.01)

(52) U.S. Cl.
USPC .................. 428/1.3; 349/117; 349/118

(58) Field of Classification Search
None
See application file for complete search history.

(56) References Cited

U.S. PATENT DOCUMENTS

| | | |
|---|---|---|
| 5,100,986 A | 3/1992 | Favstritsky et al. |
| 5,119,221 A | 6/1992 | Nakajima et al. |
| 5,189,538 A | 2/1993 | Arakawa |
| 5,213,852 A | 5/1993 | Arakawa et al. |
| 5,290,887 A | 3/1994 | Hefner et al. |
| 5,387,657 A | 2/1995 | Hefner et al. |
| 5,529,818 A | 6/1996 | Tsuda et al. |
| 6,115,095 A | 9/2000 | Suzuki et al. |
| 6,175,400 B1 | 1/2001 | Duncan et al. |
| 7,037,443 B2 | 5/2006 | Shuto et al. |
| 7,135,211 B2 | 11/2006 | Shuto et al. |
| 7,227,602 B2 | 6/2007 | Jeon et al. |
| 7,236,221 B2 | 6/2007 | Ishikawa et al. |
| 7,391,935 B2 | 6/2008 | Kawahara et al. |
| 2004/0051831 A1* | 3/2004 | Su Yu et al. ................. 349/117 |

(Continued)

FOREIGN PATENT DOCUMENTS

| | | |
|---|---|---|
| EP | 1 506 991 | 2/2005 |
| JP | 2005-242360 A | 9/2005 |

(Continued)

OTHER PUBLICATIONS

Chai et al. Synthesis and Characterization of Mesogen-jacketed Liquid Crytalline Polymer Containing 1,3,4-Oxadiazole. Gaofenzi Xuebao, 2006 (3), 532-535.*

(Continued)

*Primary Examiner* — J. L. Yang
(74) *Attorney, Agent, or Firm* — Kenyon & Kenyon LLP

(57) ABSTRACT

A multilayer optical retardation compensation film having at least one positive C-plate and at least one negative C-plate is used in an LCD device. The multilayer film may have a substantially flat wavelength dispersion curve, or the multilayer film combined with other layers in the LCD device may have a substantially flat wavelength dispersion curve. Polymer films for the positive C-plate may be identified according to their absorbance maxima at certain wavelength ranges.

26 Claims, 21 Drawing Sheets

(56) References Cited

U.S. PATENT DOCUMENTS

| | | | |
|---|---|---|---|
| 2004/0242823 | A1 | 12/2004 | Sekiguchi et al. |
| 2005/0057714 | A1* | 3/2005 | Jeon et al. .................. 349/122 |
| 2005/0190327 | A1 | 9/2005 | Lin et al. |
| 2005/0200792 | A1 | 9/2005 | Jeon et al. |
| 2005/0270458 | A1 | 12/2005 | Ishikawa et al. |
| 2006/0097224 | A1* | 5/2006 | Hanelt et al. ............. 252/299.01 |
| 2006/0114383 | A1 | 6/2006 | Kobayashi et al. |
| 2007/0160828 | A1 | 7/2007 | Iyama |
| 2007/0206140 | A1 | 9/2007 | Ting et al. |
| 2007/0279553 | A1 | 12/2007 | Yoda et al. |
| 2009/0002606 | A1 | 1/2009 | Tomonaga et al. |
| 2009/0185121 | A9* | 7/2009 | Suemasu et al. .............. 349/117 |

FOREIGN PATENT DOCUMENTS

| | | |
|---|---|---|
| JP | 2006-178401 A2 | 7/2006 |
| JP | 2006-194923 A | 7/2006 |
| JP | 2006-201502 A | 8/2006 |
| JP | 2006-221116 A | 8/2006 |
| JP | 2006-527394 A3 | 11/2006 |
| JP | 2007046059 A | 2/2007 |
| WO | WO-2005121880 A1 | 12/2005 |
| WO | WO-2008023668 A1 | 2/2008 |

OTHER PUBLICATIONS

International Search Report dated Jan. 22, 2009 issued in corresponding PCT Application No. PCT/US2008/057795.

Zhang et al., "Synthesis of a New Side-Chain Type Liquid Crystal Polymer Poly[dicyclohexyl vinylterephtalate]" Macromolecules, ACS, Washington, DC, US, vol. 32, Jan. 1, 1999,pp. 4494-4496, XP002495422, ISSN: 0024-9297.

Zhao et al., "Synthesis and characterization of diblock copolymers based on crystallizable poly($\epsilon$-caprolactone) and mesogen-jacketed liquid crystalline polymer block" Polymer, Elsevier Science Publishers B.V, GB, vol. 46, No. 14, Jun. 27, 2005, pp. 5396-5405, XP004924379, ISSN: 0032-3861.

Database WPI Week 199238, Thomson Scientific, London, GB; AN 1992-311534, XP002493166.

Database WPI Week 200728, Thomson Scientific, London, GB; AN 2007-286791, XP002494611.

Zhang D et al. "Mesogen-Jacketed Liquid Crystal Polymers with Mesogens of Aromatic Amide Structure" Polymers for Advanced Technologies, Wiley & Sons, Bognor Regis, GB, vol. 8, No. 4, Apr. 1, 1997, pp. 227-233, XP000691535.

Li et al. "Hierarchical Assembly of a Series of Rod-Coil Block Copolymers: Supramolecular LC Phase in Nanoenviroment", Macromolecules 2004, 37, 2854-2860.

Luo et al. "Conduction mechanism in a novel oxadiazole derivative: effects of temperature and hydrostatic pressure", J. Phys. D: Appl. Phys. 38 (2005) 1132-1135. IOP Publishing Ltd Printed in the UK.

Chai et al. "Synthesis and characterization of mesogen-jacketed liquid crystalline polymer containing 1,3,4-oxadiazole", Gaofenzi Xuebao 2006(3) 532-535.

Tenneti et al. "Perforated Layer Structures in Liquid Crystalline Rod-Coil Block Copolymers" J. Am. Chem. Soc. 2005, 127, pp. 15481-15490.

Zhang et al. "Synthesis and characterization of novel rod—coil diblock copolymers of poly(methyl methacrylate) and liquid crystalline segments of poly(2,5-bis[(4-methoxyphenyl)oxycarbonyl]styrene)", Polym Int 52:92-97 (2003).

Ye et al. "Molecular Weight Dependence of Phase Structures and Transitions of Mesogen-Jacketed Liquid Crystalline Polymers Based on 2-Vinylterephthalic Acids" Macromolecules 2004, 37, 7188-7196.

Wan et al. ""Living" Free Radical Synthesis of a Novel Rodcoil Diblock Copolymers With Polystyrene and Mesogen-Jacketed Liquid Crystal Polymer Segments" Chinese Journal of Polymer Science, (1998) vol. 16 No. 4.

Chen et al. "Design, Synthesis, and Characterization of Bent-Core Mesogen-Jacketed Liquid Crystalline Polymers" Macromolecules 2006, 39, 517-527.

* cited by examiner

D = 2.51 Å

R = 6.7 Å
R = 2*cos30°*($d_{C-C}$+$d_{C-H}$)+2*$r_H$
  = 2*0.866*(1.4+1.1)+2*1.2 = 6.7 (Å)

R/D = 6.7/2.51 = 2.7

11a      11b

D = 2.51 Å      R = 7.9 Å

R/D = 7.9/2.51 = 3.2

11c      11d

D = 2.51 Å

11e

R = 9.1 Å

R/D = 9.1/2.51 = 3.6

11f

D = 2.51 Å

11g

R = 10.3 Å

R/D = 10.3/2.51 = 4.1

11h

(a)

• represents end view of backbone (b)

LIQUID CRYSTAL DISPLAY HAVING IMPROVED WAVELENGTH DISPERSION CHARACTERISTICS

FIELD OF THE INVENTION

The invention relates to optical compensation films for use in a liquid crystal display ("LCD") devices, optical switches and waveguides where a controlled light management is desired. The LCD is more particularly a vertically-aligned-LCD ("VA-LCD"). The invention further relates to multilayer optical compensation films with reversed or substantially flat wavelength dispersion curves and LCD devices with substantially flat wavelength dispersion curves.

BACKGROUND OF THE INVENTION

It is known in the art of LCD compensation that the phase retardation of light varies according to wavelength ($\lambda$), causing color shift. This wavelength dependence (or dispersion) characteristic of the compensation film may be taken into account when designing an LCD device so that color shift is reduced. Wavelength dispersion curves are defined as "proper" or "reversed" with respect to ga compensation film with positive or negative retardation. A compensation film with positive retardance (positive C-plate) has a proper curve in which the value of phase retardation is increasingly positive toward shorter wavelengths, and a reversed curve in which the value of phase retardation is decreasingly positive toward shorter wavelengths. A compensation film with negative retardance (negative C-plate) has a proper curve in which the value of phase retardation is increasingly negative toward shorter wavelengths, and a reversed curve in which the value of phase retardation is decreasingly negative toward shorter wavelengths. Exemplary shapes of these curves are shown in FIG. 1.

In the dark (off) state, vertically aligned (VA) LC cells have a wavelength dispersion curve similar to a proper curve for positive retardation. Since there is basically no light passing through the display in the dark state, VA-LC cells only require compensation for retardation and not for dispersion. Accordingly, VA-LC cells are typically compensated by a negative C-plate to prevent light leakage and improve the contrast of the image. On the other hand, in the lighted (on) state, the VA-LC cell has a wavelength dispersion curve similar to a proper curve for negative retardation, which leads to color distortion due to wavelength dispersion of its proper retardation curve. Thus, VA-LC cells in the lighted state require compensation for both retardation and dispersion. Accordingly, a positive C-plate may be used to compensate color distortion in the lighted state.

Negative C-plates, such as polyimide, have a negative birefringence value throughout the wavelength range of 400 nm<$\lambda$<800 nm. Negative C-plates typically have a proper wavelength dispersion curve with increasingly large negative retardation value toward shorter wavelengths. As such, negative C-plates can compensate for the dark (off) VA-LC cell's retardation to reduce the light leakage and thus increase the image contrast. However, negative C-plates with proper wavelength dispersion do not compensate for the lighted VA-LC cell's retardation or dispersion, and, as such, color shift and poor image quality are not alleviated at those shorter wavelengths and may even increase dispersion in the lighted (on) state. Thus, traditional negative C-plates that have a proper dispersion curve alone typically do not have the required wavelength dispersion characteristic to eliminate color shift, especially at shorter wavelengths.

Multilayer compensation films have been proposed to compensate for VA-LCDs. U.S. Patent Application No. 2005/0057714 discloses a complex light compensation C-plate with at least two C-plates having different dispersion ratios.

When both the dark and lighted states are taken into consideration, a compensation film with negative retardation and a reversed wavelength dispersion curve may provide the best compensation for a VA-LC cell. Accordingly, there remains a need in the LCD industry for an improved optical compensation film having retardance and wavelength dispersion characteristics that improve both light leakage in the dark state and color distortion in the lighted state of VA-LCD devices.

SUMMARY OF THE INVENTION

In a first embodiment of the invention there is provided an optical retardation compensation film (positive C-plate) having a proper wavelength dispersion curve wherein $R_{450}/R_{550}$ is about 1.20 to about 2.00, $R_{550}/R_{650}$ is about 1.10 to about 1.60, and $R_{650}/R_{750}$ is about 1.04 to about 1.40, wherein $R_{450}$, $R_{550}$, $R_{650}$ and $R_{750}$ are the retardation values in the thickness direction of the optical compensation film at the wavelengths 450 nm, 550 nm, 650 nm, and 750 nm, respectively; wherein the optical film has a positive birefringence value throughout the wavelength range of 400 nm<$\lambda$<800 nm. In another embodiment, the optical retardation compensation film may have $R_{450}/R_{550}$ is about 1.30 to about 1.80, $R_{550}/R_{650}$ is about 1.13 to about 1.50 and $R_{650}/R_{750}$ is about 1.06 to about 1.35. In another embodiment, the optical retardation compensation film may have $R_{450}/R_{550}$ is about 1.35 to about 1.70, $R_{550}/R_{650}$ is about 1.15 to about 1.45 and $R_{650}/R_{750}$ is about 1.07 to about 1.30.

In one embodiment of the invention, the optical retardation compensation film has a positive birefringence value of greater than about 0.002, or about 0.005, or about 0.01, or about 0.015, or about 0.02, or about 0.025, or about 0.03 throughout the wavelength range of 400 nm<$\lambda$<800 nm. In another embodiment, the optical retardation compensation film has a UV absorption maximum between the wavelength range of about 260 nm and about 380 nm. In another embodiment, the UV absorption maximum is between the wavelength range of about 280 nm and about 360 nm. n another embodiment, the UV absorption maximum is between the wavelength range of about 300 nm and about 350 nm.

In another embodiment, the optical retardation compensation film is cast from a solution having a polymer composition having a polymer segment with a polymer backbone, a light stable optically anisotropic sub-unit (OASU) attached directly to the polymer backbone via at least one covalent bond, wherein the OASU is oriented perpendicular to the polymer backbone, and the higher the perpendicularity of the OASUs, the larger the value of the positive birefringence of the polymer film. The polymer composition may be a mesogen-jacketed polymer composition having at least one or more moieties such as:

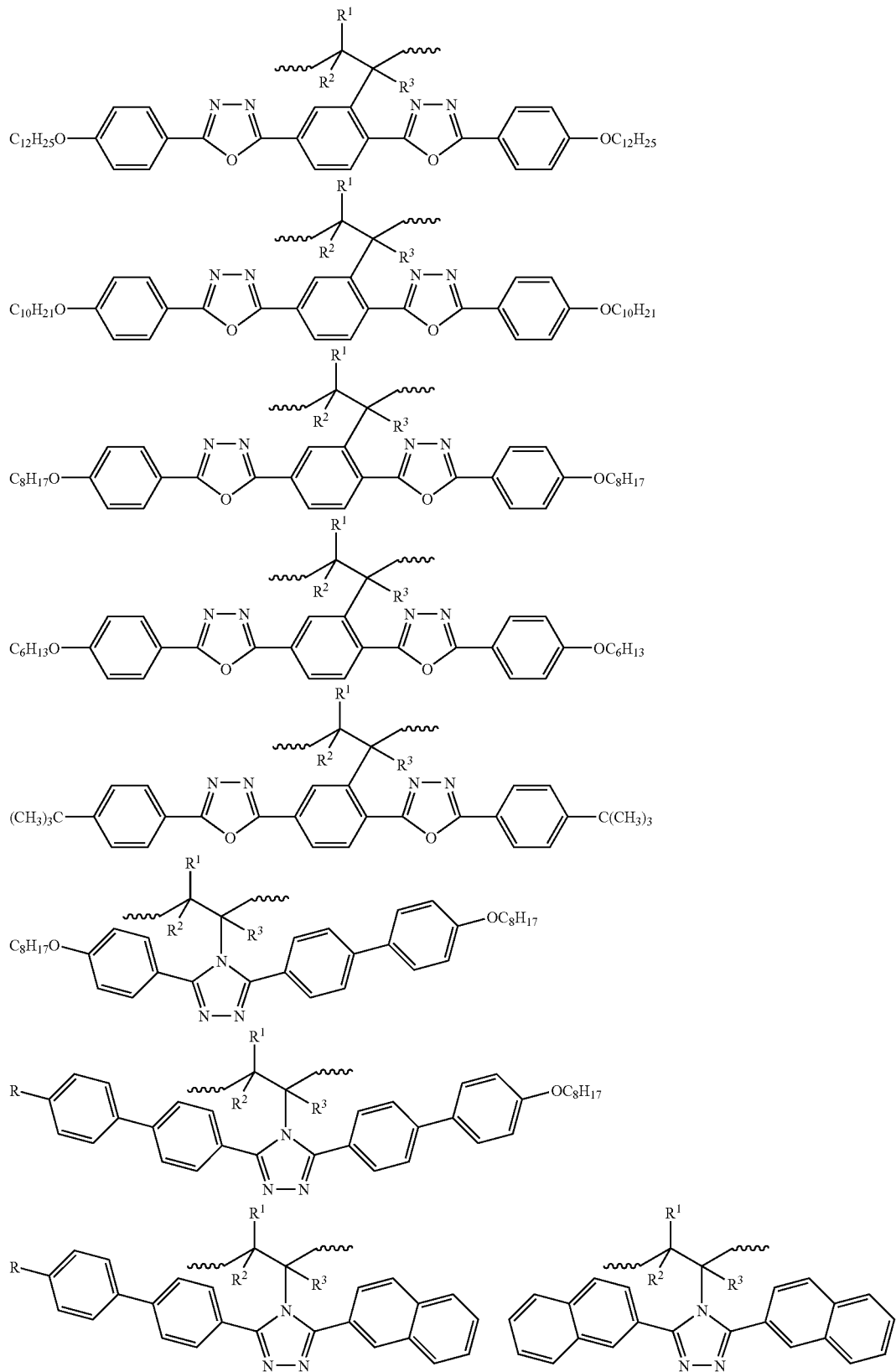
wherein $R^1$, $R^2$, and $R^3$ are hydrogen atoms, alkyl groups, substituted alkyl groups, or halogens.
In another embodiment, the compensation film has at least one or more moieties such as:

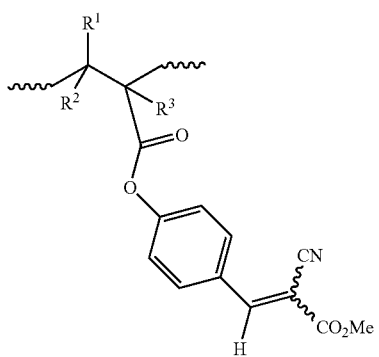

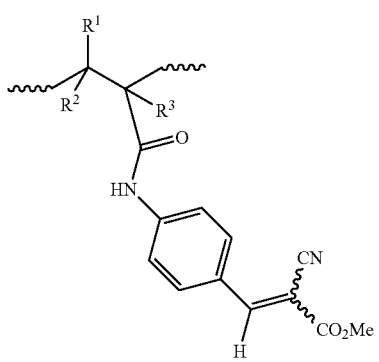

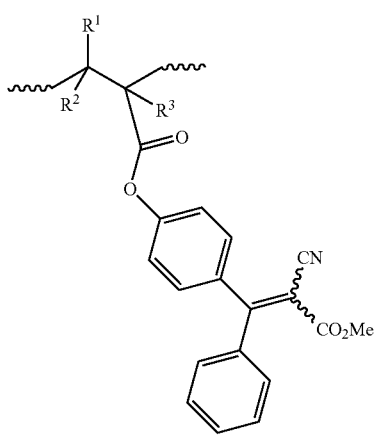

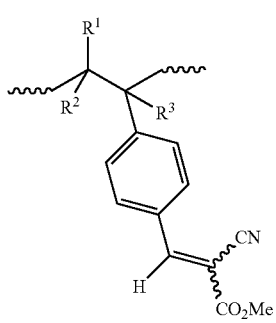

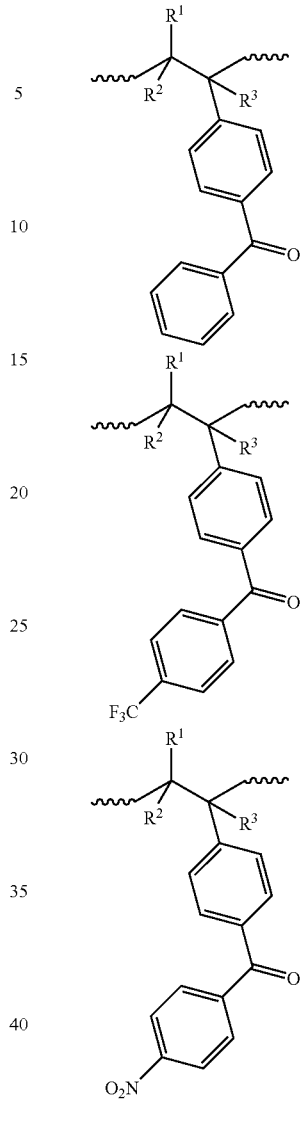

wherein $R^1$, $R^2$, and $R^3$ are hydrogen atoms, alkyl groups, substituted alkyl groups, or halogens.

In one embodiment of the invention, the multilayer optical retardation compensation film is used in a liquid crystal display device (LCD). In another embodiment, the LCD may be a screen for a television or computer.

In a second embodiment of the invention there is provided a multilayer optical retardation compensation film for use in a vertically aligned liquid crystal display device (VA-LCD) having at least one first layer of the optical retardation compensation film of claim 1 (positive C-plate) and at least one second layer of optically anisotropic film having negative out-of-plane birefringence that satisfies the relation $n_z<(n_x+n_y)/2$ (negative C-plate), wherein $n_x$ and $n_y$ represent in-plane refractive indices, and $n_z$ represents the thickness-direction refractive index of the film, and wherein the wavelength dispersion curve of the multilayer optical film has a negative retardation and a reversed wavelength dispersion curve throughout the wavelength range of 400 nm<$\lambda$<800 nm. The first and second layers may be contiguous, or there may be an intermediate layer between the first and second layers.

In another embodiment, this multilayer optical retardation compensation film may be used in a VA-LCD device, which may be used as a screen for a television or computer. In another embodiment, the multilayer optical retardation compensation film in combination with the lighted state VA-LCD's LC cell has a retardance ratio, $R_\lambda/R_{550}$, between 0.90 and 1.15 at each wavelength $\lambda$ throughout the wavelength range of 400 nm<$\lambda$<800 nm, wherein $R_\lambda$ and $R_{550}$ are the retardances in the thickness direction of the LCD at the wavelengths $\lambda$ and 550 nm, respectively. More preferably, the retardance ratio is between 0.93 and 1.10 at each wavelength throughout the wavelength range of 400 nm<$\lambda$<800 nm. Even more preferably, the retardance ratio is between 0.95 and 1.05 at each wavelength throughout the wavelength range of 400 nm<$\lambda$<800 nm. Most preferably, the wavelength dispersion curve of the multilayer optical retardation compensation film in combination with the lighted state VA-LCD's LC cell has about zero retardance throughout the wavelength range of 400 nm<$\lambda$<800 nm.

In a third embodiment of the invention, there is provided a multilayer optical retardation compensation film for use in a vertically aligned liquid crystal display (VA-LCD) device having at least one first layer of optically anisotropic film having positive out-of-plane birefringence that satisfies the relation $n_z>(n_x+n_y)/2$ (positive C-plate); and at least one second layer of optically anisotropic film having negative out-of-plane birefringence that satisfies the relation $n_z<(n_x+n_y)/2$ (negative C-plate), wherein $n_x$ and $n_y$ represent in-plane refractive indices, and $n_z$ represents the thickness-direction refractive index of the film, and wherein the wavelength dispersion curve of the multilayer optical film has a negative retardation and a retardance ratio, $R_\lambda R_{550}$, between 0.90 and 1.15 at each wavelength $\lambda$ throughout the wavelength range of 400 nm<$\lambda$<800 nm, wherein $R_\lambda$ and $R_{550}$ are the retardances in the thickness direction of the LCD at the wavelengths $\lambda$ and 550 nm, respectively. More preferably, the retardance ratio is between 0.93 and 1.10 at each wavelength throughout the wavelength range of 400 nm<$\lambda$<800 nm. Even more preferably, the retardance ratio is between 0.95 and 1.05 at each wavelength throughout the wavelength range of 400 nm<$\lambda$<800 nm. Most preferably, the retardance ratio is about 1 at each wavelength throughout the wavelength range of 400 nm<$\lambda$<800 nm.

In another embodiment of the invention, the first and second layers of the multilayer optical compensation film are contiguous. In another embodiment, there is an intermediate layer between the first and second layers. In yet another embodiment, the multilayer optical retardation compensation film is used in an LCD, which may be used as a screen for a television or computer. The LCD device may have additional compensation plates.

In one embodiment, the positive C-plate used in the multilayer optical retardation compensation film has positive out-of-plane birefringence of at least about 0.002, about 0.005, about 0.01, about 0.015, about 0.02, about 0.025, or about 0.03 throughout the wavelength range of 400 nm<$\lambda$<800 nm.

In another embodiment, the positive C-plate of the multilayer optical retardation compensation film is cast from a solution having a polymer composition with at least one or more moieties such as:

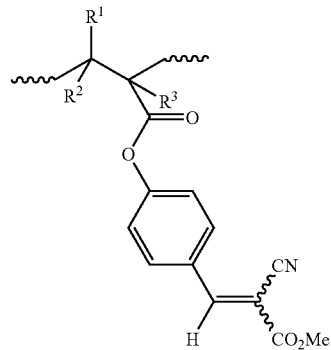

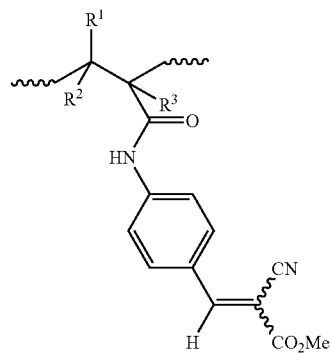

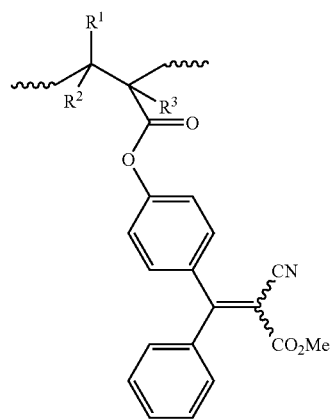

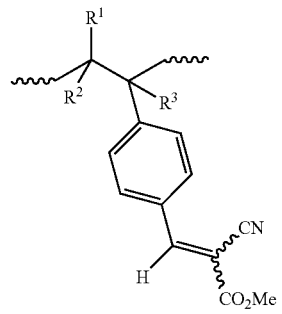 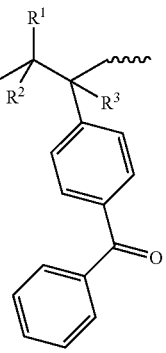

-continued

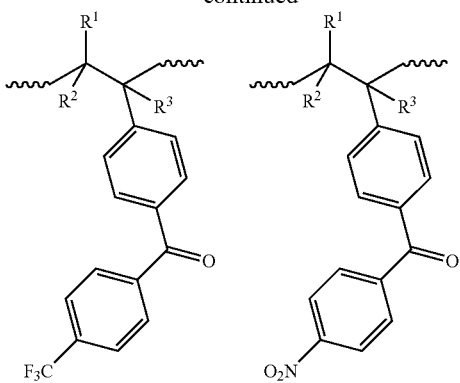

wherein $R^1$, $R^2$, and $R^3$ are hydrogen atoms, alkyl groups, substituted alkyl groups, or halogens.

In another embodiment, the positive C-plate of the multi-layer optical retardation compensation film is cast from a solution comprising a polymer composition having a polymer segment with a polymer backbone, a light stable optically anisotropic sub-unit (OASU) attached directly to the polymer backbone via at least one rigid covalent bond, wherein the OASU is oriented perpendicular to the polymer backbone, and the higher the perpendicularity of the mesogens, the larger the value of the positive birefringence of the polymer film. In one embodiment, the OASU is an Ar-BES and the degree of substitution is greater than 0.7. In another embodiment, the polymer composition is poly(nitrostyrene) or poly(bromostyrene). In another embodiment, the OASU is a mesogen. Such a mesogen-jacketed polymer composition may have at least one or more moieties such as:

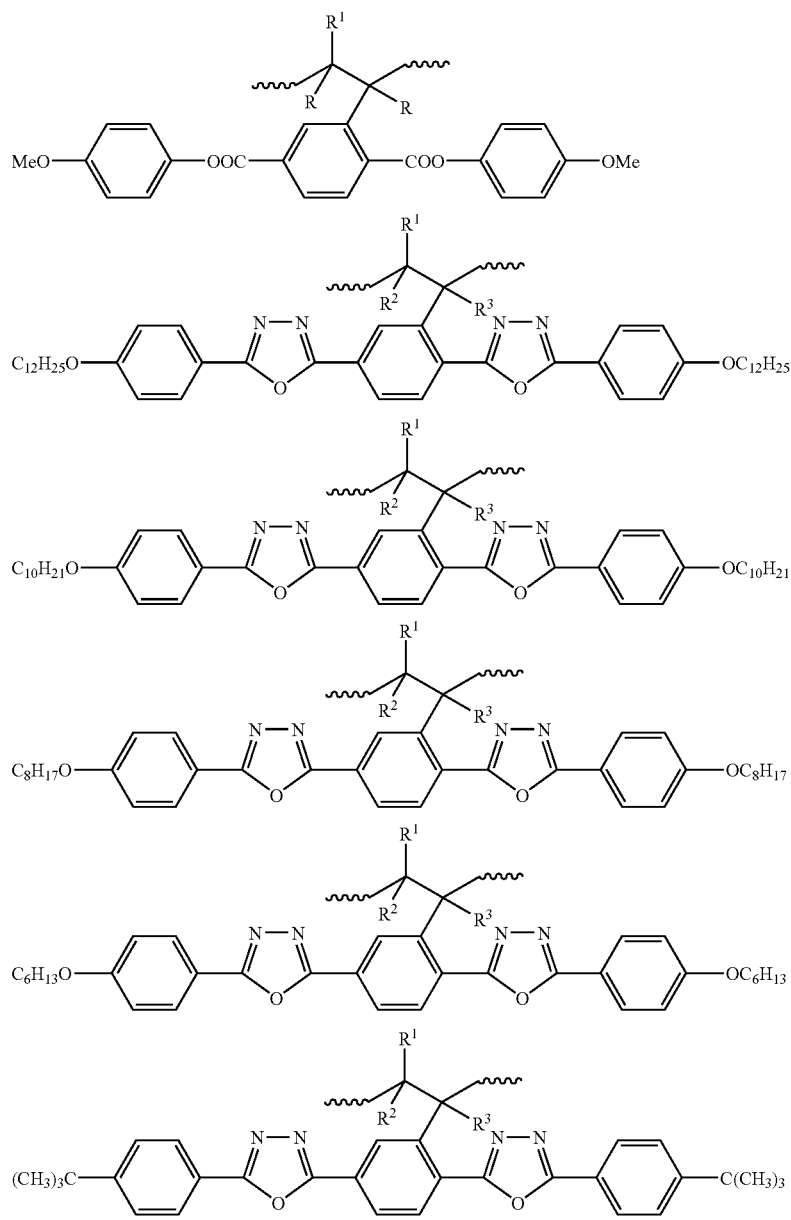

wherein $R^1$, $R^2$, and $R^3$ are hydrogen atoms, alkyl groups, substituted alkyl groups, or halogens.

DESCRIPTION OF THE DRAWINGS

FIGS. 11a and 11b depict the OASU of polystyrene FIGS. 11c-11d depict the disk OASU of, poly(2-vinyl naphthalene). FIGS. 11e-11f depict the disk OASU of poly(1-vinyl naphthalene). FIGS. 11g-11h depict the disk OASU of poly(vinylpyrene). FIG. 11i depicts the mesogen OASU, of poly[2,5-bis(p-alkoxyphenyl)styrene].

DETAILED DESCRIPTION OF THE INVENTION

Figure 1:
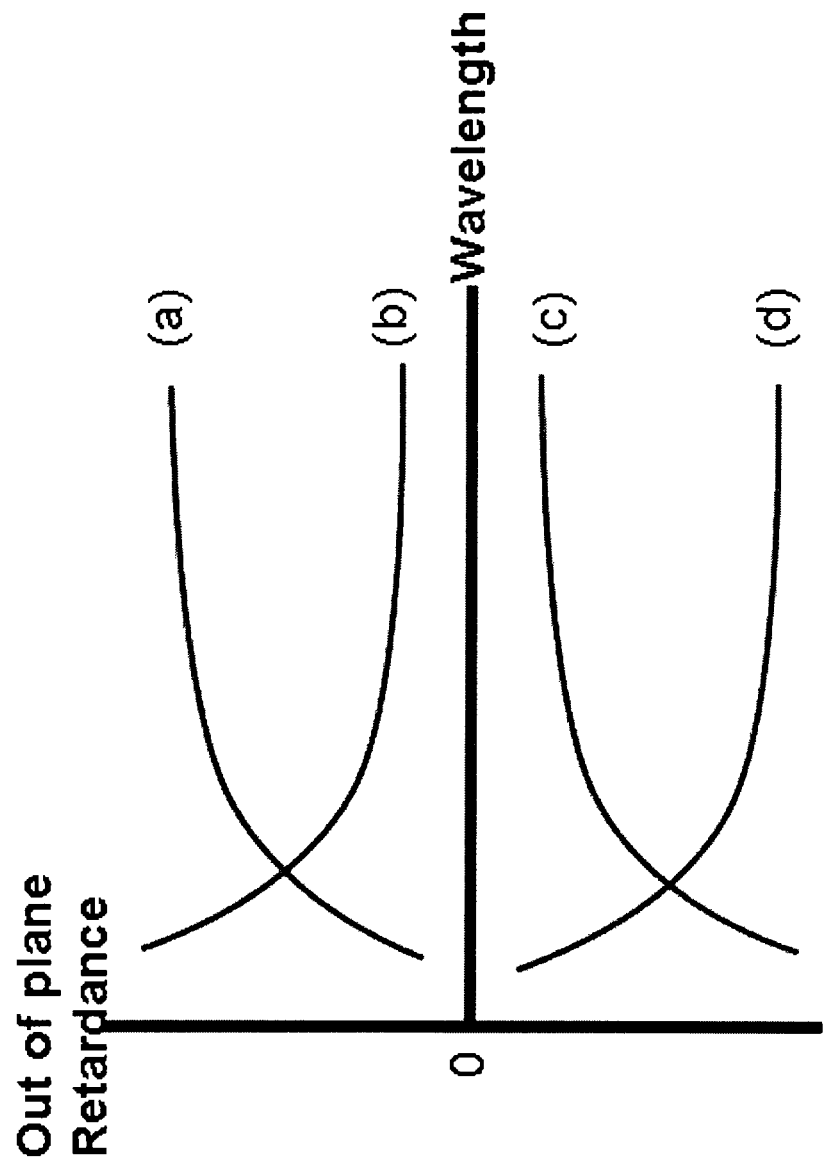
FIG. 1 is a graph depicting the shapes of exemplary wavelength dispersion curves for: (a) a reversed curve for positive retardation, (b) a proper curve for positive retardation, (c) a proper curve for negative retardation and (d) a reversed curve for negative retardation.

An object of the invention is to compensate for the wavelength dispersion (phase retardation) characteristic of light passing through an LC cell such that color variation is minimized and image quality is improved over a range of viewing angles. The LCD device is preferably a VA-LCD.

Compensation may be achieved via a multilayer optical retardation compensation film with at least one layer of optically anisotropic film having positive birefringence and satisfying the relation of $n_z > (n_x + n_y)/2$ (positive C-plate) and at least one layer of optically anisotropic film satisfying the relation of $n_z < (n_x + n_y)/2$ (negative C-plate), wherein $n_x$ and $n_y$ represent in-plane refractive indices, and $n_z$ represents the thickness-direction (out-of-plane) refractive index of the film. The multilayer film's layers may be in direct contact with each other (contiguous), or there may be one or more layer between them. The multilayer film is preferably used in an LCD device to compensate the LC cell. The multilayer film may additionally compensate for the dispersion of other layers in an LCD device, such as X-plates or A-plates, O-plates, TAC (triacetyl cellulose) films, or polarizer films, as well as the LC cell.

The multilayer film preferably may have an overall negative retardance and birefringence to compensate for the positive retardance of the VA-LC cell in the dark state. An overall negative retardance may be achieved by combining a positive C-plate with a negative C-plate with high negative birefringence or with a thick negative C-plate. Out-of-plane phase retardation of an optical compensation film is defined as $d \times \Delta n$, wherein d is the thickness of the film and $\Delta n$ is the birefringence of the film in the thickness direction. The overall retardance $R_{total}$ of the multilayer retardation film is basically the sum of the retardance of each individual layer.

$$R_{total} = \sum_i \Delta n_i \times d_i \qquad (1)$$

where $\Delta n_i$, and $d_i$ are the out of plane birefringence and the thickness of the ith layer, respectively. Therefore, by controlling the thickness of individual layers and choosing different birefringent films, a desired retardation may be achieved. Accordingly, when the positive C-plate has a positive birefringence satisfying the relation of $n_z > (n_x + n_y)/2$, a desired retardation value for the positive C-plate may be obtained by adjusting the positive C-plate's film thickness. Thus, negative out-of-plane retardance may be achieved, for example, by a thin negative C-plate with high negative birefringence or a thick negative C-plate with low negative birefringence. Similarly, negative retardance may be achieved for a multilayer film when the negative retardance of the negative C-plate is larger than the positive retardance of the positive C-plate. Negative retardance of the negative C-plate may also be enhanced by increasing its film thickness.

In a first example embodiment, the multilayer film has a substantially flat wavelength dispersion curve. The degree of flatness of a wavelength dispersion curve may be determined by reference to its retardance ratio, $R_\lambda/R_{550}$, wherein $R_\lambda$ and $R_{550}$ are the out-of-plane retardances of the film at wavelengths $\lambda$ and 550, respectively. $R_\lambda$ is a wavelength with a range of wavelengths. The wavelength range for measuring retardance ratios is preferably 400 nm to 800 nm. Retardance ratios for a wavelength dispersion curve may be determined when the curve has positive retardation throughout the measured wavelength range, or when the curve has negative retardation throughout the measured wavelength range. Preferably, the curve has negative retardation. A wavelength dispersion curve is substantially flat when all retardance ratios within the wavelength range are between 0.9 and 1.15. Preferably, a wavelength dispersion curve may have all retardance ratios between 0.93 and 1.10 within the wavelength range. More preferably, a wavelength dispersion curve may have all retardance ratios between 0.95 and 1.05 within the wavelength range. Most preferably, the wavelength dispersion curve has a retardance ratio of about one.

Figure 2:
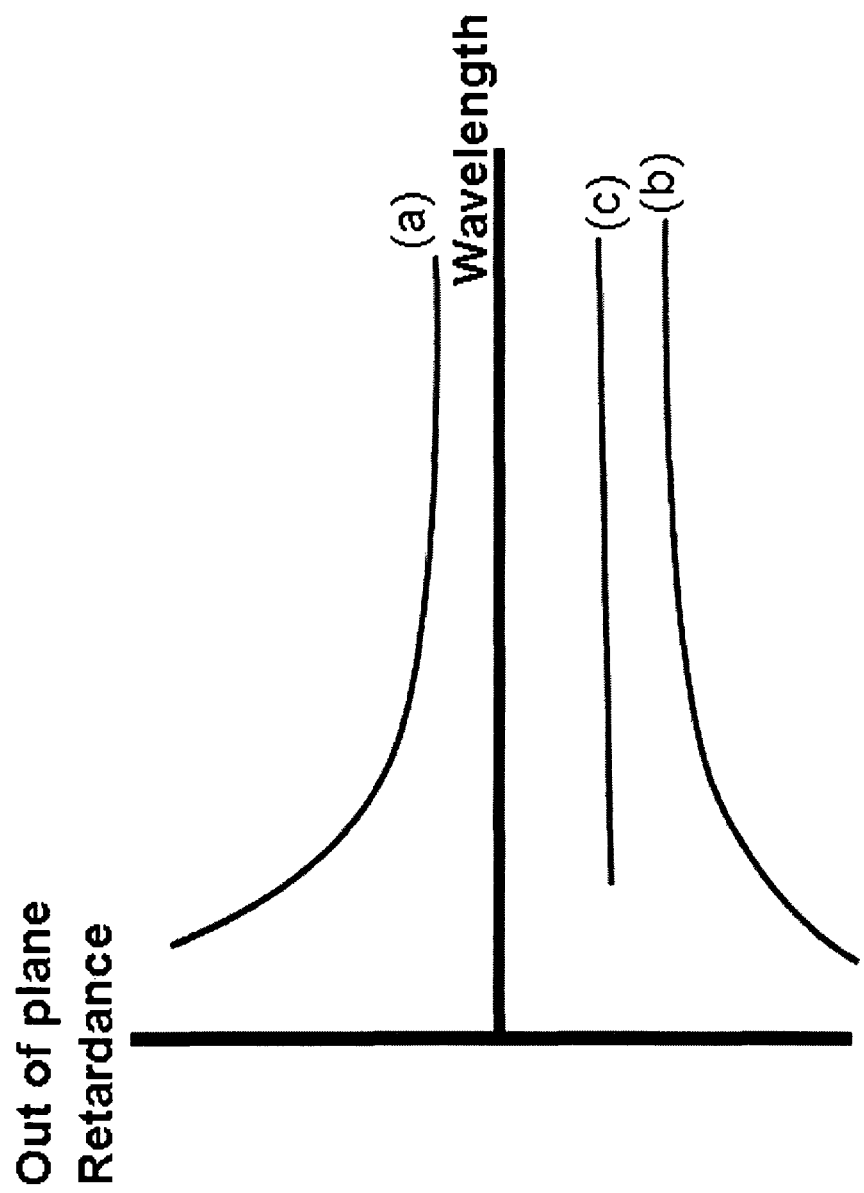
FIG. 2 is a graph depicting the exemplary shapes of the wavelength dispersion curves of (a) the proper curve of a positive C-plate, (b) the proper curve of a negative C-plate and (c) the combined curve of the multilayer film.

A multilayer film may have a substantially flat wavelength dispersion curve when the wavelength dispersion curve of a positive C-plate is an approximate reflection of the wavelength dispersion curve of a negative C-plate across a line parallel to the x-axis of a retardance vs. wavelength graph such that their superimposition results in a substantially flat overall curve, as shown in FIG. 2. The parallel line may be y=k, where k is a negative constant so that the combined positive and negative C-plates will result in a multilayer film with an overall negative retardance. As one of ordinary skill in the art will recognize, the shapes of positive C-plates' wavelength dispersion curves—and thus the composition of the positive C-plates themselves—for this embodiment may vary widely because they are selected according to how closely the reflection of their shape correlates to the shape of the wavelength dispersion curve of a negative C-plate. Accordingly, suitability of a positive C-plate in the multilayer film depends on the shape of the wavelength dispersion curve of the negative C-plate in the multilayer film. As such, positive C-plates with wavelength dispersion curves of varying shapes are contemplated for use in the multilayer film.

Figure 10:
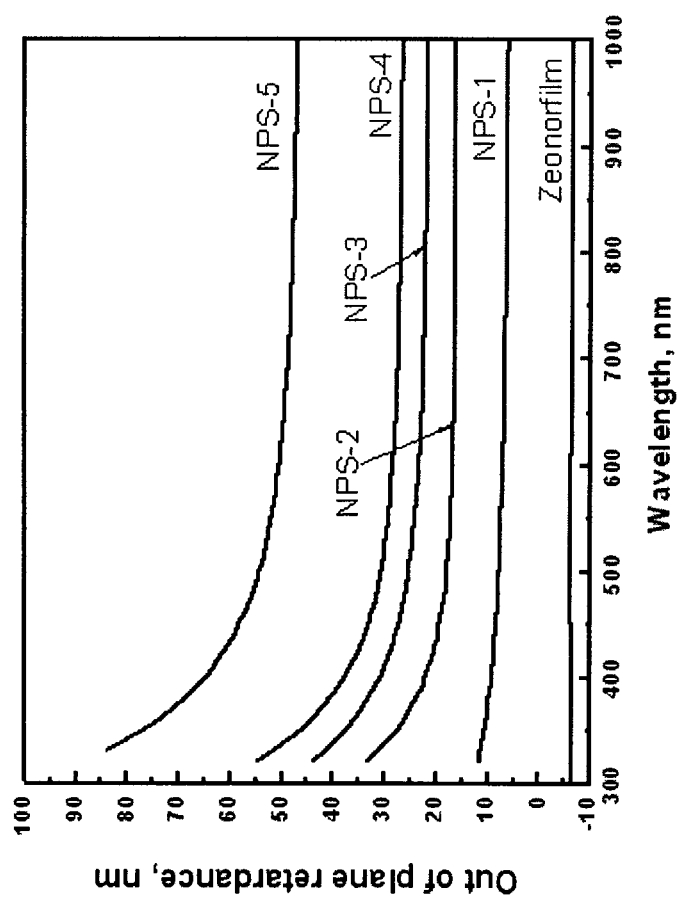
FIG. 10 is a graph of the wavelength dispersion curves for poly(nitrostyrene) positive C-plates with different degrees of substitution

In one example embodiment of a multilayer film with a substantially flat wavelength dispersion curve, the positive C-plate is poly(nitrostyrene). Depending on the number of nitro groups with which the poly(nitrostyrene) moieties are substituted (degree of substitution), the wavelength dispersion curve for the positive C-plate may have similar steepness but different retardation value, as shown in FIG. 10. Poly(nitrostyrene) with more nitro substituents and a higher degree of substitution may be used to compensate negative C-plates when a thin positive C-plate is desired because higher degrees of substitution on poly(nitrostyrene) yield higher birefringence. Poly(nitrostyrene) with fewer nitro substituents and a lower degree of substitution may be used when solubility in common solvents is needed for film casting because poly(nitrostyrene) with fewer nitro substituents has better solubility in solvents that are commonly used for film casting, which are known to one of ordinary skill in the art. Again, one skilled in the art will understand that the positive C-plate of the multilayer film is selected according to the wavelength dispersion curve of the negative C-plate such that the shapes of the two plates' curves are approximate reflections across a line parallel to x-axis of a retardance vs. wavelength graph. The parallel line may be y=k, where k is a negative constant so that the combined positive and negative C-plates will result in a multilayer film with an overall negative retardance.

Wavelength dispersion curves of compensation films may be determined by measuring the dispersion of the multilayer film over a range of wavelengths from about 400 nm to about 800 nm with a spectrometer.

Figure 3:
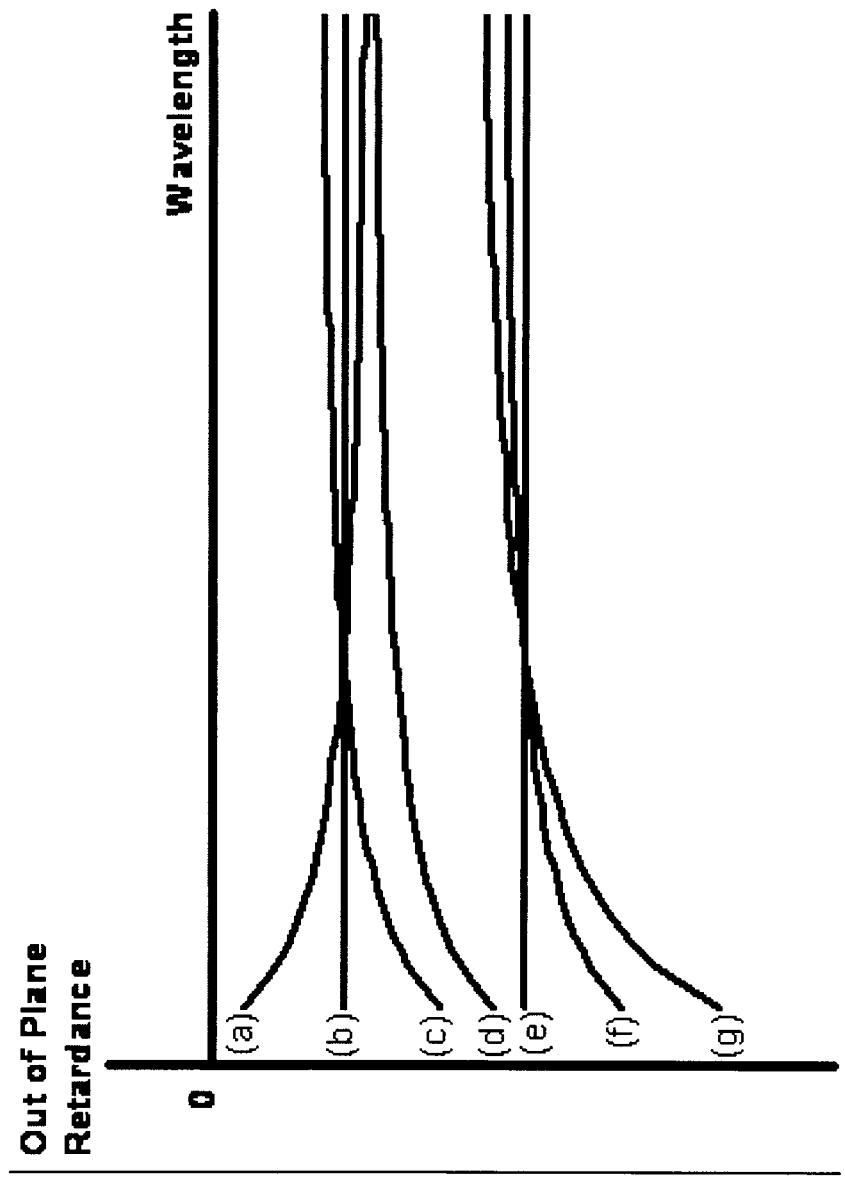
FIG. 3 is a graph depicting (a) an overall negative multilayer film's reversed wavelength dispersion curve; (b) an overall negative multilayer film's flat wavelength dispersion curve; (c) an overall negative multilayer film's proper wavelength dispersion curve; (d) a lighted state LC cell's wavelength dispersion curve; (e) a compensated LCD device's flat wavelength dispersion curve at lighted state that results from the combination of (a) and (d); (f) a compensated LCD device's wavelength dispersion curve at lighted state that results from the combination of (b) and (d); and (g) a compensated LCD device's wavelength dispersion curve at lighted state that results from the combination of (c) and (d).

The multilayer film with a substantially flat wavelength dispersion curve may be used in an LCD device to make the LC cell's wavelength dispersion curve flatter. FIG. 3 shows an exemplary multilayer film's substantially flat wavelength dispersion curve (b), an exemplary LC cell's wavelength dispersion curve (d), and the superimposition of both curves (f), which shows that the LC cell's wavelength dispersion curve is flatter with the compensation of the multilayer film than alone (d). By comparing FIG. 3(g) (which shows a wavelength dispersion curve for an LCD device compensated with a traditional negative C plate) to FIG. 3(f) (which shows a wavelength dispersion curve for an LCD device compensated with a multilayer compensation film having a substantially flat wavelength dispersion curve), it may be seen that the multilayer film improves the dispersion characteristic of an LCD in the lighted state as compared to a traditional negative C-plate.

In a second example embodiment, the multilayer film has a reversed wavelength dispersion curve and negative retardation throughout the wavelength range from 400 nm to 800 nm. The shape of an exemplary dispersion curve for a multilayer film with negative retardance and a reversed wavelength dispersion curve is depicted in FIG. 3(a). The multilayer film's dispersion curve has a shape that is an approximate reflection of the shape of the dispersion curve of a VA-LC cell in the lighted state, which is shown in FIG. 3(d).

In a preferred embodiment, the multilayer film has negative retardance and a reversed wavelength dispersion curve with an increasingly steep negative slope (i.e., retardance becomes decreasingly negative) at shorter wavelengths. Such a dispersion curve may compensate a lighted-state LC cell better than a multilayer film with a flat dispersion curve because a lighted-state LC cell generally has a dispersion curve with increasingly negative out-of-plane retardance at shorter wavelengths as shown in FIG. 3(d). Thus, an LC cell and a multilayer film with a reversed curve have wavelength dispersion curves with opposite trajectories at shorter wavelengths. Specifically, the LC cell may have a positive slope at shorter wavelengths while the multilayer-film may have a negative slope at shorter wavelengths. When the two slopes have approximately the same absolute values, the curves may be combined to form a substantially flat dispersion curve.

Figure 4:
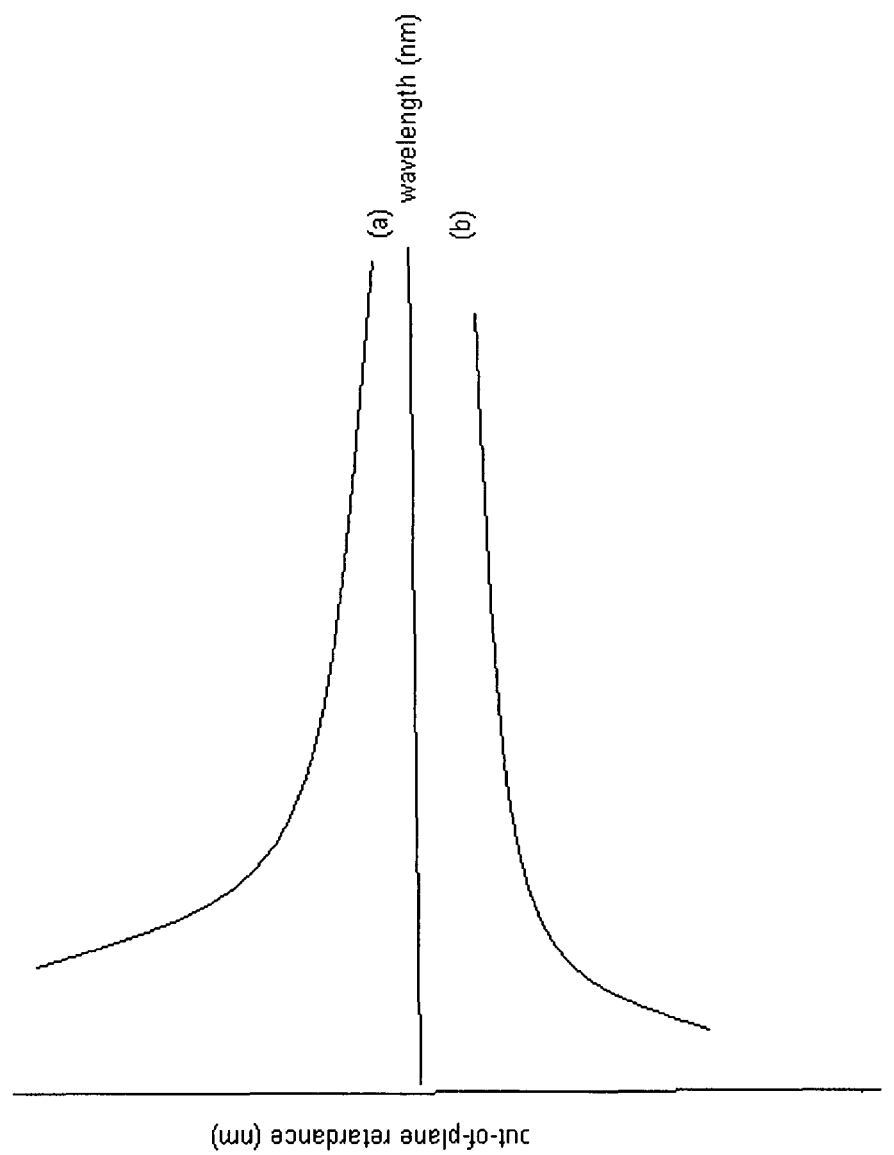
FIG. 4 is a graph depicting (a) the wavelength dispersion curve of a positive C-plate having a steep slope at short wavelengths and (b) the wavelength dispersion curve of a negative C-plate.
Figure 9:
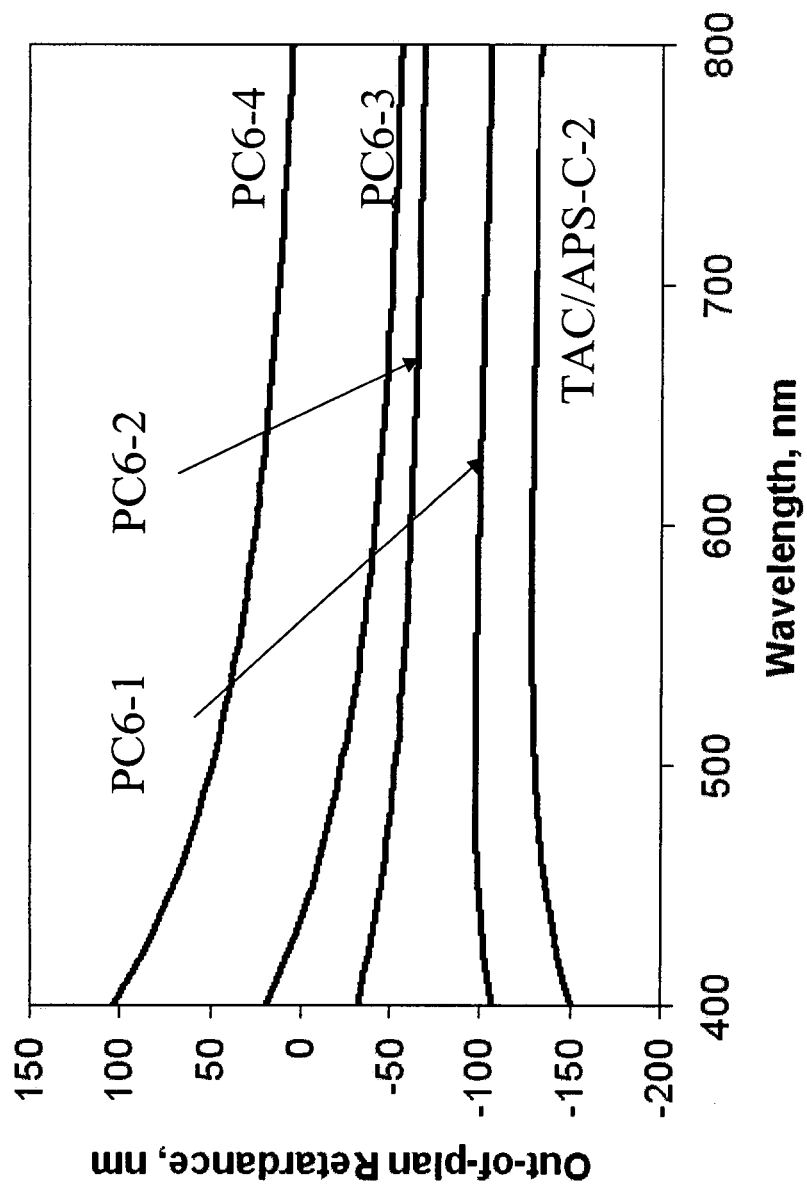
FIG. 9 is a graph of the wavelength dispersion curves for multilayer films with increasing thickness of a mesogen-jacketed polymer positive C-plates.

The multilayer film may have a negative retardance and reversed wavelength dispersion curve when the positive C-plate overcompensates for the negative C-plate's dispersion, resulting in a dispersion curve with out-of-plane retardance that becomes decreasingly negative at shorter wavelengths. This may be achieved by adjusting the relative thicknesses of the positive and negative C-plate layers. A multilayer film may also be caused to have a reversed dispersion curve by increasing the thickness of the positive C-plate because dispersion varies directly with film thickness. Thus, the multilayer film may have a reversed wavelength dispersion curve for which the absolute value of the positive C-plate's phase retardation is greater than the absolute value of the negative C-plate's phase retardation over a range of shorter wavelengths between about 400 nm to about 600 nm. This is depicted in FIG. 9, where curves PC6-2, PC6-3 and PC6-4 become reversed with increasing thickness of the positive C-plate. In one embodiment, the positive C-plate's increase in phase retardation occurs at a faster rate than the negative C-plate's decrease in phase retardation at shorter wavelengths. This faster increase may be depicted graphically by a wavelength dispersion curve for a positive C-plate with a negative slope that is steeper at shorter wavelengths than the positive slope of a negative C-plate at those wavelengths, as depicted in FIG. 4. Such a positive C-plate may compensate for the negative C-plate's large negative retardation values with a less steep slope at shorter wavelengths more efficiently, thus allowing a thinner layer of positive C-plate to result in a multilayer compensation film with a reversed dispersion curve at negative retardance. Thus, in a preferred embodiment, the wavelength dispersion characteristics of the positive C-plate and the negative C-plate are not mirror images. Rather, the absolute value of the positive C-plate's retardation value is greater and its slope is steeper than the absolute value of the negative C-plate's retardation value and slope at shorter wavelengths.

In a preferred example embodiment, the positive C-plate used in the multilayer film (with a reversed wavelength dispersion curve and negative retardation) may have a wavelength dispersion curve with slopes that satisfy the following parameters:

$R_{450}/R_{550}$=about 1.20 to about 2.00; about 1.30 to about 1.90; or about 1.35 to about 1.80

$R_{550}/R_{650}$=about 1.10 to about 1.60; about 1.13 to about 1.50; or about 1.15 to about 1.45

$R_{650}/R_{750}$=about 1.00 to about 1.40; about 1.02 to about 1.35; or about 1.04 to about 1.30 wherein, $R_{450}$, $R_{550}$, $R_{650}$ and $R_{750}$ are the retardation values in the thickness direction of the optical compensation film at the wavelengths 450 nm, 550 nm, 650 nm, and 750 nm, respectively.

Polymer films for such positive C-plates may be identified by reference to the positive C-plate's absorption maximum at certain wavelengths. In one embodiment of the invention, the steepness of a wavelength dispersion curve for a positive C-plate may be predicted by measuring the UV absorption of the positive C-plate because UV absorption maxima for polymers increases with increasingly steep wavelength dispersion curves at shorter wavelengths. Thus, in a preferred embodiment of the invention, polymers of the positive C-plate have UV absorption maxima between 260 and 380 nm, more preferably between 280 and 360 nm, and most preferably between 300 and 350 nm.

Examples of polymers with absorption maxima suitable for this invention include, but are not limited to, polymer compositions comprising one or more of the following moieties:

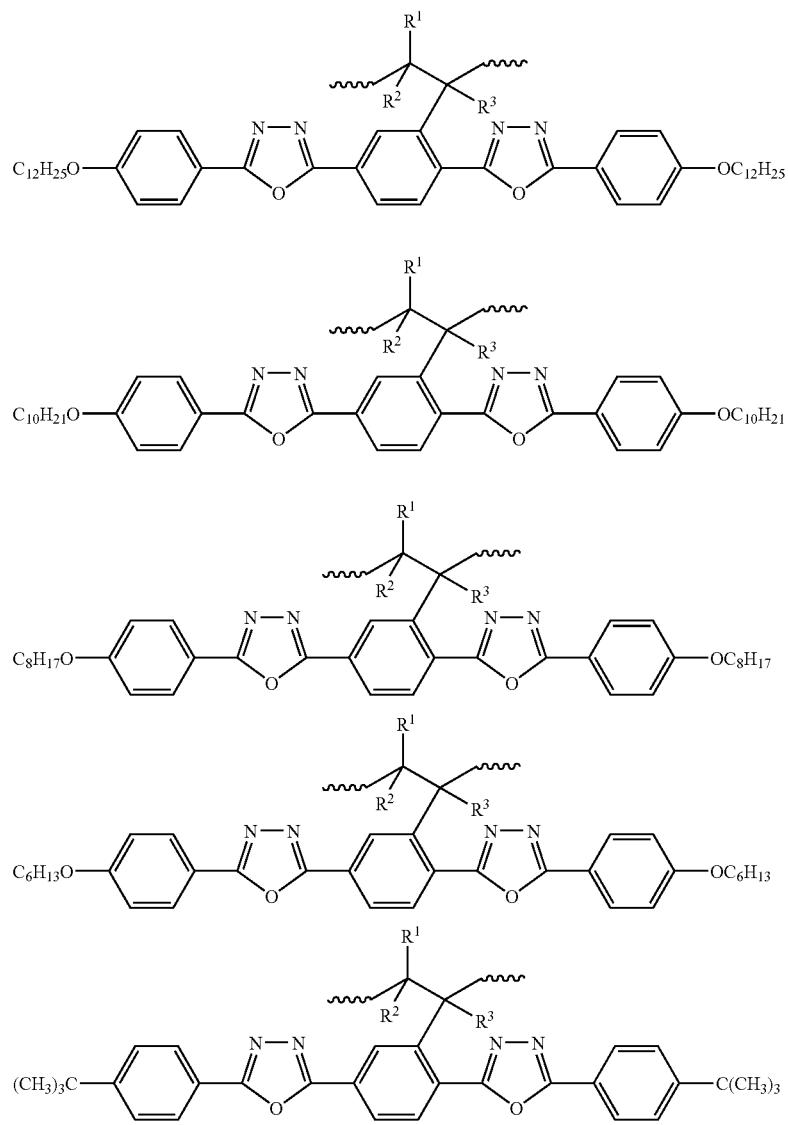

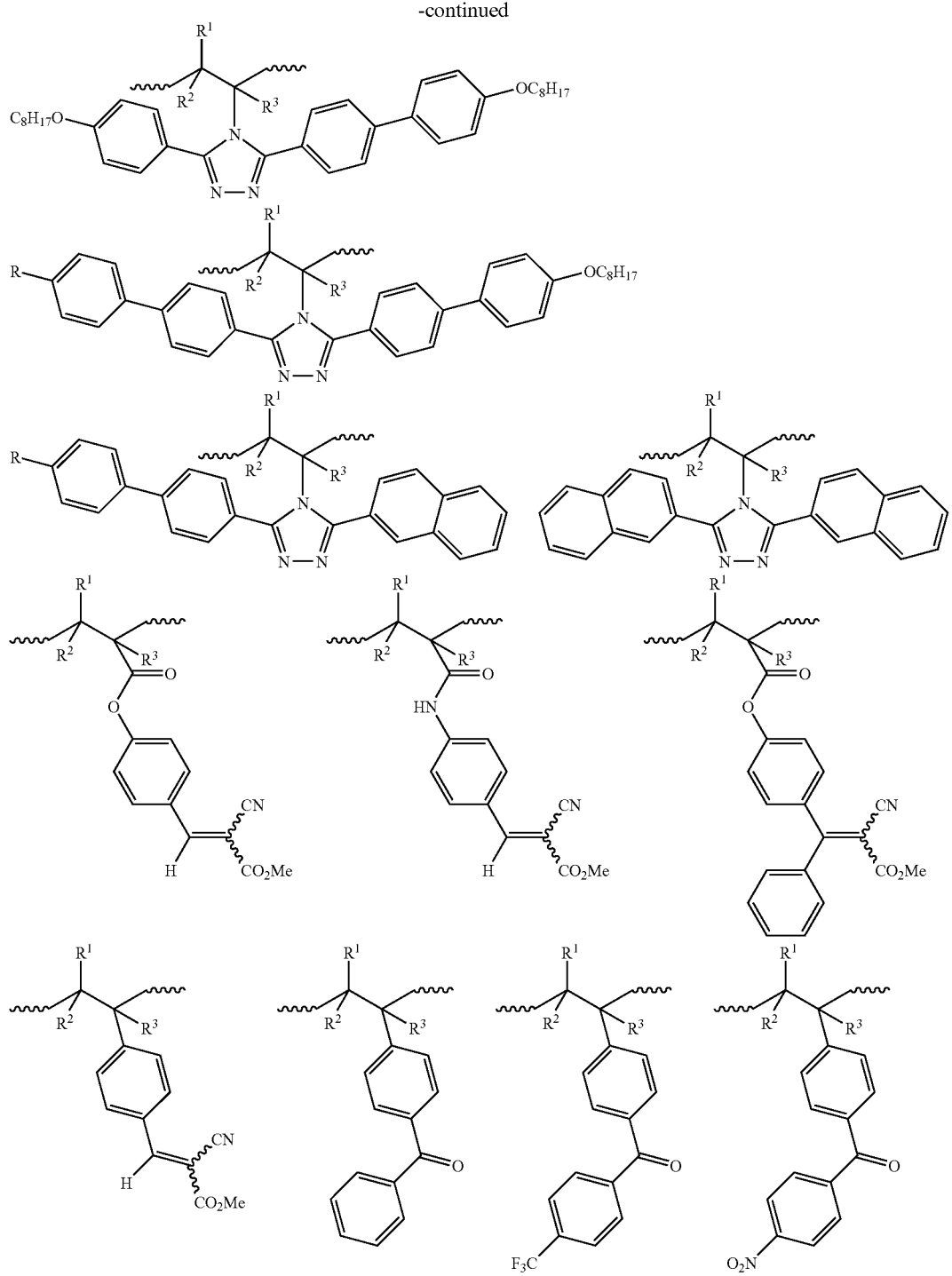

The multilayer film with a reversed wavelength dispersion curve may be used in an LCD device to compensate for the LC cell and any other layers in the LCD device. Such compensation may result in an overall LCD device having a substantially flat wavelength dispersion curve. The degree of flatness of an LCD device may by determined by reference to its retardance ratio, $R_\lambda/R_{550}$, wherein $R_\lambda$ and $R_{550}$ are the retardances in the thickness direction of the LCD device at wavelengths λ and 550, respectively. λ is a wavelength value within a range of wavelengths. The wavelength range for measuring retardance ratios is preferably 400 nm to 800 nm. Retardance ratios for an LCD device may be determined when its dispersion curve has positive retardation throughout the measured wavelength range, or when the curve has negative retardation throughout the measured wavelength range. A wavelength dispersion curve is substantially flat when all retardance ratios within the wavelength range are between 0.9 and 1.15. Preferably, a wavelength dispersion curve may have all retardance ratios between 0.93 and 1.10 within the wavelength range. More preferably, a wavelength dispersion curve may have all retardance ratios between 0.95 and 1.05 within the wavelength range. Even more preferably, the wavelength dispersion curve has a retardance ratio of about one. Most preferably, a wavelength dispersion curve has a retardance ration of one (a flat wavelength dispersion curve) and a net retardance of zero, indicating that the multilayer film has completely compensated for other layers in an LCD device including the LC cell.

As one of ordinary skill in the art will recognize, the shapes of multilayer films' wavelength dispersion curves may vary widely because they are selected based on the shape of the wavelength dispersion curve of an LC cell. The shape of the dispersion curve for the multilayer film preferably complements the shape of the dispersion curve for the LC cell such that superimposition of the curves results in a substantially flat dispersion curve for the overall LCD device. The multilayer film preferably may also flatten the wavelength dispersion curve of an LCD device containing other plates. Accordingly, suitability of a positive C-plate in the multilayer film depends on the shape of the wavelength dispersion curve of the negative C-plate in the multilayer film as well as the shape of the wavelength dispersion curve of the LC cell, and any other layers in the LCD device.

The invention further provides a liquid crystal display device having improved wavelength dispersion characteristics comprising one or more of the optical compensation films or multilayer films disclosed herein. The LCD device may be used as a screen in various applications including, but not limited to, computers, clocks, cell phones televisions, microwaves and calculators.

The negative C-plate used in a multilayer film may be made of any materials known in the art, including but not limited to polyimide, polyester, copolymer of cycloolefin, triacetylcellulose (TAC), biaxially stretched polymer film.

In one embodiment, the positive C-plate has a high birefringence of at least about 0.002 from 400 nm<λ<800 nm. In a preferred embodiment, the positive C-plate may have a positive birefringence value of greater than about 0.002, greater than about 0.005, greater than about 0.01, greater than about 0.015, or greater than about 0.02, greater than about 0.025, or greater than about 0.03 throughout the wavelength range of 400 nm<λ<800 nm. The positive C-plate in the multilayer film may be an optical compensation films comprising a polymer composition having a moiety with an optically anisotropic subunits (OASU) with high positive out-of-plane birefringence, $\Delta n$, for use as positive C-plates.

Additional positive C-plates that may be used in multilayer films are set forth herein. Positive C-plates may have positive birefringence greater than 0.002 throughout the wavelength range of 400 nm<λ<800 nm and may form an out-of-plane anisotropic alignment upon solvent evaporation when made by solution casting. Accordingly, the optical compensation films of the invention may be aligned anisotropically such that the net optical axis of a rod-like OASU (in the rod-direction) is out-of-plane (where out-of-plane includes but is not limited to optical axes that are perpendicular to the plane), and the net optical axis of a disk-like or AR-BES OASU (in the disk normal direction) is in-plane (where in-plane includes but is not limited to optical axes that are parallel to the plane).

The polymer film (positive C-plate) with high positive birefringence has a moiety containing a light stable OASU in the polymer backbone. The OASU may be attached directly to the polymer backbone through one covalent bond so the moiety has the general formula:

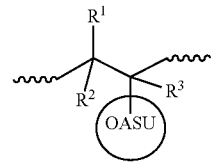

wherein $R^1$, $R^2$, and $R^3$ are each independently hydrogen atoms, alkyl groups, substituted alkyl groups, or halogens, and OASU is an optically anisotropic sub-unit. The OASU may also be attached directly to the polymer backbone through two independent covalent bonds so the moiety has the general formula:

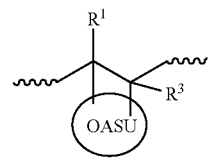

wherein $R^1$, $R^2$, and $R^3$ are each independently hydrogen atoms, alkyl groups, substituted alkyl groups, or halogens, and OASU is an optically anisotropic sub-unit. The covalent bond provides a direct connection between the OASU and the polymer backbone that other atoms are not positioned along the covalent bond, which would make the connection between the OASU and the polymer backbone indirect.

The polymer film (positive C-plate) may be a homopolymer or a copolymer. The copolymer may have one or more moieties containing an OASU attached directly to the polymer backbone through at least one covalent bond. The description of the invention applies to any OASU-containing homopolymer or copolymer with any combination of moieties. As used herein, the term "polymer" refers to homopolymers and copolymers.

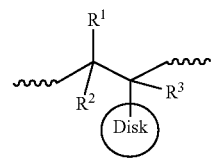

in the polymer backbone, wherein $R^1$, $R^2$, and $R^3$ are each independently hydrogen atoms, alkyl groups, substituted alkyl groups, or halogens. The disk may also be attached directly to the polymer backbone through two independent covalent bonds. The covalent bond may be a carbon-carbon or carbon-nitrogen bond. For example, disks may be attached to the polymer backbone via a carbon or nitrogen atoms, such as the carbon atom on a benzene ring or the nitrogen atom on an imide or lactam. The disk-containing polymer has a positive birefringence greater than 0.002 throughout the wavelength range of 400 nm<λ<800 nm without being subject to heat treatment, photo irradiation, or stretching. The disk-containing polymer film (positive C-plate) may be made by solution casting, and may form an out-of-plane anisotropic alignment upon solvent evaporation. In a preferred embodiment, the positive birefringence is greater than about 0.005 throughout the wavelength range of 400 nm<λ<800 nm.

The polymer film (positive C-plate) may be a homopolymer or copolymer with one or more moieties containing a disk attached directly to the polymer backbone through at least one covalent bond. The copolymer may have a moiety with the general structure in the polymer backbone:

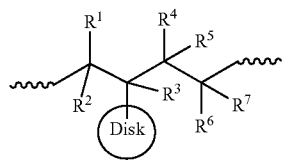

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of a residue of an ethylenically unsaturated monomer. In one embodiment, $R^6$ is a different disk. In another embodiment, $R^6$ is a benzene ring. The disk may also be attached to a copolymer backbone by two covalent bonds.

The disk usually has a size greater than a benzene ring. The disk is usually bulky. In one embodiment, the disk group has a fused ring structure. The "fused ring" structure may be understood to have two or more individual rings that are connected by sharing at least one of their sides. Each individual ring in the fused ring may be substituted or unsubstituted and is preferably a six- or five-membered ring, which may be all-carbon or heterocyclic. Individual rings in a fused ring may be aromatic or aliphatic. Preferred individual rings in a fused ring include, but are not limited to, aromatic rings and substituted aromatic rings, lactam ring and rings based on aromatic imide such as phthalimide and substituted phthalimide. The disk group is stable at ambient conditions and thus suitable for use in an optical compensation film (positive C-plate) for an LCD.

Representatives and illustrative examples of disk groups include, but are not limited to, naphthalene, anthracene, phenanthrene, naphthacene, pyrene, pentacene, phthalimide, and the like as shown in the following chemical structures:

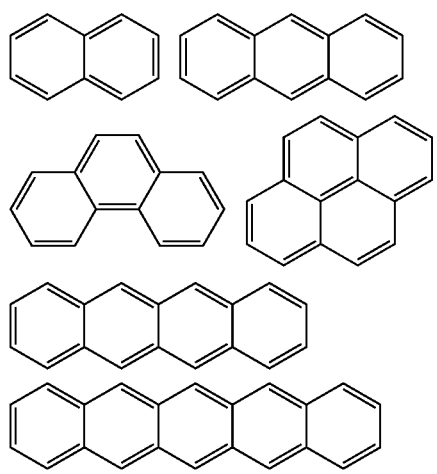

-continued

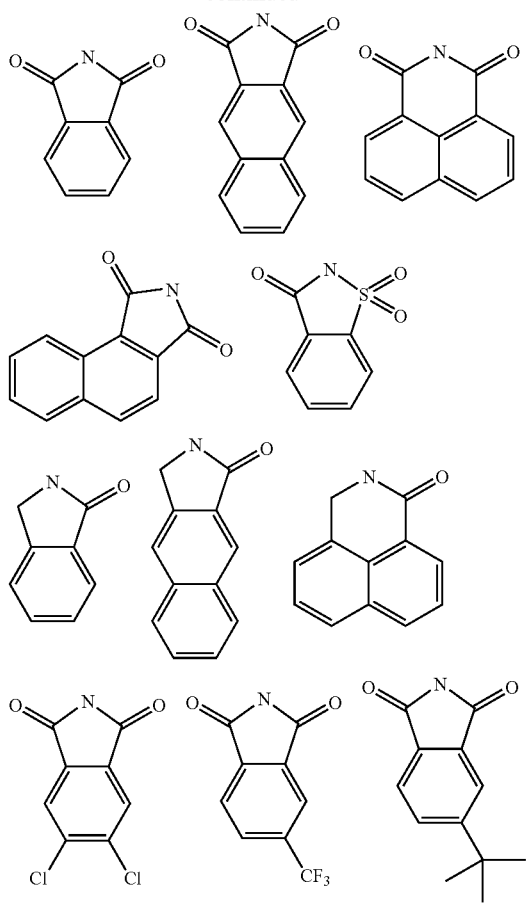

As one skilled in the art will recognize, polymer compositions comprising moieties with disk groups may be prepared by polymerization of a disk-containing monomer having a vinyl group attached directly to either a carbon or a nitrogen atom on the fused ring. Such disk-containing monomers with polymerizable vinyl groups include, but are not limited to, the following compounds:

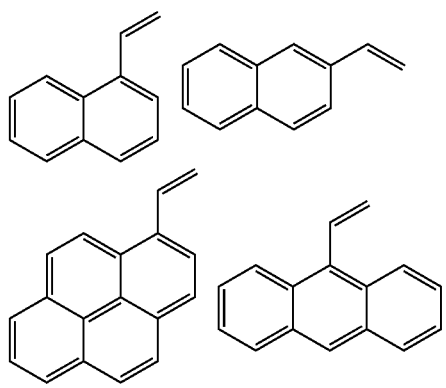

-continued

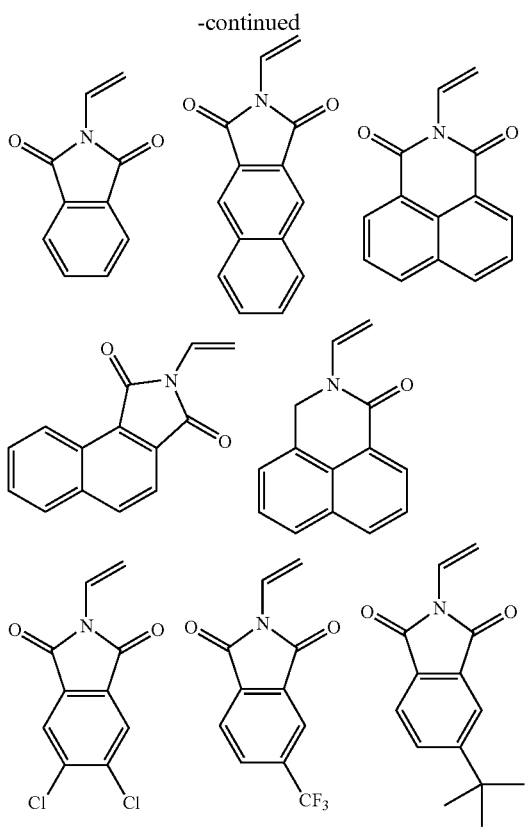

Polymer compositions comprising moieties with disk groups may also be prepared by copolymerization of a disk-containing monomer with one or more ethylenically unsaturated monomers. Such ethylenically unsaturated monomers that may be used to copolymerize with disk-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, nitrostyrene, bromostyrene, iodostyrene, cyanostyrene, chlorostyrene, 4-t-butylstyrene, 4-methylstyrene, vinyl biphenyl, vinyl triphenyl, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl (meth)acrylamide, methacrylamide, acrylamide, butyl acrylamide, ethyl acrylamide, diacetoneacrylamide, butadiene, vinyl ester monomers, vinyl(meth)acrylates, isopropenyl (meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamido-ethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is a preferred method of polymerization when a particularly high molecular weight is desirable. A high molecular weight polymer may lead to better film quality and higher positive birefringence.

Solution film casting may be done with disk containing polymer, a polymer solution comprising a blend of disk-containing polymer with other polymers, or a copolymer of disk-containing monomer with other monomers, the latter two being advantageous because they may improve film quality and lower cost. Polymer solutions may further contain other ingredients such as other polymers or additives.

Depending on the particular disk structure and polymer or polymer blend composition, the disk-containing polymers may be soluble in, for example, toluene, methyl isobutyl ketone (MIBK), methyl ethyl ketone (MEK), cyclopentanone, N,N-dimethylformamide, or mixtures thereof. Preferred solvents are toluene and MIBK.

The OASU may be disk-like, rod like (mesogen), or aromatic rings (Ar) substituted with birefringence enhancing substituents (BES). In a preferred embodiment, the OASU is oriented perpendicular to the polymer backbone, and the value of the positive birefringence of the polymer film (positive C-plate) increases with increasing perpendicularity of the OASUs.

The polymer solutions may advantageously form an out-of-plane anisotropic alignment upon solvent evaporation and solution film casting without being subject to heat treatment, photo irradiation, or a stretching process (although one or a combination of these processes may be used to further entrance birefringence). The resulting buttressed polymer films (positive C-plates) are stable at ambient conditions, have high positive birefringence and may be inexpensive to produce. Positive birefringence is defined as $n_z > (n_x + n_y)/2$, wherein $n_x$ and $n_y$ represent in-plan refractive indexes, and $n_z$ represents the thickness-direction refractive index of the film. These polymers and the optical compensation films made therefrom, each has positive birefringence greater than 0.002 throughout the wavelength range of 400 nm<λ<800 nm without being subject to heat treatment, photo irradiation, or stretching. However, in certain embodiments these processes may be used to further enhance positive birefringence. In preferred embodiments, the compensation films (positive C-plates) may have birefringence greater than 0.005, 0.01, 0.02 or 0.03 throughout the wavelength range of 400 nm<λ<800 nm.

Birefringence (Δn) may be measured by determining the birefringence of a film over a wavelength range of about 300 nm to about 800 nm at different increments. Alternatively, birefringence of a film may be measured at 633 nm as is customary in the art. Reference to Δn at 633 nm is customary because birefringence at wavelengths<633 nm is generally higher than birefringence at 633 nm, and birefringence at wavelengths>633 nm is generally the same as or slightly lower than birefringence at 633 nm. Thus, birefringence at 633 nm is understood in the art as indicating that birefringence throughout 300 nm<λ<800 nm is greater than or approximately the same as the birefringence at 633 nm.

In one example embodiment of the invention, the OASU is a disk. The disk may be attached directly to the polymer backbone through one covalent bond so the moiety has the general formula:

In another example embodiment of the invention, the OASU is an aromatic ring (Ar) substituted with birefringence enhancing substituents (BES). BES could also be substituents on disk or mesogen OASUs. The Ar-BES may also be a fused aromatic ring substituted with BES. The Ar-BES may be attached directly to the polymer backbone through one covalent bond so the moiety has the general formula:

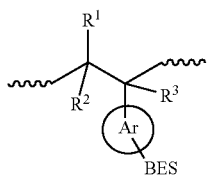

in the polymer backbone, wherein $R^1$, $R^2$, and $R^3$ are each independently hydrogen atoms, alkyl groups, substituted alkyl groups, or halogens. The Ar-BES may also be attached directly to the polymer backbone through two independent covalent bonds. The degree of substitution of the aromatic ring with BES is at least 0.1, but it may also be higher. The covalent bond may be a carbon-carbon or carbon-nitrogen bond. The Ar-BES containing polymer has a positive birefringence greater than 0.002 throughout the wavelength range of 400 nm<λ<800 nm without being subject to heat treatment, photo irradiation, or stretching. The Ar-BES-containing polymer film (positive C-plate) may be made by solution casting, and may form an out-of-plane anisotropic alignment upon solvent evaporation. The Ar-BES preferrably has a positive birefringence greater than 0.005, and more preferrably has a positive birefringence greater than 0.01 throughout the wavelength range of 400 nm<λ<800 nm.

The polymer film (positive C-plate) may be a homopolymer or copolymer with one or more moieties containing an Ar-BES attached directly to the polymer backbone through one covalent bond. The copolymer may have a moiety with the general structure in the polymer backbone:

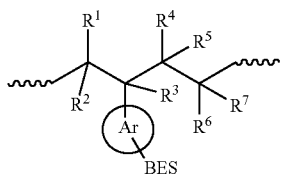

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of the residue of an ethylenically unsaturated monomer. In one embodiment, $R^6$ is a different Ar-BES. In another embodiment, $R^6$ is a benzene ring.

The degree of substitution (DS) of BES on the aromatic ring refers to the average number of BES on one aromatic ring in a polymer composition. Thus, DS=1 when, on average, each aromatic ring is substituted with one BES. DS may be greater than 1 when, on average, each aromatic ring is substituted with more than one BES. DS is preferably greater than 0.3, more preferably greater than 0.5, and most preferably greater than 0.7. The DS of BES is directly related to the polymer's birefringence. Thus, Δn may be manipulated by varying the DS. The solubility of the polymer can also dependent on the DS and be optimized accordingly. The DS can be readily manipulated by one of ordinary skill in the art, for example, by adjusting the starting amounts of BES.

In one embodiment, the Ar-BES-containing polymer is a poly(vinylaromatic), i.e. a polymer resulting from polymerization of the vinyl group on an aromatic ring. The poly (vinylaromatic) also has at least one BES. Poly(vinylaromatic) with BES advantageously exhibits exceptionally high birefringence values, is soluble in a variety of organic solvents, and may be used to prepare an optical compensation film (positive C-plate) by solution casting onto a substrate. The solubility and birefringence of poly(vinyl aromatics) of the invention can be controlled by incorporating certain BESs and by adjusting their degree of substitutions (DSs) of the aromatic rings of the polymers. This is highly desirable since an LCD device typically contains multi-layers of materials having different solubility in a variety of solvents and a layer can only be coated with a polymer solution that does not dissolve this specific layer. Thus, the ability to control the solubility and birefringence of a polymer allows the optical film (positive C-plate) of the present invention to be cast on a specific layer (or substrate) for LCD fabrication to achieve the desirable order of the layers in the device.

Representatives and illustrative examples of aromatic groups include, but are not limited to, benzene, biphenyl, naphthalene, anthracene, phenanthrene, naphthacene, pyrene, pentacene, triphenyl, and the like. Preferably, the aromatic ring is benzene, biphenyl or naphthalene. Most preferably, the aromatic ring is benzene.

BES is a group that in general is bulky and/or capable of increasing the polarizability of the disk groups' aromatic ring on poly(vinyl aromatic). A polymer may contain different BES groups on different aromatic rings within the same polymer molecule or different BES groups on the same aromatic ring. Representatives and illustrative examples of BES include, but are not limited to, $NO_2$, Br, I, CN, and phenyl. Preferably, BES substituents are $NO_2$, Br, I, and CN. Most preferably, BES is $NO_2$ or Br.

BES may be attached to an aromatic ring such as benzene at any available position including the positions that are para, ortho or meta to the ethylene moiety. A polymer composition may also have BESs that are in different positions on different aromatic rings. In a preferred embodiment, the BES is para to the ethylene moiety. BES may also be mostly at the para position with some BES at the ortho and/or meta positions.

Representatives and illustrative examples of polymer compositions of BES-substituted aromatic polymers include, but are not limited to, poly(nitrostyrene), poly(bromostyrene), substituted poly(nitrostyrene), substituted poly(bromostyrene), copolymers of nitrostyrene or bromostyrene, and copolymer of substituted nitrostyrene or bromostyrene. Preferably, the polymer composition is poly(nitrostyrene), poly (bromostyrene), a copolymer thereof, or a mixture thereof.

Poly(nitrostyene), poly(bromostyrene) and copolymers thereof may be substituted with one or more nitro or bromo BESs, respectively. The degree of substitution for bromo or nitro BES is preferrably at least 0.5 and more preferrably at least 0.7. However, the degree of substitution may also be higher or lower in the range 0<DS<1. Also, DS may be greater than 1. The nitro or bromo substituent may be attached to the benzene ring at any available position including the positions that are para, ortho or meta to the ethylene moiety. In a preferred embodiment, the nitro or bromo BES is para to the ethylene moiety. Thus, preferred polymers include poly(4-nitrostyrene), poly(4-nitrostyrene-co-styrene), poly(4-bromotyrene) and poly(4-bromostyrene-co-styrene). As one of skill in the art will recognize, when these preferred polymers are prepared from 4-nitro- or 4-bromostyrene monomers, the nitro or bromo groups, respectively, will always be at the para position.

As one of skill in the art will recognize, poly(nitrostyrene) may be prepared by nitration of polystyrene in the presence of a mixed acid of $HNO_3$ and $H_2SO_4$ as disclosed in Philippides, A., et al., *Polymer* (1993), 34(16), 3509-13; Fernandez, M. J., et al., *Polymer Degradation and Stability* (1998), 60(2-3), 257-263; Cowie, J. M. G., et al., *European Polymer Journal* (1992), 28(2), 145-8; and Al-Najjar, Mohammed M, et al., *Polymer Engineering and Science* (1996), 36(16), 2083-2087. Nitration of polystyrene can be carried out in the presence of an organic solvent such as nitrobenzene, 1,2-dichloroethane, 3-nitrotoluene, carbon tetrachloride, chloroform, methylene chloride, carbon disulfide, N,N-dimethylformamide, N,N-dimethylacetamide, N-methylpyrolidone, or a mixture thereof. Preferred solvents are nitrobenzene and a 3:1 mixture of nitrobenzene and 1,2-dichloroethane. Copolymers of nitrostyrene may be prepared by nitration of a copolymer of styrene such as poly(styrene-co-acrylonitrile), poly(styrene-co-4-t-butylstyrene), and poly(styrene-co-methyl methacrylate). They can also be prepared by copolymerization of nitrostyrene with other ethylenically unsaturated monomers such as methyl methacrylate, acrylonitrile, 4-t-butylstyrene, 4-methylstyrene, butyl acrylate, and acrylic acid. Poly(nitrostyrene) can also be prepared by polymerization of nitrostyrene monomer as disclosed in Philippides, A. et al., Polymer (1994), 35(8), 1759-63; and Jonquieres, A. et al., *Polymer Bulletin* (Berlin), (1994), 33(4), 389-95. Trifluoroacetic anhydride and trifluoroacetic acid may be used with nitric acid as the nitration agent. Inorganic nitrate salts such as $NH_4NO_3$, $NaNO_3$, $KNO_3$, and $AgNO_3$ may also be used with trifluoroacetic anhydride as the nitration agent as disclosed in Grivello, J. V., *J. Org. Chem.* (1981), 46, 3056-3060.

The poly(nitrostyrene) polymers prepared in this invention are soluble in toluene, methyl isobutyl ketone (MIBK), methyl ethyl ketone (MEK), cyclopentanone, N,N-dimethylformamide or a mixture thereof depending on the degree of substitution of the nitro group. Preferred solvents for film casting poly(nitrostyrene) are toluene and MIBK or a mixture thereof.

As one of skill in the art will recognize, poly(bromostyrene) may be prepared by bromination of polystyrene in the presence of bromine and a Lewis acid catalyst such as $AlCl_3$, $FeCl_3$, $AlBr_3$, $FeBr_3$, $SbCl_5$, $ZrCl_4$, $Sb_2O_3$, and the like, as disclosed in U.S. Pat. Nos. 5,677,390 and 5,532,322, which are incorporated by reference in their entirety. It may also be prepared by reaction of polystyrene with n-butyllithium-TMEDA complex followed by bromine quenching as disclosed in Farrall, M. J. and Frechet, M. J., *Macromolecules*, Vol. 12; p. 426, (1979). Similar to poly(nitrostyrene), poly(bromostyrene) may also be prepared by polymerization of bromostyrene monomer as described in Farrall, M. J. and Frechet, M. J., *Macromolecules*, Vol. 12; p. 426, (1979). Likewise, copolymers of bromostyrene may also be prepared as described previously for poly(nitrostyrene). Bromination of polystyrene can be carried out in the presence of an organic solvent such as, for example, 1,2-dichloroethane, nitrobenzene, 3-nitrotoluene, carbon tetrachloride, chloroform, methylene chloride, carbon disulfide, N,N-dimethylformamide, N,N-dimethylacetamide, N-methylpyrrolidone, or a mixture thereof. Preferred solvents are 1,2-dichloroethane, carbon tetrachloride, and chloroform.

The poly(bromostyrene) polymers prepared in this invention are soluble in toluene as well as in cyclopentanone even with high degrees of substitution. This is particularly useful for coating a TAC substrate since toluene will not have a detrimental effect on the TAC film.

Polymer compositions comprising moieties with Ar-BES may also be prepared by copolymerization of an Ar-BES-containing monomer with one or more ethylenically unsaturated monomers. Such ethylenically unsaturated monomers that may be used to copolymerize with disk-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethyolpropyl triacrylate, styrene, α-methyl styrene, chlorostyrene, 4-t-butylstyrene, 4-methyl styrene, vinyl naphthalene, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, di-octylmaleate, allyl methacrylate, di-allyl maleate, di-allylmalonate, methyoxybutenyl methacrylate, isobornyl methacrylate, hydroxybutenyl methacrylate, hydroxyethyl (meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

Polymerization may be carried out by a method known in the art such as bulk, solution, emulsion, or suspension polymerization. The reaction may be free radical, cationic, anionic, zwitterionic, Ziegler-Natta, or atom transfer radical type of polymerization. Emulsion polymerization is a preferred method of polymerization when a particularly high polymer molecular weight is desirable. A high molecular weight polymer may lead to better film quality and higher positive birefringence.

Solution film casting may be done with Ar-BES containing polymer, a polymer solution comprising a blend of Ar-BES-containing polymer with other polymers, or a copolymer of Ar-BES containing monomer with other monomers, the latter two being advantageous because they may improve film quality and lower cost. Polymer solutions may further contain other ingredients such as other polymers or additives.

Depending on the particular Ar-BES structure and polymer or polymer blend composition, the Ar-BES-containing polymers may be soluble in, for example, toluene, methyl isobutyl ketone (MIBK), methyl ethyl ketone (MEK), cyclopentanone, N,N-dimethylformamide, or mixtures thereof. Preferred solvents are toluene and MIBK.

In another example embodiment of the invention, the OASU is rod-like. In a preferred embodiment, the rod-like structure is a mesogen. The mesogen may be attached directly to the polymer backbone through one covalent bond (without a spacer) so the moiety has the general formula:

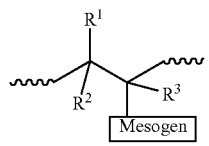

in the polymer backbone, wherein $R^1$, $R^2$, and $R^3$ are each independently hydrogen atoms, alkyl groups, substituted alkyl groups, or halogens. The mesogen may also be attached directly to the polymer backbone through two independent covalent bonds. The covalent bond may be a carbon-carbon or carbon-nitrogen bond. The mesogen is attached to the polymer backbone preferably at the gravity center of the mesogen or a nearby position, but may also be attached at an end or off-center position. The mesogen-containing polymer has a positive birefringence greater than 0.002 throughout the wavelength range of 400 nm<λ<800 nm without being subject to heat treatment, photo irradiation, or stretching. The mesogen-containing polymer film (positive C-plate) may be made by solution casting and may form an out-of-plane anisotropic alignment upon solvent evaporation. In a preferred embodiment, the positive birefringence is greater than 0.005, greater than 0.01, greater than 0.02 or greater than 0.03 throughout the wavelength range of 400 nm<λ<800 nm. The mesogen-containing polymers in the present invention are commonly referred to as mesogen jacketed polymers (MJPs). MJPs according to the invention include conventional mesogen-jacketed liquid crystalline polymers (MJLCPs) as well as polymers that are jacketed by a non-liquid crystalline rod-like group.

The polymer film (positive C-plate) may be a homopolymer or copolymer with one or more moieties containing a mesogen attached directly to the polymer backbone through at least one covalent bond. The copolymer may have a moiety with the general structure in the polymer backbone:

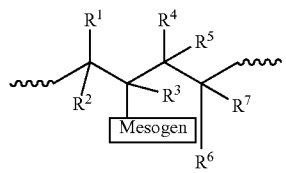

wherein $R^1$, $R^2$, $R^3$, $R^4$, $R^5$, and $R^7$ are each independently hydrogen atoms, alkyl groups, substituted alkyl groups, or halogens; wherein $R^6$ is a hydrogen atom, alkyl group, substituted alkyl group, halogen, ester, amide, ketone, ether, cyano, phenyl, epoxy, urethane, urea, or optically anisotropic subunit (OASU) attached directly to the backbone of the residue of an ethylenically unsaturated monomer. In one embodiment, $R^6$ is a different mesogen. The mesogen may also be attached to a copolymer backbone by two covalent bonds.

Unlike conventional side-chain liquid crystalline polymers (LCPs) having flexible spacers between the backbones and the mesogens, mesogen-jacked polymers (MJPs) have no or very short spacers between the polymer backbones and the rod-like mesogenic units. See Zhao, Y. F., et al. *Macromolecules*, 2006, 39, p. 948. Thus, MJPs have a strong interaction between the main chains and the bulky side groups. As a result, unlike the conventional side-chain LCPs whose backbones usually take a random-coil chain conformation, MJPs are somewhat rigid and exhibit some characteristics of main-chain LCPs.

It has been surprisingly found that MJPs having no spacers between the backbones and the rod-like mesogenic side groups are capable of forming out-of-plane anisotropically aligned films (positive C-plates) without being subject to either heat treatment or photo irradiation. An embodiment of the invention includes preparing such films by solution casting. Upon solvent evaporation at an ambient temperature, the resulting films exhibit exceptionally high positive birefringence. MJPs of the invention are soluble in a variety of organic solvents.

Mesogens of the invention may have the general formula:

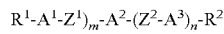

wherein $A^1$, $A^2$, and $A^3$ are independently either aromatic or cycloaliphatic rings. The rings may be all carbons or heterocyclic and may be unsubstituted or mono- or poly-substituted with halogen, cyano or nitro, or alkyl, alkoxy, or alkanoyl groups having 1 to 8 carbon atoms.

$Z^1$, $Z^2$, and $Z^3$ are each independently —COO—, —OOC—, —CO—, —CONH—, —NHCO—, —CH=CH—, —C≡C—, —CH=N—, —N=CH—, —N=N—, —O—, —S—, or a single bond.

$R^1$ and $R^2$ are each independently halogen, cyano, or nitro groups, or alkyl, alkoxy, or alkanoyl groups having 1 to 25 carbon atoms, or has one of the meanings given for —($Z^2$-$A^3$).

m is 0, 1, or 2; n is 1 or 2. Preferably, m is 1 or 2; n is 1 or 2; $A^2$ is 1,4-phenylene; and the mesogen is attached to the polymer backbone through $A^2$. More preferably, m is 2; n is 2; $A^2$ is 1,4-phenylene; and the mesogen is attached to the polymer backbone through $A^2$.

Representatives and illustrative examples of aromatic rings in a mesogen include, but are not limited to:

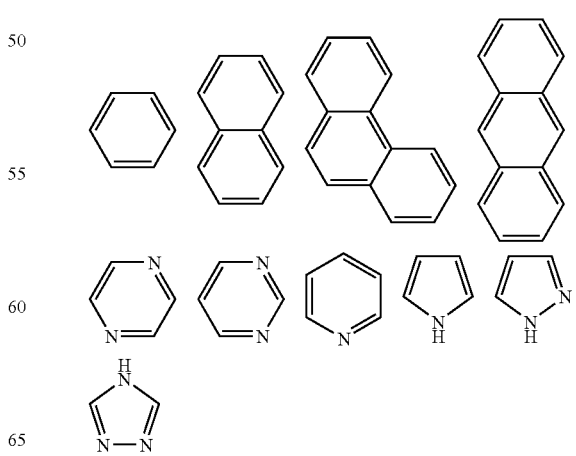

Representatives and illustrative examples of cycloaliphatic rings in a mesogen include, but are not limited to:
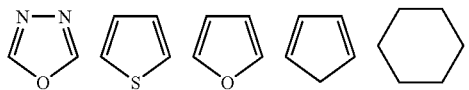
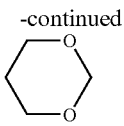
Representatives and illustrative examples of mesogens that may be attached to the polymer backbone through one covalent bond include, but are not limited to:
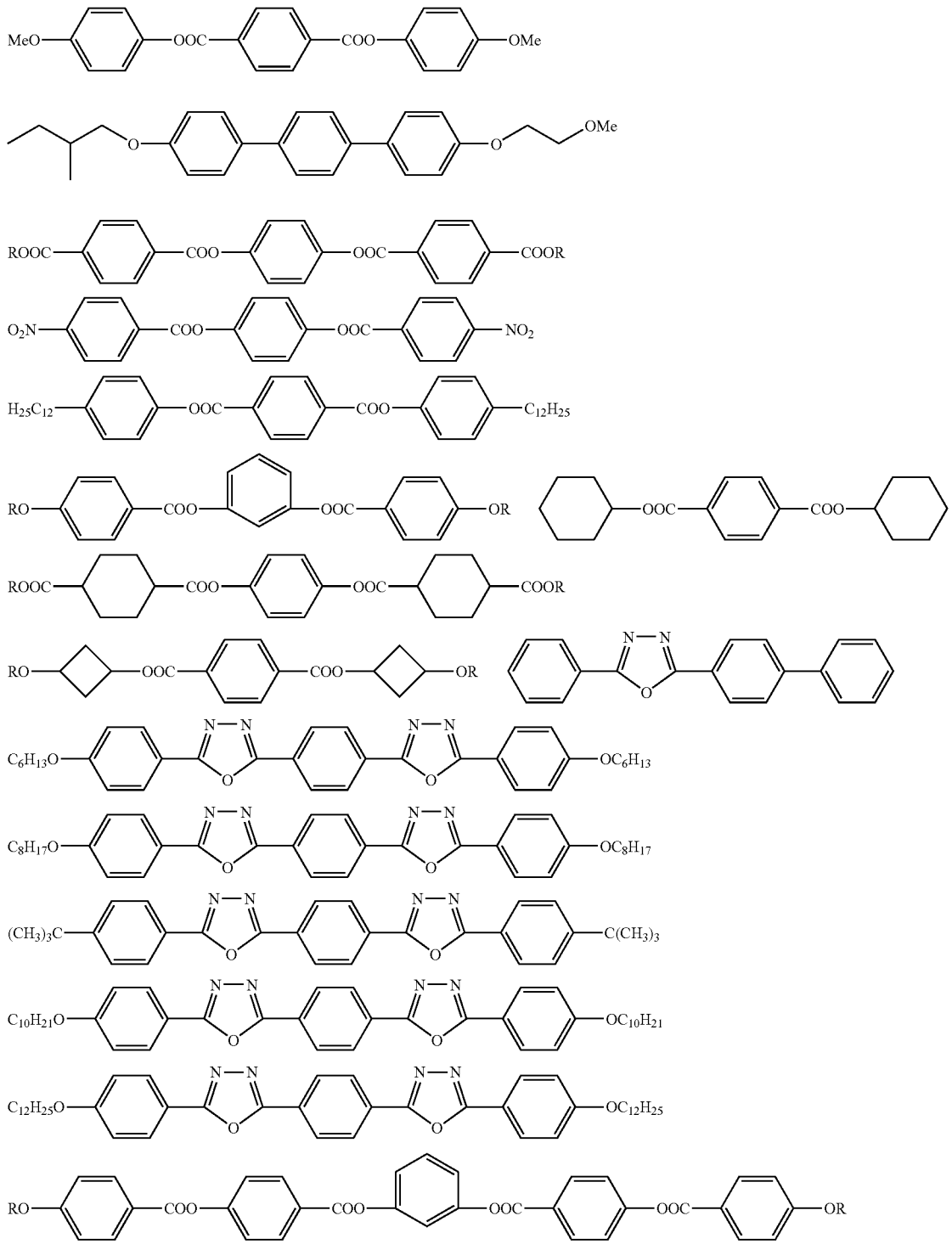

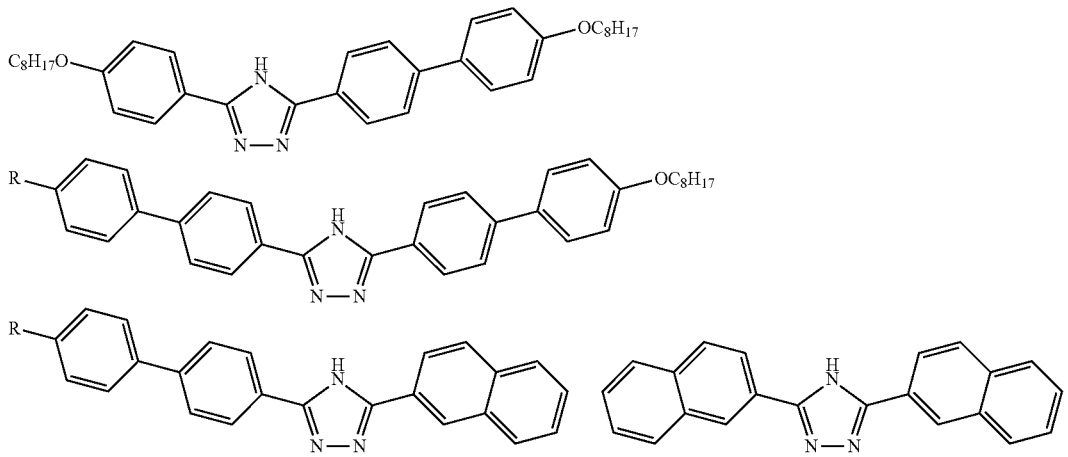

Such mesogens may be attached to the polymer backbone via a carbon atom on a benzene ring or a nitrogen atom on a triazole. In a preferred embodiment, the mesogen is attached to the polymer backbone via a carbon atom on the center 1,4-phenylene or a nitrogen atom on the heterocyclic ring.

Representatives and illustrative examples of preferred polymer moieties with mesogens having m is 1 or 2, n is 1 or 2, $A^2$ is 1,4-phenylene, and the mesogen is attached to the polymer backbone through $A^2$ include, but are not limited to:

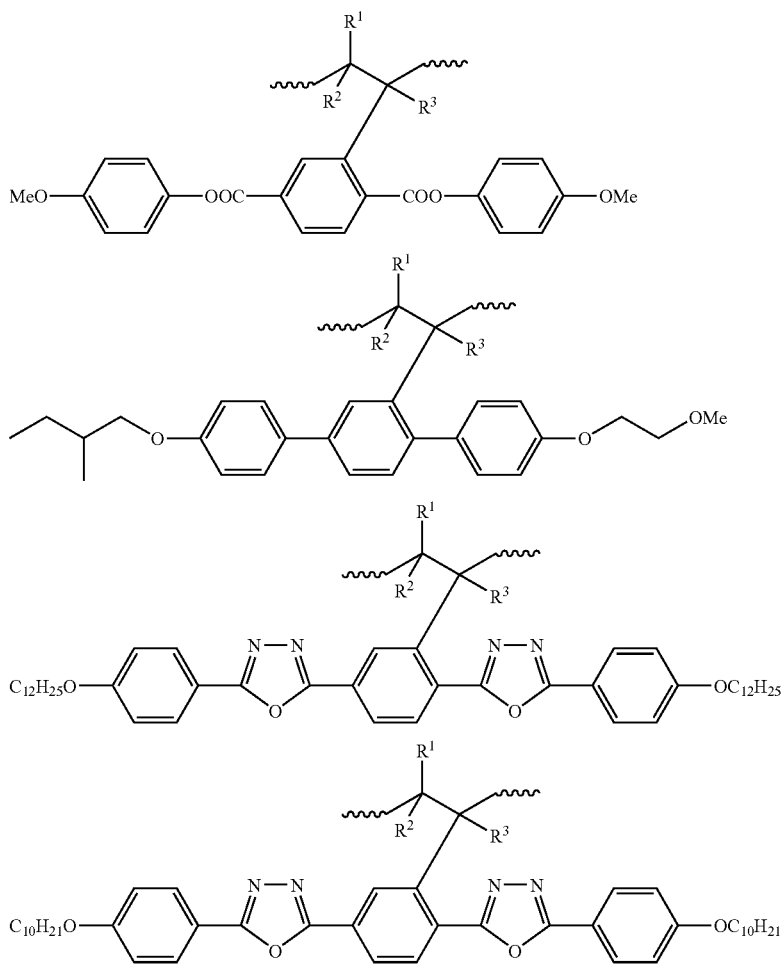

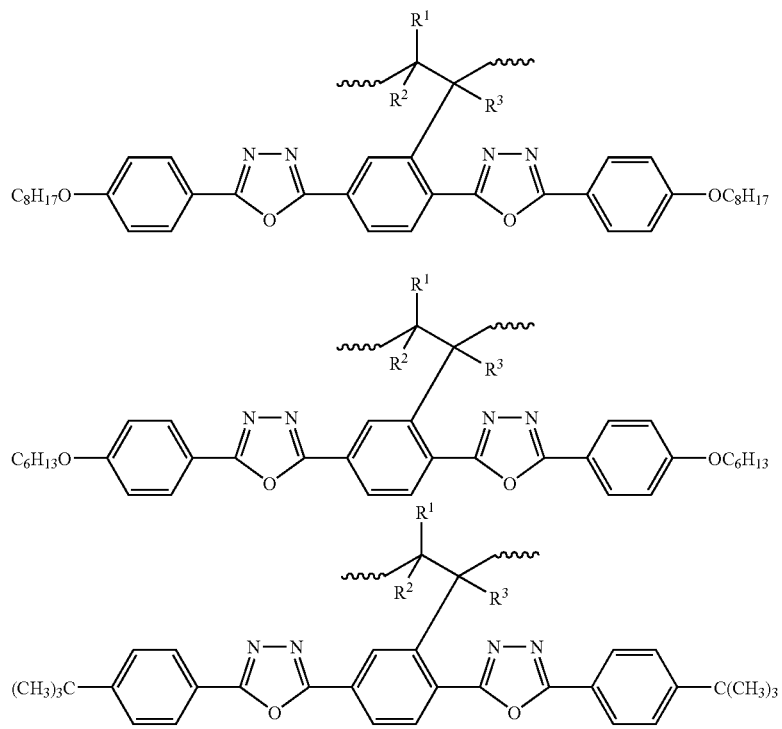
Representatives and illustrative examples of preferred polymer moieties with mesogens having m is 2, n is 2, $A^2$ is 1,4-phenylene, and the mesogen is attached to the polymer backbone through $A^2$ include, but are not limited to:
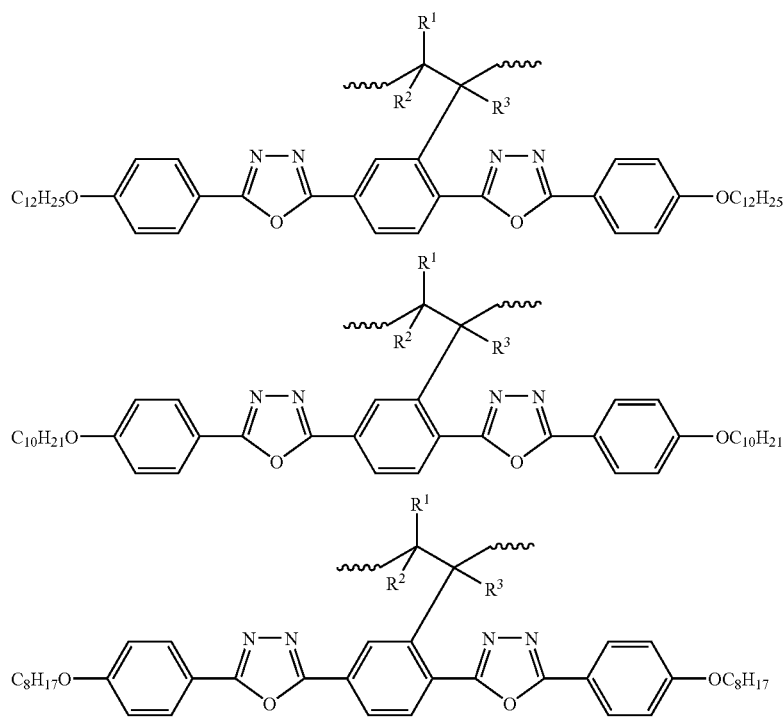

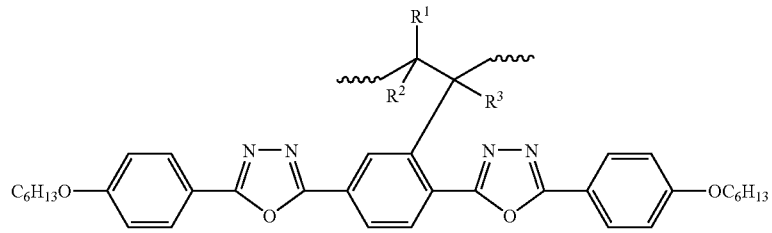

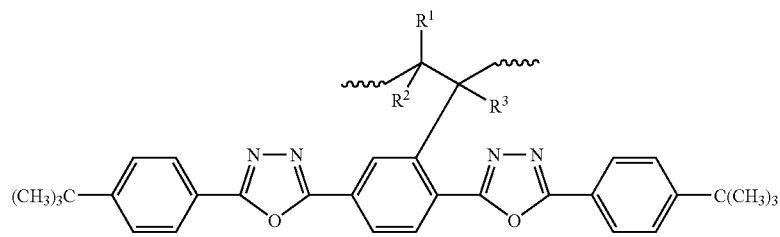

wherein $R^1$, $R^2$, and $R^3$ are hydrogen atoms, alkyl groups, or halogens.

In one example embodiment of the invention, an optical film (positive C-plates) is solution cast from polymer compositions with one or more moieties of a mesogen having m is 2, n is 2, $A^2$ is 1,4-phenylene, and being attached to the polymer backbone through $A^2$ This mesogen-jacketed polymer film (positive C-plate) has an absorption maxima between the wavelengths of about 300 nm and about 350 nm and a positive birefringence greater than about 0.015 throughout 400 nm<$\lambda$<800 nm. Representative and illustrative examples of such polymer moieties include, but are not limited to:

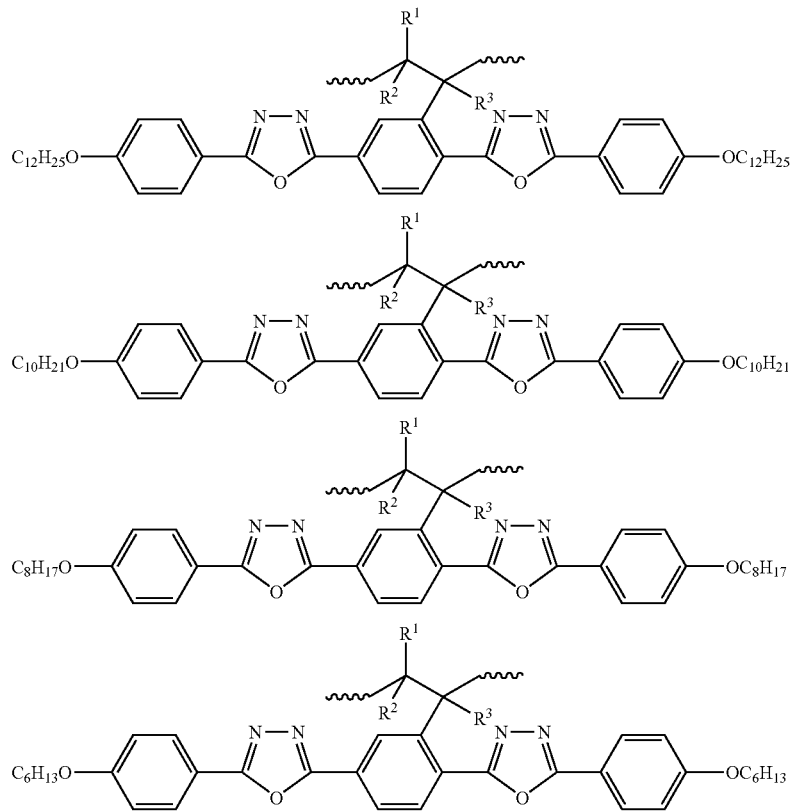

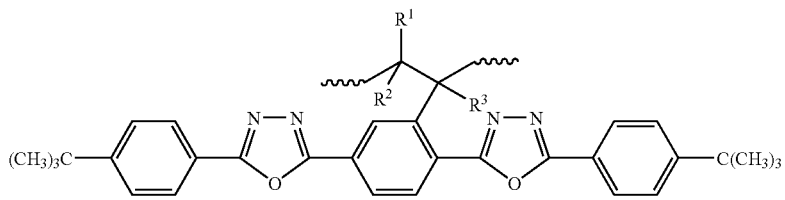

wherein $R^1$, $R^2$, and $R^3$ are hydrogen atoms, alkyl groups, or halogens.

MJPs of the invention may be prepared by polymerization of a mesogen monomer having a vinyl group attached to one of its rings, preferably an aromatic ring such as benzene. The polymerization may be carried out by a method known in the art such as bulk, solution, emulsion, or suspension polymerization. The reaction may be free radical, cationic, anionic, zwitterionic, Ziegler-Natta, or atom transfer radical type of polymerization. See Zhou, Q. F., et al. *Macromolecules,* 1987, 20, p. 233; Zhang, D., et al., *Macromolecules,* 1999, 32, p. 5183; Zhang, D., et al., *Macromolecule,* 1999, 32, p. 4494; and Chen, X., et al., *Macromolecules,* 2006, 39, p. 517.

Representatives and illustrative examples of mesogen monomers with polymerizable vinyl groups suitable for the invention include, but are not limited to:

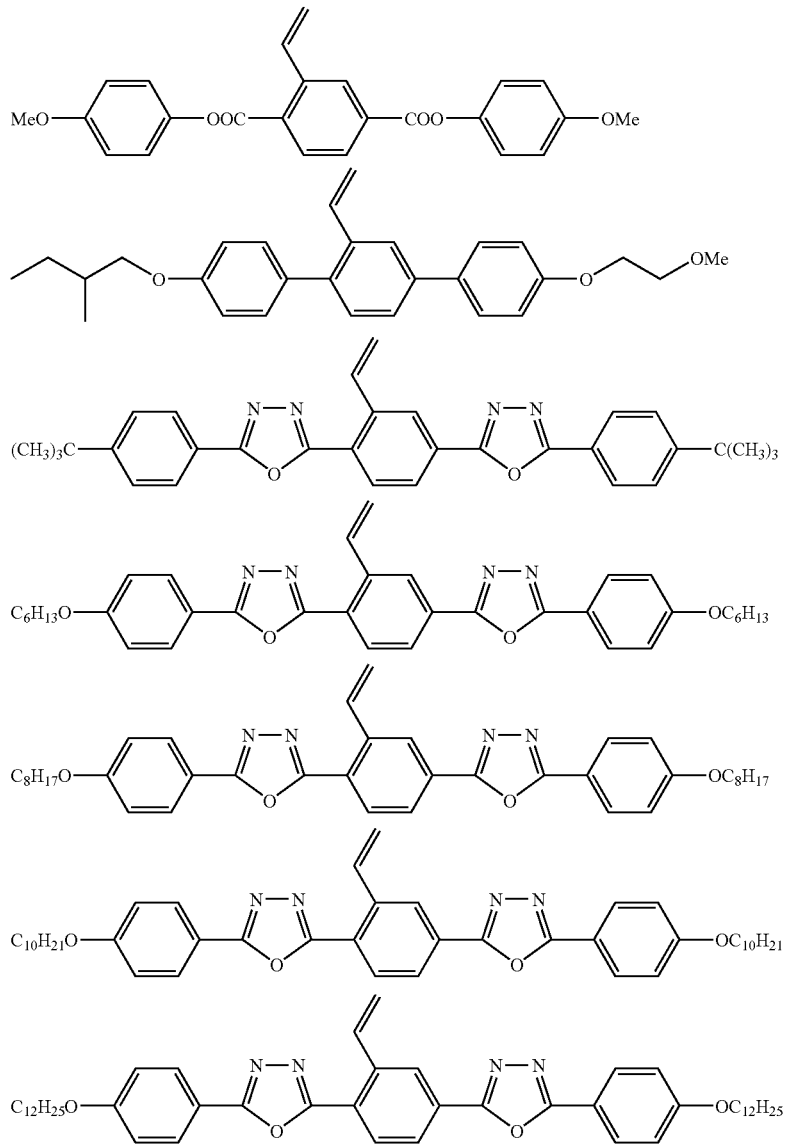

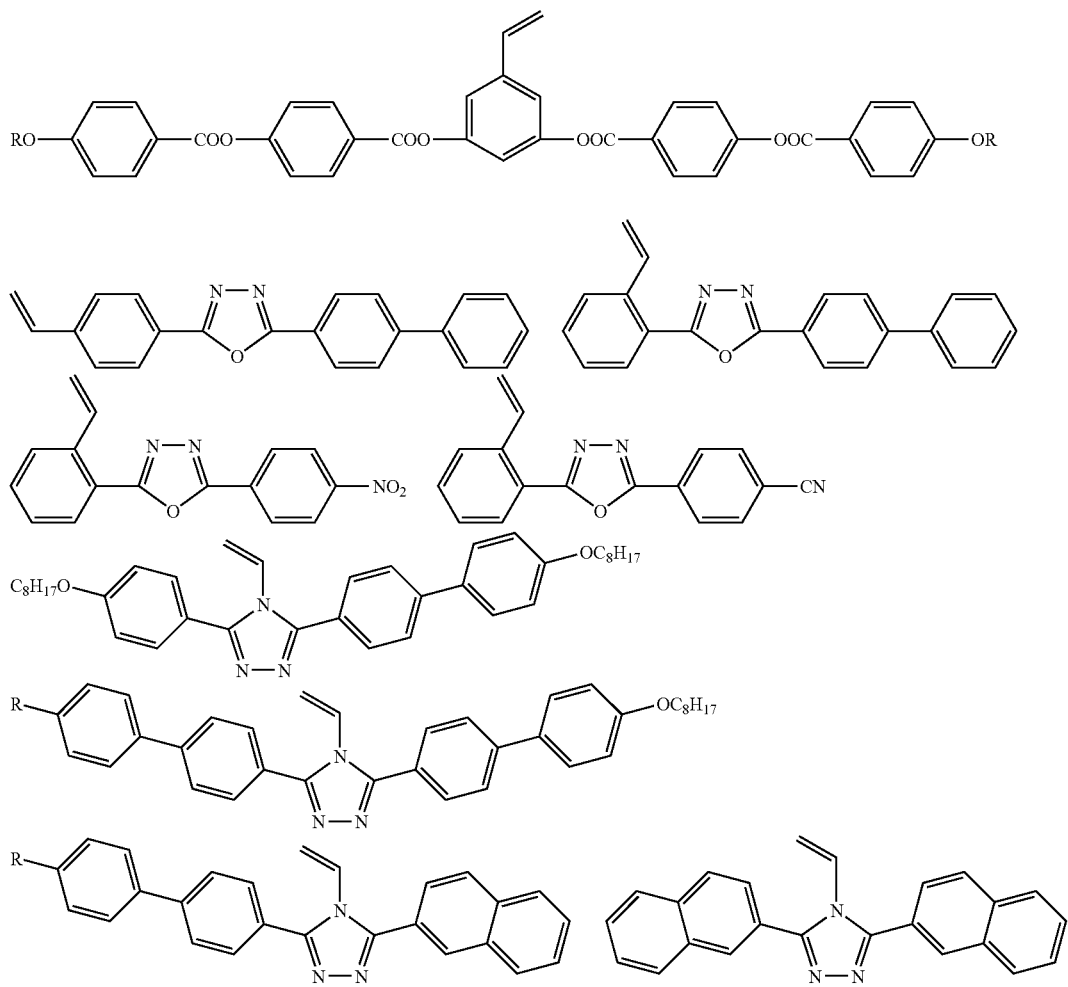
Representatives and illustrative examples of preferred mesogen monomers with polymerizable vinyl groups suitable for the invention include, but are not limited to:
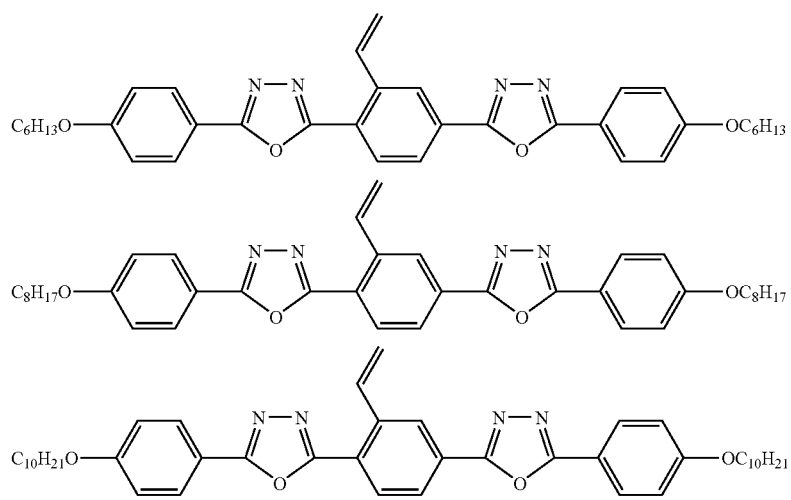

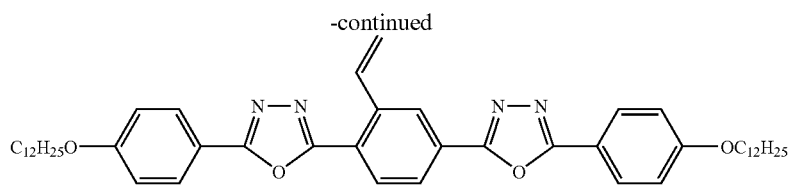

Polymers with these moieties have a positive birefringence greater than about 0.02 throughout the wavelength range of 400 nm<λ<800 nm.

MJPs of the present invention may also be prepared by copolymerization of a mesogen monomer having one vinyl group with one or more ethylenically unsaturated monomers. Representatives and illustrative examples of ethylenically unsaturated monomers that may be used for copolymerization with mesogen-containing monomers include, but are not limited to, one or more of methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, trimethylolpropyl triacrylate, styrene, α-methyl styrene, vinyl naphthalene, nitrostyrene, bromostyrene, iodostyrene, cyanostyrene, chlorostyrene, 4-t-butylstyrene, vinyl biphenyl, vinyl triphenyl, vinyl toluene, chloromethyl styrene, acrylic acid, methacrylic acid, itaconic acid, crotonic acid, maleic anhydride, glycidyl methacrylate, carbodiimide methacrylate, $C_1$-$C_{18}$ alkyl crotonates, di-n-butyl maleate, α- or β-vinyl naphthalene, di-octylmaleate, allyl methacrylate, di-allyl maleate, di-allylmalonate, methyoxybutenyl methacrylate, isobornyl methacrylate, hydroxybutenyl methacrylate, hydroxyethyl(meth)acrylate, hydroxypropyl(meth)acrylate, acetoacetoxy ethyl methacrylate, acetoacetoxy ethyl acrylate, acrylonitrile, vinyl chloride, vinylidene chloride, vinyl acetate, vinyl ethylene carbonate, epoxy butene, 3,4-dihydroxybutene, hydroxyethyl(meth)acrylate, methacrylamide, acrylamide, butyl acrylamide, ethyl acrylamide, diacetoneacrylamide, butadiene, vinyl ester monomers, vinyl(meth)acrylates, isopropenyl(meth)acrylate, cycloaliphaticepoxy(meth)acrylates, ethylformamide, 4-vinyl-1,3-dioxolan-2-one, 2,2-dimethyl-4 vinyl-1,3-dioxolane, 3,4-di-acetoxy-1-butene, and monovinyl adipate t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate, N-(2-methacryloyloxy-ethyl)ethylene urea, and methacrylamidoethylethylene urea. Further monomers are described in The Brandon Associates, 2nd edition, 1992 Merrimack, N.H., and in Polymers and Monomers, the 1966-1997 Catalog from Polyscience, Inc., Warrington, Pa., U.S.A.

As one of skill in the art will recognize, MJP may also be prepared by first synthesizing a functionalized polymer and then subsequently reacting the polymer with a small molecule to obtain the desired mesogen structure.

Solution film casting may be done with MJPs, a polymer solution comprising a blend of MJPs with other polymers, or a copolymer of MJPs, the latter two being advantageous because they may improve film quality and lower cost. Polymer solutions may further contain other ingredients such as other polymers or additives. MJPs of the invention are soluble in toluene, methyl isobutyl ketone (MIBK), methyl ethyl ketone (MEK), cyclopentanone, N,N-dimethylformamide or a mixture thereof depending on the structures of the mesogens. Preferred solvents are toluene and MIBK. Optical films can be cast onto a substrate from the resulting polymer solutions by a method known in the art such as, for example, spin coating, as described above.

In another embodiment of the invention, the OASU is attached directly to the polymer backbone through two independent covalent bonds so the moiety has the general formula:

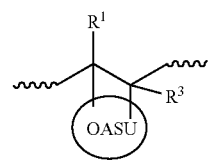

wherein $R^1$, $R^2$, and $R^3$ are each independently hydrogen atoms, alkyl groups, substituted alkyl groups, or halogens, and OASU is an optically anisotropic sub-unit.

Representatives and illustrative examples of such polymer moieties having OASU attached directly to the polymer backbone through two independent covalent bonds include, but are not limited to:

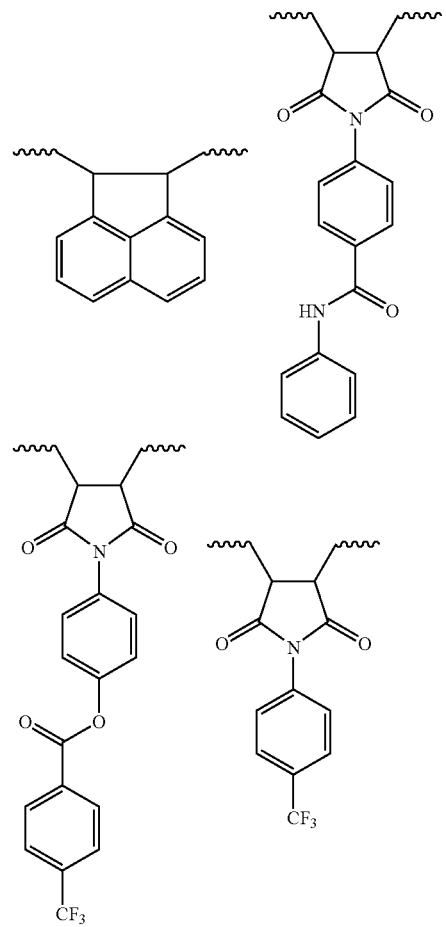

Representatives and illustrative examples of monomers that may be used to prepare homopolymers or copolymers having OASU attached directly to the polymer backbone through two independent covalent bonds include, but are not limited to:

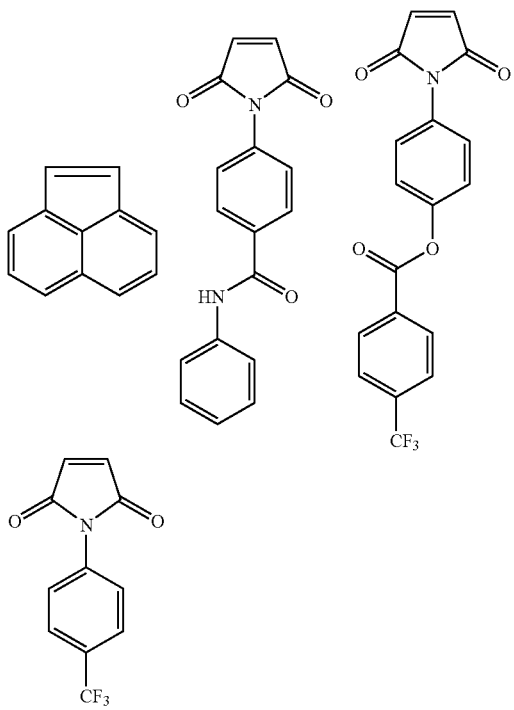

Another example embodiment of the invention includes a method for controlling the birefringence of an optical compensation film (positive C-plate) by selecting a polymer that adheres to parameters that have been discovered to enhance birefringence as disclosed herein. Birefringence of a polymer film with positive birefringence (positive C-plate) may be controlled by controlling the orientation of optically anisotropic subunits (OASUs), which are the molecular units that give a compensation film its birefringent properties.

In a preferred example embodiment of the invention, birefringence may be controlled by selecting a polymer with substituents that exhibit the buttressing effect, defined as:

$$B=R/D$$

wherein B is the buttressing factor, R is the maximum dimension of an OASU in the direction perpendicular to the vector sum of the covalent bond or bonds that attach the OASU to the polymer backbone, and D is the distance along the polymer backbone, when the polymer backbone is in extended conformation, between the attaching points of the two neighboring OASUs. For an OASU attached to the polymer backbone by two covalent bonds, D is measured from the midpoint of the two covalent bonds. For a polymer with some moieties that do not contain OASUs, D is still the distance between attaching points of the two closest OASUs, even if the OASUs are not directly adjacent to each other or if other substituents are between the OASUs along the polymer chain. The buttressing factor B of a given polymer or copolymer structure may be calculated theoretically based on values of bond lengths and the corresponding distances between atoms or substituents. As will be understood by one of ordinary skill in the art, bond lengths may be calculated by techniques such as x-ray crystallography, X-ray-absorption fine structure, NMR spectroscopy and electron diffraction. Tables reporting known bond lengths are known in the art and available in various chemistry texts such as Handbook of Chemistry & Physics, 65$^{th}$ Edition, CRC Press; Chemistry: the molecular nature of matter and change, 4$^{th}$ edition, 2006, The McGraw-Hill Companies, Author: Martin S. Silberberg. In one example embodiment, selection of an OASU according to B=R/D parameters allows control of the negative segment birefringence ($\Delta n^s$) of a polymer film. That polymer is then solution cast so that it has a negative segment order parameter ($O^s$), thus resulting in a polymer film with positive birefringence ($\Delta n$).

Figure 11:
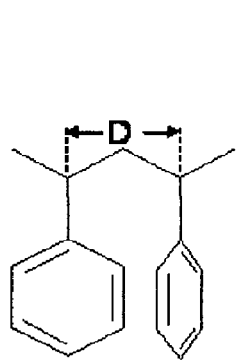
FIG. 11 is a depiction of several OASUs and the frameworks for calculating the buttressing factor for these OASUs.
Figure 11:
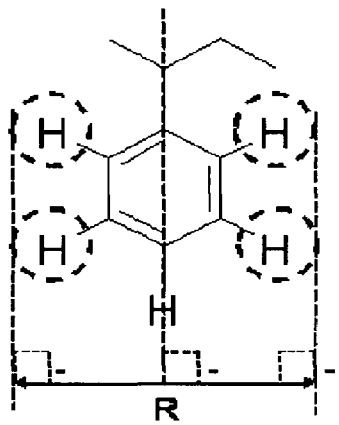
Figure 11:
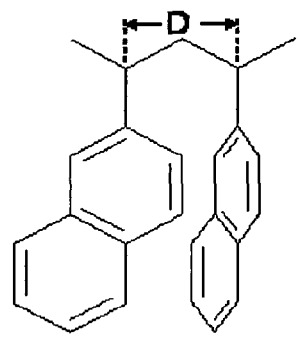
Figure 11:
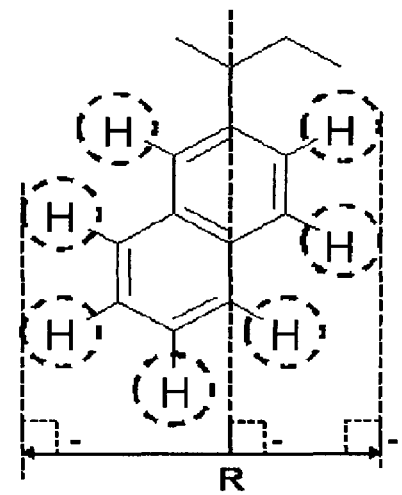
Figure 11:
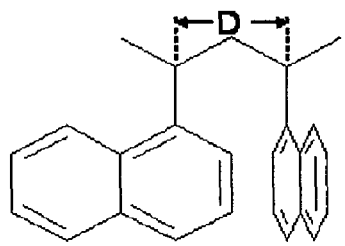
Figure 11:
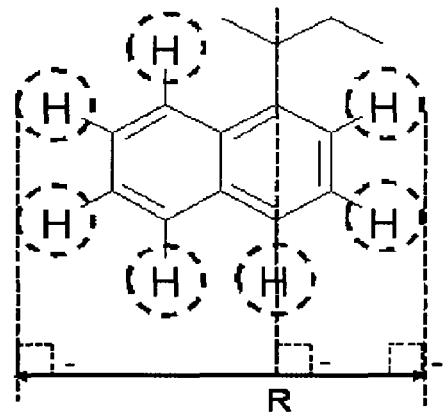
Figure 11:
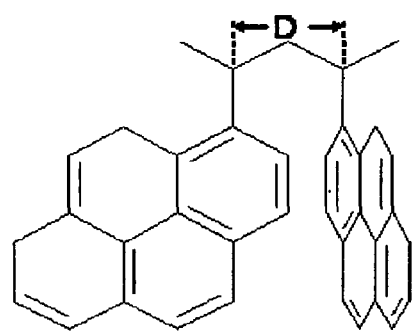
Figure 11:
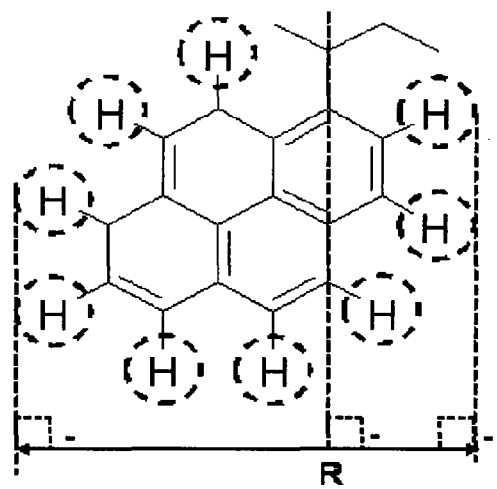
Figure 11:
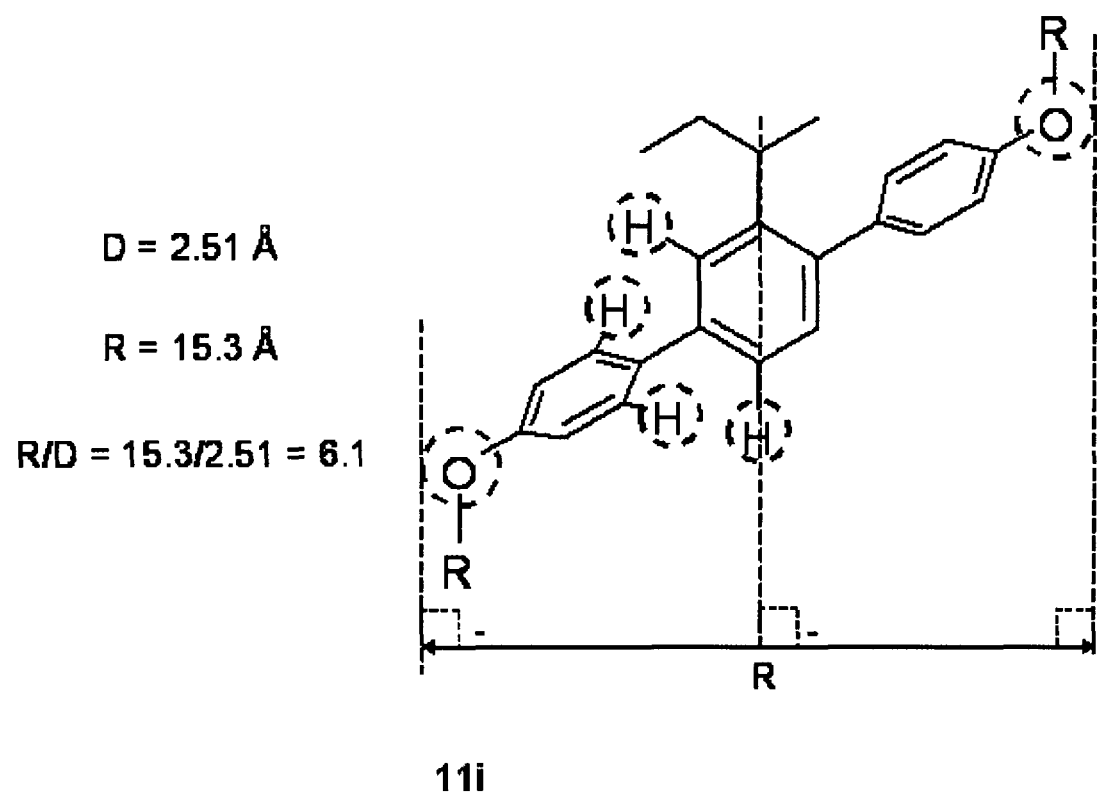
Figure 12:
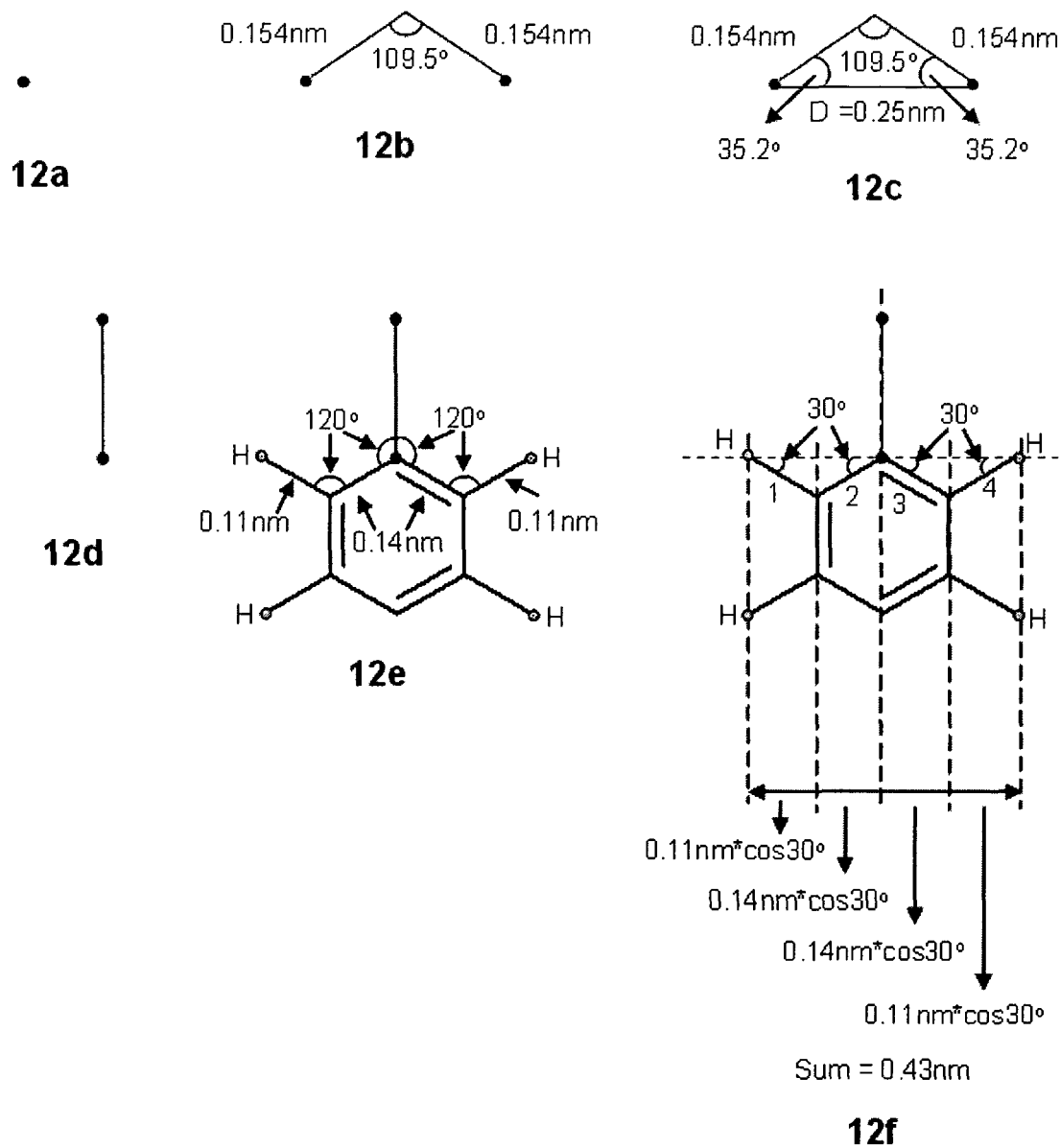
FIG. 12 is a depiction of the framework for calculating the buttressing factor for polystyrene.

Theoretical calculation of R and D values may be understood by reference to an exemplary polymer, polystyrene, which is explained in FIGS. 11-12 and the following example. D is the distance between the attaching points of two OASUs to the polymer backbone when the polymer is in the extended chain conformation, as depicted in exemplary FIG. 11a. D is the straight line distance between the attaching points of neighboring OASUs rather than the entire distance along the polymer backbone between the attaching points. D may be calculated by drawing a framework around an OASU-containing moiety and using known bond lengths and bond angles.

Use of the framework, bond lengths and bond angles in calculating D and R is demonstrated by reference to polystyrene. FIG. 12a shows the point on the polymer backbone at which the OASU of reference (the benzene ring) will be attached. FIG. 12b shows a segment of the polymer backbone in the extended chain conformation. For polystyrene, this represents two single carbon-carbon bonds, each having a bond length of 0.154 nm and a bond angle of 109.5°. FIG. 12c shows the distance D formed when the two OASU-attaching points are joined by a straight line. The angles between the straight line representing D and the carbon-carbon singles bonds is readily determined [(180°-109.5°)÷2=35.2°]. Thus, the value of D may be calculated by $$D=(0.154\times\cos 35.2°)+(0.154\times\cos 35.2°)=0.25 \text{ nm}$$

Thus, for polystyrene shown in FIG. 11a, D is approximately 2.51 Å. Other examples of D calculations are depicted in FIGS. 11c, 11e, 11g, and by Examples 27 and 28.

Turning now to FIG. 11b, R measures the size of an OASU in the direction perpendicular to its rigid bond to the polymer backbone. The OASU is drawn to scale in the plane of the paper according to its actual bond lengths and bond angles. R is measured by drawing lines flanking the OASU that are parallel to the covalent spacer bond and parallel to each other and determining the distance between the two outer lines using bond lengths and bond angles. That value is added to the van der waals radii of the left-most and right-most atoms of the OASU. This sum will be the value of R. This calculation is illustrated for the exemplary polymer polystyrene in FIG. 12d-f. FIG. 12d shows the covalent bond from a carbon atom of the polymer backbone to the attaching atom of the OASU. In the case of polystyrene, the attaching atom is also carbon. FIG. 12e shows the structure of benzene attached to the polymer backbone and its known bond lengths and bond angles. All carbon-carbon bond lengths of the benzene ring are 0.14 nm, all bond angles of the benzene ring are 120°, and all carbon-hydrogen bond lengths of the benzene ring are 0.11 nm. FIG. 12f shows the benzene ring with parallel vertical lines drawn at intervals such that calculating the distances of segments of the OASU is possible for each interval. One skilled in the art will know how to partition each structure so that calculating R is possible based on known bond lengths and bond angles. As shown in FIG. 12f, bonds 1, 2, 3 and 4 each have an angle of 30° with respect to the horizontal length of the benzene OASU, and thus each segment has a length calculated by bond length×cos 30°, and R is the sum of these segment lengths plus the van der waals radii of the hydrogen atoms, which are each 0.12 nm. Thus, R may be calculated by:

$$R=[2\times\cos 30°\times(d_{C\text{-}C}+d_{C\text{-}H})]+[2\times r_H]$$

$$R=2\times 0.866\times(1.4+1.1)+2\times 1.2$$

$$R=0.67 \text{ nm}$$

As one skilled in the art will recognize, this calculation may also be performed as:

$$R=(0.11 \text{ nm}\times\cos 30°)+(0.14 \text{ nm}\times\cos 30°)+(0.14 \text{ nm}\times\cos 30°)+(0.11 \text{ nm}\times\cos 30°)+2\times 0.12 \text{ nm}$$

$$R=0.67 \text{ nm}$$

Thus, for polystyrene shown in FIG. 11a, R is approximately 6.7 Å. Other examples of R calculations are depicted in FIGS. 11d, 11f, 11h, 11i, and by Examples 23 and 24. If the OASU contains a flexible tail, such as the R group depicted at the end of the OASU in FIG. 11i, the bond distance and bond angle of the flexible tail (R group) is not included in the calculation of R. Further, for Ar-BES that are styrene substituted with a BES at the 4-position (the position that is opposite the attaching point of the Ar-BES to the polymer backbone), the R calculation will be the same as for styrene because the BES at the 4-position does not contribute to the dimension (R) of the Ar-BES and is thus not included in the calculation of R. Thus, the van der waals radii of the oxygen atoms in FIG. 11i are the right-most and left-most distances to be included in the R calculation.

It will be understood by those skilled in the art that the equation for calculating R may differ for different OASUs because it is dependent on the bond lengths and angles of the OASU. Thus, OASUs with different atoms or different conformations may use different equations to calculate R, but the equation will be based on the principals described herein.

Lastly, B is calculated by dividing R by D. Thus, for polystyrene:

$$B=R/D$$

$$B=6.7 \text{ Å}\div 2.51 \text{ Å}$$

$$B=2.7$$

The solution casting film of polystyrene (PS) has a birefringence around 0.002 in the visible light wavelength (~0.001-0.002@633 nm).

The calculations for D and R described herein and as depicted in FIG. 11 may be applied to other polymers or copolymers and thus B may be calculated for other specific OASU-containing moieties.

Figure 13:
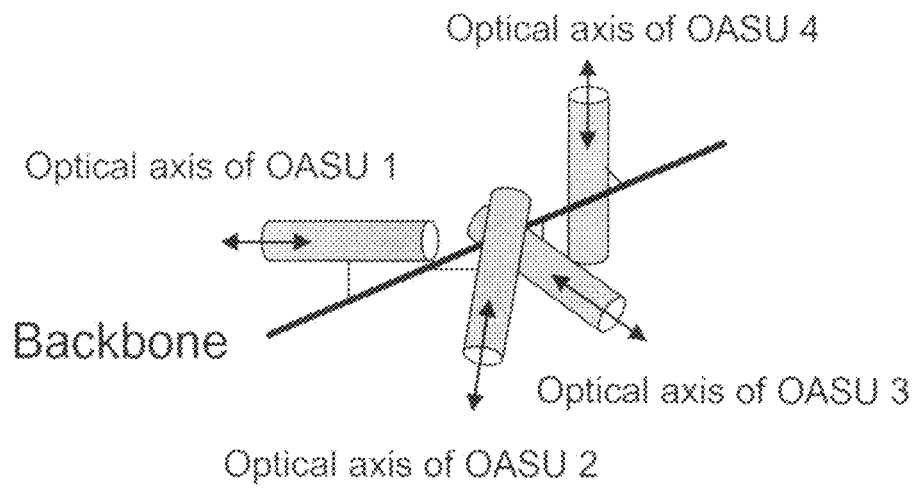
FIG. 13(a) is a side view depiction of a buttressed rod-like mesogen-jacketed polymer chain.
FIG. 13(b) is an end view depiction of a buttressed rod-like mesogen-jacketed polymer chain.
Figure 13:
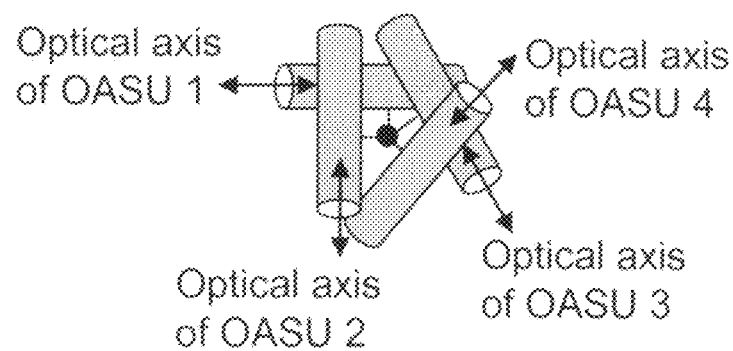

When the buttressing factor B is greater than about 2.5, the maximum dimension of an OASU is greater than its distance from another OASU in the direction perpendicular to the covalent bond that attaches the OASU to the polymer backbone. These optimal parameters cause the polymer backbone to twist into a corkscrew-like conformation such that the OASUs are oriented above and below the buttressed polymer chain, but not on the sides of the buttressed polymer chain, to accommodate the bulky OASUs in a sterically favorable conformation. The buttressed polymer chain is unable to unwind due to steric hindrance. The buttressing effect also causes the polymer backbone to have an overall linear shape (i.e., viewed from a distance) over a long distance. Thus, the buttressed polymer is rigidly fixed in the corkscrew-like conformation with OASUs extending above and below at angles that are approximately perpendicular to the overall linear direction of the buttressed polymer chain, as shown in FIG. 13. The higher the perpendicularity of the OASUs, the larger the negative segment birefringence ($\Delta n^s$) of the polymer segment. Thus, in a preferred embodiment of the invention, the buttressing factor for an OASU is greater than about 2.5. In one embodiment the OASU is Ar-BES and the buttressing factor may be at least about 2.6. In a more preferred embodiment, the buttressing factor for an OASU is at least about 2.7. In one embodiment, the OASU is a disk or a mesogen and the buttressing factor may be at least about 2.7.

Polymer chain rigidity can be enhanced by increasing the buttressing factor, i.e. by increasing the dimension and/or decreasing the distance between OASUs. Thus, the buttressing factor may be increased depending on the desired chain rigidity, which affects the overall birefringence of a compensation film (positive C-plate) containing the buttressed polymer. Accordingly, it may be desirable to increase the buttressing factor to any higher value of B, such as for example 3, 4, 5, 6, 7, 8, 9, 10, 11, 12 or any increments between. However, higher values of B may also be contemplated depending on the particular application of the compensation film (positive C-plate) and its desired birefringence.

When the buttressed polymer backbone is in-plane (parallel to the substrate) and the OASUs are perpendicular to the substrate and the polymer backbones, the perpendicularity of the OASUs (the light-directing elements of the compensation film), allows the film to have an index of refraction in the direction perpendicular to the film (i.e., along the optical axis of the OASUs) that is higher than the index of refraction in the direction parallel to the film (i.e., along the length of the buttressed polymer's backbone). Thus, the compensation film (positive C-plate) satisfies the relation $n_\perp \gg n_\parallel$. Since the difference between $n_\perp$ and $n_\parallel$ is great, the birefringence $\Delta n$ of the compensation film is high.

High birefringence $\Delta n$ achieved through selecting a polymer with the buttressing effect is also desirable because it allows the thickness of the compensation film to be thinner since film birefringence and thickness vary inversely. The retardation value of an optical compensation film is defined as $d \times \Delta n$, wherein d is the thickness of the film. Thus, a film with high birefringence can be thinner and still achieve the desired retardation value. The retardation value of the optical compensation film may preferably be 50 nm to 400 nm.

As described herein, the OASU may be disk-like or rod-like. Birefringence of the compensation film (positive C-plate) may be controlled by manipulating the birefringence of a uniaxial unit, represented as $\Delta n^{OASU}$, wherein $\Delta n^{OASU} = n_o^{OASU} - n_e^{OASU}$. $\Delta n^{OASU}$ is greater than zero for rod-like OASUs because their optical axis is in the rod direction of OASU so $n_o^{OASU} > n_e^{OASU}$. $\Delta n^{OASU}$ is less than zero for disk-like OASUs because their optical axis is perpendicular to the plane of the OASU disk so $n_o^{OASU} < n_e^{OASU}$.

The order parameter of the OASU with respect to the film normal direction (z direction) is defined as $O^{OASU} = (3 <\cos \theta> - 1)/2$, wherein $<\cos \theta>$ is the average value of all units' $\cos \theta$ value, and $\theta$ is the angle between the OASU's optical axis direction and the film's normal direction. According to the definition, $\theta$ is in the range from 0° to 90°, and $O^{OASU}$ is thus in the range from −0.5 to 1. Therefore, $O^{OASU}$ may be positive, negative, or zero.

A compensation film's birefringence can be expressed as a function of the birefringence and order parameter of a uniaxial unit: $\Delta n = \Delta n^{OASU} \times O^{OASU}$. Considering the sign of the two factors, there are 6 combinations as listed in FIG. 14.

Figure 14:
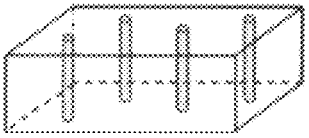
FIG. 14 is a table depicting $O^{OASU}$ and $\Delta n^{OASU}$ parameters for polymers with disk-like and rod-like OASUs.

The invention pertains to positive C plates. Thus, as shown in FIG. 14, the rod-like OASU requires a positive order parameter ($O^{OASU}>0$), whereas the disk-like OASU requires a negative order parameter ($O^{OASU}<0$) to satisfy $\Delta n=\Delta n^{OASU} \times O^{OASU}>0$.

During film formation and processing, the basic unit of the polymer may be defined as a rigid segment and the film's birefringence can be expressed as: $\Delta n=\Delta n^S \times O^S$, wherein $\Delta n^S$ is the birefringence of the segment, and $O^S$ is the order parameter of the segment with respect to the film's normal direction. The birefringence of the segment $\Delta n^S$ is defined as $\Delta n^S=n_o^S-n_e^S$, wherein $n_o^S$ is the refractive index along the segment direction (or the main chain direction at the segment position), and $n_e^S$ is the average refractive index perpendicular to the segment direction. The order parameter of the segment ($O^S$) with respect to the film's normal direction is defined as $O^S=(3<\cos\phi>-1)/2$, wherein $\phi$ is the angle between the segment direction and the film's normal direction, and $<\cos\phi>$ is the average value of all segments' $\cos\phi$ values. For a solution cast polymer film, $O^S$ is always negative or zero. Therefore, in the case of non-zero $O^S$, the sign of $\Delta n$ is determined by the sign of $\Delta n^S$. $O^S$ preferably has a large absolute value, which requires a sufficiently large segment size or a sufficiently long persistent length.

Within segments, the OASU unit will further have an order parameter with respect to the segment direction (units within segment), defined as $O^{U-S}=(3<\cos\psi>-1)/2$, where $\psi$ is the angle between the OASU optical axis direction and the segment direction, $<\cos\psi>$ is the average value of all the OASU's $\cos\psi$ values within a segment. Therefore, the segment's birefringence $\Delta n^S$ can be expressed as $\Delta n^S=\Delta n^{OASU} \times O^{U-S}$. The film's birefringence $\Delta n^S$ can thus be expressed as: $\Delta n=\Delta n^{OASU} \times O^{U-S} \times O^S$.

In another embodiment of the invention, birefringence may be controlled by selecting a polymer with OASUs that satisfy the equation:

$$\Delta n=\Delta n^{OASU} \times O^{U-S} \times O^S > 0$$

For a rod-like OASU, $\Delta n^{OASU}>0$ and $O^S<0$. Thus, positive C-plates require negative $O^{U-S}$. $O^{U-S}$ is negative when the rods are perpendicular to the segment direction. In a preferred embodiment, rod-like OASUs are selected such that the distance between the two attaching points of the neighboring OASUs is shorter than the length of the rod so that they exhibit the buttressing effect. If the rod-like OASUs are selected according to these parameters, then the rods can no longer rotate freely. Instead, some conformation with rod direction parallel to the main chain direction will be forbidden due to steric hindrance. Further, the main polymer chain will be substantially rigid and linear over a long distance. All the possible conformation of the rods will generate an average orientation preferably perpendicular to the main chain and thus result in a negative $O^{U-S}$. In this embodiment, OASU may be attached to the main chain from any position as long as buttressing effect is present.

For a disk-like OASU, $\Delta n^{OASU}<0$ and $O^S<0$. Thus, positive C-plates require positive $O^{U-S}$. If the main chain has sufficient rigidity and the spacer is allowed to freely rotate, $O^{U-S}$ will be positive (according to a strict mathematic model, $O^{U-S}=\frac{1}{6}$ for this model). Considering the disk will avoid some parallel orientations due to steric hindrance, the order parameter may be more positive. In a preferred embodiment, positive $O^{U-S}$ is achieved by selecting disk-like OASUs when the main polymer chain is rigid and such that the distance between the two neighboring attaching points of the OASUs is shorter than the length of the rod so that they exhibit the buttressing effect.

Selecting OASUs according to the buttressing effect parameters allows birefringence to be manipulated because it generates and enhances the non-zero segment parameter, $O^{U-S}$. The buttressing effect will make some of the OASU's conformations forbidden and thus leads to the preferred orientation of the OASU. Especially for laterally attached rod-like OASU, the buttressing effect is the basic reason for the negative OASU order parameter within a segment $O^{U-S}$. Qualitatively, the bigger buttressing factor will have a stronger buttressing effect and make $O^{U-S}$ more negative for rod-like model and more positive for disk-like model.

An advantage of the invention is that compensation films (positive C-plates) with high positive birefringence may be obtained by a simple solution casting process without any other post-processing such as stretching, photopolymerization, etc. Solution casting without post-processing may significantly reduce the cost of film fabrication and help eliminate errors caused by the complexity of post-processing. In certain other embodiments, post-casting processing, such as uniaxially or biaxially stretching or photopolymerization, may be used to further enhance the compensation film's high positive birefringence. The order parameter of a polymer segment, $O^S$, is mainly determined by the conditions of solution casting, such as temperature, evaporation rate, and concentration. Thus, the conditions of solution casting impact the birefringence of the optical compensation film according to the equation $\Delta n=\Delta n^{OASU} \times O^{U-S} \times O^S$ described above.

A variety of solvents may be used for solution casting the optical compensation films (positive C-plates) of the invention including, but not limited to, chloroform, dichloromethane, dichloroethane, benzene, chlorobenzene, xylene, N,N-dimethylformamide, N,N-dimethylacetamide, N-methyl-2-pyrrolidone, pyridine, dimethylsulfoxide, acetonitrile, cyclohexanone, methyl amyl ketone, ethyl acetate, ethylene glycol monobutyl ether, and the like. Preferred solvents include toluene, methyl isobutyl ketone (MIBK), methyl ethyl ketone (MEK), and cyclopentanone.

Optical films (positive C-plates) may be cast onto a substrate from polymer solutions by a method known in the art such as, for example, spin coating, spray coating, roll coating, curtain coating, or dip coating. Substrates are known in the art, and include TAC (triacetylcellulose), polyester, polyvinyl alcohol, cellulose ester, polycarbonate, polyacrylate, polyolefin, polyurethane, polystyrene, glass, and other materials commonly used in an LCD device.

The solution-cast compensation film (positive C-plate) may be removed from the substrate after drying to yield a free-standing film. The already high birefringence of the film may optionally be further enhanced by uniaxial or biaxial stretching. The free-standing film may also be laminated onto a substrate.

Figure 15:
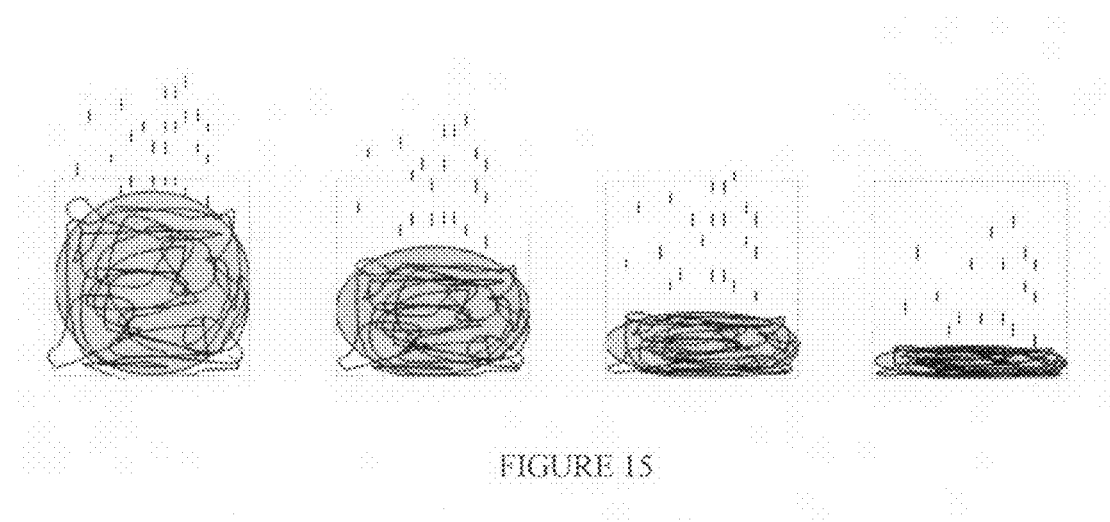
FIG. 15 is a depiction of the stages of solvent evaporation during solution casting.

Polymer chains have a random orientation in the homogeneous solution. The conformation of polymer chains in solution is generally a random coil, unless the polymer backbone is rigid while molecular weight is low, which may have a rod-like shape. As shown in FIG. 15, polymer chains in solution resemble loosely threaded-balls filled with solvent. After solution casting, the balls deflate during solvent evaporation and collapse into flatter "pancake" shapes. This process is continuous as long as solvent evaporation continues. As a result, the order parameter of the polymer segments, $O^s$, becomes more and more negative when the polymer collapses. Polymer chain segments become aligned parallel to the substrate surface. However, other factors such as competition between the evaporation rate of the solvent and the relaxation process of the polymer chains determine whether or not this aligned segment orientation is maintained.

When the solution for film casting is dilute, solvent evaporation generally follows a free relaxation model. During the free relaxation stage, the order parameter of the polymer segments is zero. During the free relaxation model, the system fluctuates between the collapsed ball shape and round ball shape. When the solution is dilute, the polymer's glass transition temperature is lower than the environment temperature so that polymer chains relax fast enough to compete with the collapse.

As solvent evaporates, the ball-shape becomes smaller and the solution on the substrate becomes increasingly concentrated. At a certain concentration, the glass transition temperature of the polymer chains is close to the environmental temperature, and polymer relaxations become too slow to follow the solvent's evaporation or the collapsing procedure. At this point, the polymer solution reaches the "frozen point" and the system follows the frozen model. At the frozen stage, the order parameter of the polymer segment is determined by the frozen point, $v_f$ according to the equation:

$$O^s = (v_f - 1)/(v_f + 2)$$

Thus, the final order parameter of the polymer segments after solution casting is determined by the frozen point, $v_f$. Because $v_f$'s value is between $v_0$ and 1 and thus in the range 0-1, according to equation $O^S = (v_f - 1)/(v_f + 2)$, $O^S$ is always negative. Thus, the statistical orientation of the polymer segments is always parallel to the surfaces of the substrates. However, the value of $O^S$ depends on the value of $v_f$, and $O^S$ is higher when $v_f$ is smaller. Thus, higher birefringence is achieved when $O^s$ is large and $v_f$ is small.

The value of $v_f$ may be determined by many factors including, but not limited to, evaporation rate of the solvent, environmental temperature, solubility of the polymer in the solvent and the chemical structure of the polymer, which affects relaxation. The evaporation rate is preferably slow enough to ensure that the ball shape collapses but fast enough to ensure that the relaxation rate is slower at more dilute concentrations. As is known in the art, evaporation rate may be adjusted by adjusting environmental temperature and pressure. The relaxation rate depends on the chemical structure of polymer and the film casting temperature. Polymers with rigid segments may freeze easily at the environmental temperature.

EXAMPLES

Example 1

Wavelength Dispersion Curves of Various Mesogen-Jacketed Polymer Films

Mesogen-Jacketed polymers identified as PC12, PC10, PC8, and PCt having the following repeating units, respectively, were prepared:

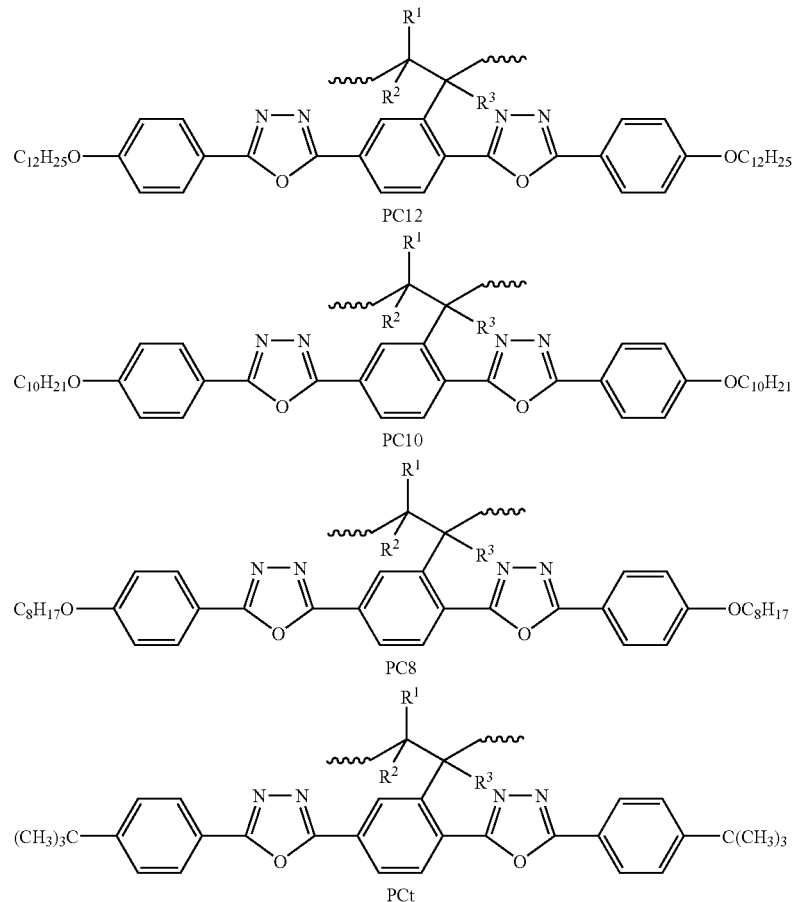

Figure 5:
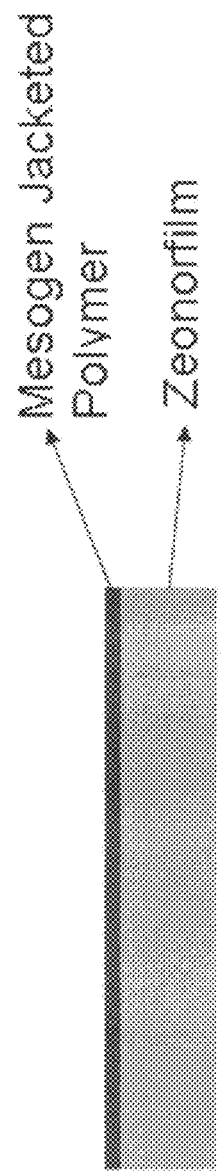
FIG. 5 is a side view diagram of a substrate coated with a mesogen-jacketed polymer positive C-plate.
Figure 6:
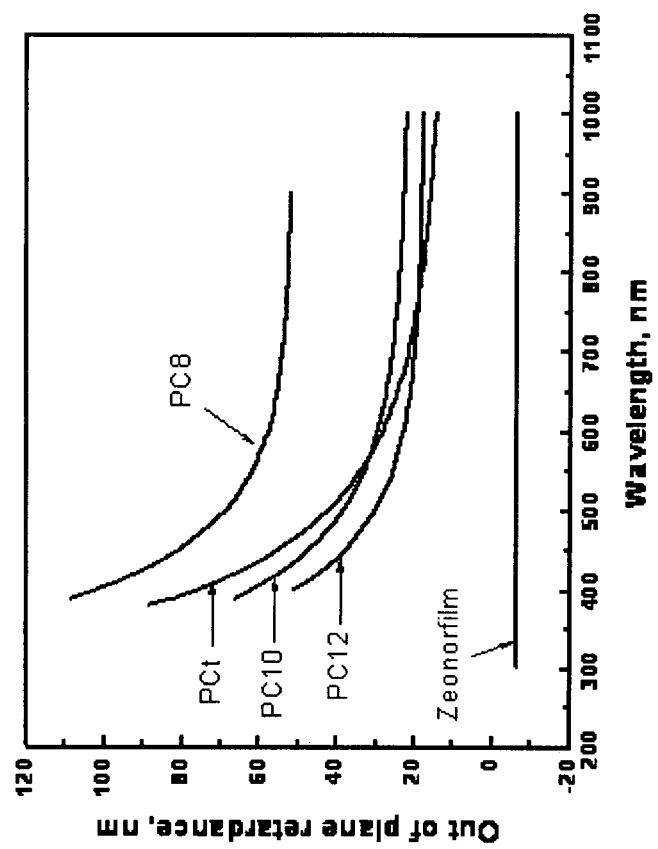
FIG. 6 is a graph of the wavelength dispersion curve for mesogen-jacketed polymer positive C-plates.

Optical compensation films (positive C-plates) were prepared by dissolving each polymer in toluene and solution casting onto a piece of Zeonorfilm® to form coatings, as shown in FIG. 5. The coatings were allowed to dry at room temperature to form thin films with thicknesses of about 3 µm. Zeonorfilm® is a 100 µm thick substrate made of Cyclo Olifen Polymers (COP) manufactured by Zeon Chemicals, L.P. Zeonorfilm® was chosen as the substrate because it has negligible retardation throughout the wavelength range 400 nm-800 nm. The phase retardance of light passing through each film/substrate sample was measured by VASE® Ellipsometer (available from J. A. Woollam Co., Inc.). The ellipsometer was calibrated by silica every time before using. FIG. 6 shows the wavelength dispersion curves for each sample.

The retardation ratios of each sample was calculated based on the wavelength dispersion curves shown in FIG. 6, where $R_{450}$, $R_{550}$, $R_{650}$ and $R_{750}$ are the out-of-plane retardance at wavelengths of 450 nm, 550 nm, 650 nm, and 750 nm, respectively. As shown in Table 1 below, each sample had steep slopes at shorter wavelengths. PCt had the steepest slope. Accordingly, such polymer films may be used as a positive C-plate in multilayer films having negative retardation and a reversed wavelength dispersion curve. Alternatively, such polymer films may be used as a positive C-plate in a multilayer film with a substantially flat wavelength dispersion curve, depending on the composition and dispersion curve of the negative C-plate.

TABLE 1

|  | PCt | PC8 | PC10 | PC12 |
|---|---|---|---|---|
| $R_{450}/R_{550}$ | 1.62 | 1.30 | 1.43 | 1.47 |
| $R_{550}/R_{650}$ | 1.38 | 1.11 | 1.21 | 1.21 |
| $R_{650}/R_{750}$ | 1.24 | 1.04 | 1.11 | 1.1 |

Example 2

UV Spectra of Various Mesogen-Jacketed Polymers

Figure 7:
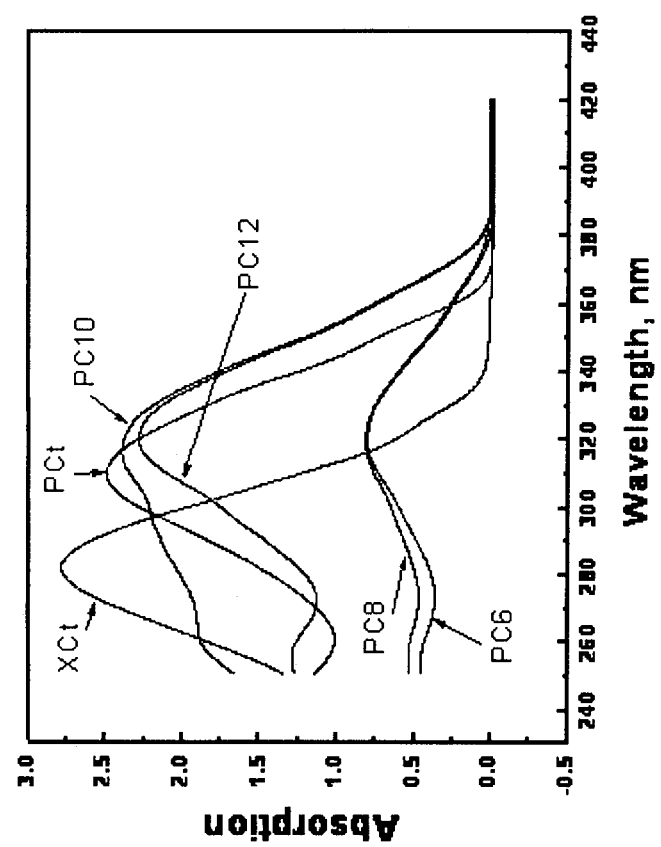
FIG. 7 is a graph of the ultraviolet spectra for several mesogen-jacketed polymers.

The following table is a collection of the absorption maximum ($\lambda$max) and the birefringence ($\Delta$n) measured at the wavelength of 633 nm for each polymer, as shown in FIG. 7.

TABLE 2

| Sample | $\lambda$max, nm | $\Delta$n(633) |
|---|---|---|
| PC6 | 319.8 | 0.0355 |
| PC8 | 319.1 | 0.0362 |
| PC10 | 315.7 | 0.0295 |
| PC12 | 319.8 | 0.0229 |
| PCt | 309.6 | 0.0184 |

As illustrated in Tables 1 and 2, polymers having steep slopes at shorter wavelengths generally have UV absorption maxima between 280 nm and 350 nm. Films prepared from such polymers exhibit exceptionally high positive birefringence, as shown in Table 2.

Example 3

Figure 8:
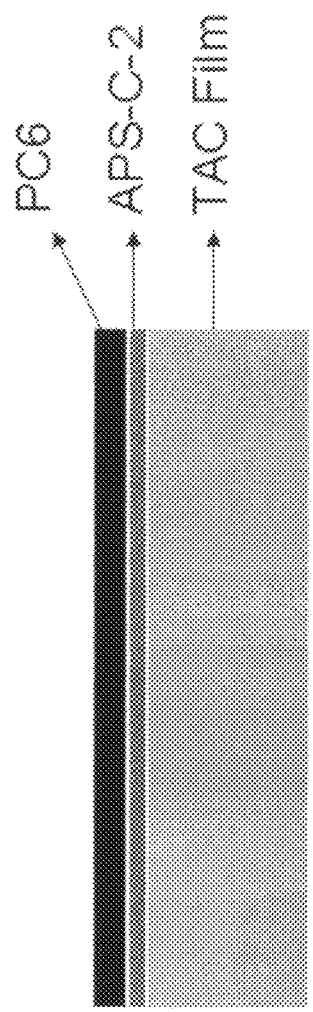
FIG. 8 is a side view diagram of a substrate coated with a mesogen-jacketed polymer positive C-plate and a negative polyimide C-plate.

Wavelength Dispersion Curves Obtained by Stacking Polyimide Film with Mesogen-Jacketed Polymer Film A multilayer film comprising a mesogen-jacketed polymer (PC6) film (positive C-plate) and a polyimide film APSC2 (negative C-plate) was prepared. The polyimide was dissolved in methyl isobutyl ketone (MIBK) and solution cast onto a TAC film having a thickness of 80 µm. The polyimide thickness was about 4 µm. The film was subsequently coated with a solution of mesogen-jacketed polymer, PC6, in toluene to form multilayer films with different thicknesses of the PC6 film. PC6-1 is approximately 1 µm thick; PC6-2 is approximately 2.5 µm thick; PC6-3 is approximately 3 µm thick; and PC6-4 is approximately 5 µm thick. FIG. 8 illustrates the multilayer film with PC6 as the positive C-plate. FIG. 9 shows that the out-of-plane retardation of the samples with increasing thickness of the PC6 film. The samples with the thickest positive C-plates (PC6) had an overall positive retardation. Thinner films, such as PC6-2 and PC6-2, substantially flattened the wavelength dispersion curve while maintaining overall negative retardation. Thus, a multilayer film with negative retardance and a reversed wavelength dispersion curve in the wavelength range of 400 nm to 800 nm may be achieved by controlling the relative thicknesses of layers in the multilayer compensation film.

Example 4

Wavelength Dispersion Curves of Various Poly(Nitrostyrene) Films

A series of poly(nitrostyrene) polymers were synthesized with various degrees of substitution (DS) of the nitro group as listed in Table 3 below.

TABLE 3

| Sample | DS (nitro) |
|---|---|
| NPS-1 | 0.090 |
| NPS-2 | 0.379 |
| MPS-3 | 0.725 |
| NPS-4 | 0.806 |
| NPS-5 | 0.829 |

Using the same method as described in Example 1, samples were prepared by solution casting the substituted poly(nitrostyrene) polymers in cyclopentanone onto the Zeonorfilm® substrate. Zeonorfilm® has high transparency (92% light transmittance), good turbidity (haze value<0.1%), low birefringence, a flat wavelength dispersion curve and good optical isotropy. The thickness of each poly(nitrostyrene) film was about 3 µm. Retardation values of the samples are shown in the wavelength dispersion curves in FIG. 10.

The retardation ratios of each sample (shown in Table 4) was calculated based on the wavelength dispersion curves shown in FIG. 10, where $R_{350}$, $R_{450}$, $R_{550}$, and $R_{650}$ are the out-of-plane retardance at wavelengths of 350 nm, 550 nm, and 650 nm, respectively.

TABLE 4

|  | NPS-1 | NPS-2 | NPS-3 | NPS-4 | NPS-5 |
|---|---|---|---|---|---|
| $R_{350}/R_{450}$ | 1.28 | 1.42 | 1.35 | 1.38 | 1.32 |
| $R_{450}/R_{550}$ | 1.13 | 1.12 | 1.13 | 1.13 | 1.12 |
| $R_{550}/R_{650}$ | 1.07 | 1.03 | 1.06 | 1.05 | 1.05 |

Example 5

Birefringence Measurement

Polymer samples were first dissolved in suitable solvents and were solution cast onto apiece of cleaned glass with the size of 1×1.5 inches. The thickness of the polymer film was controlled in the range of 15 to 20 µm by adjusting the content of solid in the solution. After the solvent evaporated, the polymer film was peeled off the glass to obtain a piece of free-standing film. Birefringence of the free-standing polymer films was measured by a prism coupler (Model 2010), from Metricon Corp. at 633 nm.

Example 6

Preparation of Poly(2-vinylnaphthalene) by Bulk Polymerization

2-Vinylnaphthalene (2.00 g) was charged to a Schlenk tube. The tube was stoppered, evacuated by pulling vacuum, and then filled with argon gas. The tube was evacuated and then refilled with argon four more times. While under a positive pressure of argon, the tube was immersed into an oil bath maintained at 70° C. for 24 hours. After cooling to room temperature, the solid plug of material was dissolved in tetrahydrofuran (THF). The solution was added in a dropwise manner into 500 mL of rapidly stirring methanol, causing the polymer to precipitate. The precipitated polymer was collected by filtration and dried by pulling air through the material on a filter pad. The polymer was then dissolved in fresh THF and reprecipitated by dropwise addition into rapidly stirring methanol. After collection by filtration and drying, the resulting polymer was found to have MW of 127,000 g/mol and a Tg of 139° C. A film cast from cyclopentanone (Cp) showed a positive birefringence of 0.0040 at 633 nm.

Example 7

Preparation of Poly(2-vinylnaphthalene) by Solution Polymerization

2-Vinylnaphthalene (2.01 g), azo-bis(isobuytronitrile) (AIBN, 1.5 mg) and benzene (0.98 g) were charged to a 50 mL round bottom flask containing a Teflon-coated magnetic stirbar. The reaction mixture was degassed by bubbling dry argon gas through the stirring reaction mixture for 15 minutes. The vessel contents were then kept under a positive pressure of argon and immersed into an oil bath maintained at 60° C. for 19 hours. The contents of the vessel were diluted with 25 mL of benzene after cooling the reaction mixture to room temperature. The resulting solution was slowly poured into 500 mL of rapidly stirring methanol, causing the resulting polymer to precipitate. The precipitated polymer was collected by filtration and dried by pulling air through the material on a filter pad. The polymer was then dissolved in tetrahydrofuran and reprecipitated by dropwise addition into rapidly stirring methanol. After collection by filtration and drying, the resulting polymer was found to have MW of 251,000 g/mol and a Tg of 148° C. A film cast from cyclopentanone showed a positive birefringence of 0.0073 at 633 nm.

Example 8

Preparation of Poly(2-vinylnaphthalene) by Emulsion Polymerization

2-Vinylnaphthalene (2.00 g), sodium dodecyl sulfate (0.40 g), and water (18.0 g) were charged to a 125 ml round bottom flask containing a Teflon-coated magnetic stirbar. The contents of the vessel were degassed by bubbling dry argon gas through the stirring reaction mixture for 30 minutes. The vessel contents were then kept under a positive pressure of argon and immersed into an oil bath maintained at 80° C. After 30 minutes at 80° C., the vessel was then charged with potassium persulfate solution (32 mg in 1 mL of water). After the initial charge of initiator solution, a fresh charge of potassium persulfate solution (32 mg in 1 mL water) was added to the reaction vessel every 2 hr. At the end of the 6 hr polymerization period, the reaction mixture was poured into 250 mL of rapidly stirring methanol. The addition of 200 mL of methylene chloride to the resulting suspension caused the polymer to precipitate. The precipitated polymer was collected by filtration and dried by pulling air through the material on a glass frit filter. The polymer was then redissolved in tetrahydrofuran and reprecipitated by dropwise addition into rapidly stirring methanol. After collection by filtration and drying, the resulting polymer was found to have MW of 550,000 g/mol and a Tg of 146° C. A film cast from cyclopentanone showed a positive birefringence of 0.0062 at 633 nm.

Example 9

Preparation of Poly(1-vinylpyrene) by Bulk Polymerization

1-Vinylpyrene (2.0 g) was charged to a Schlenk tube. The tube was stoppered, evacuated by pulling vacuum, and then filled with argon gas. The tube was evacuated and then refilled with argon four more times. While under a positive pressure of argon, the tube was immersed into an oil bath maintained at 100° C. for 24 hours. After cooling to room temperature, the solid plug of material was dissolved in tetrahydrofuran (THF). The solution was added in a dropwise manner into rapidly stirring ethanol, causing the polymer to precipitate. The precipitated polymer was collected by filtration and dried by pulling air through the material on a filter pad. The polymer was then dissolved in fresh THF and reprecipitated by dropwise addition into rapidly stirring ethanol. After collection by filtration and drying, the resulting polymer was found to have MW of 72,600 g/mol and a Tg of 254° C. A film cast from cyclopentanone showed a positive birefringence of 0.0051 at 633 nm.

Example 10

Preparation of Poly(N-vinyl phthalimide)

To a reaction tube were charged 1.0 g of N-vinylphthalimide and 1.3 g of a solution of benzoyl peroxide in chlorobenzene (1.0 mg/g). The reaction mixture was purged with argon, heated to 78° C., and allowed to react overnight. After cooled down to room temperature, the solution was poured to methanol. The resulting white precipitate was collected and dried to afford about 1 g of white powder. A film cast from γ-butyrolactone (GBL) showed Δn=0.0154 at 633 nm (only partially soluble in GBL). Another film cast from NMP showed Δn=0.0045 at 633 nm (brittle film).

Using the same method, two substituted poly(N-vinyl phthalimides), poly(N-vinyl-4,5-dichlorophthalimide) and poly(N-vinyl-4-trifluoromethylphthalimide), were also prepared. However, films could not be cast due to their poor solubility.

Example 11

Preparation of Poly(N-vinyl phthalimide-co-styrene)

According to the same method as in Example 6, copolymers were prepared by charging various mole ratios of styrene (S) with either N-vinyl phthalimide (VPI) or N-vinyl-4,5-dichlorophthalimide (VDCPI), Films were then cast from NMP and their birefringence measured as listed in the table below. It should be noted, however, the mole ratios of the resulting polymers could vary due to low yields (about 30%).

TABLE 5

| Copolymer | Styrene/VPI or VDCPI mole ratio used | Δn at 633 nm |
|---|---|---|
| P(S-co-VPI) | 1:1 | 0.0035 |
| P(S-co-VPI) | 1:3 | 0.0031 |
| P(S-co-VDCPI) | 1:3 | 0.0030 |
| P(S-co-VDCPI) | 7:1 | 0.0012 |

Example 12

Preparation of Poly(Nitrostyrene) by Nitration of Styrene

Polystyrene (5.0 g) was stirred and dissolved in a solvent mixture of nitrobenzene (90 g) and 1,2-dichloroethane (30 g) in a three-neck round-bottom flask equipped with a mechanical stirrer. To the stirred mixture was added a mixed acid (nitro/styrene equivalent ratio=2/1) consisting of nitric acid (8.6 g) and concentrated sulfuric acid (10.0 g) dropwise in a period of 30 nm. The mixture was allowed to react at room temperature under nitrogen for a total of 22 hours. The resulting yellow mixture was poured into diluted sodium hydroxide in water and organic layer separated, which was subsequently precipitated into methanol to give a solid mass. The solid was dissolved in N,N-dimethylformamide (DMF) and re-precipitated into methanol. The resulting heterogeneous mixture was stirred for two hours, filtered, washed repeatedly with methanol, and dried under vacuum to give a slightly yellowish fibrous powder. The yield was generally >95%.

Using the above method, various poly(nitrostyrenes) were prepared as listed below. Products 1-3 were prepared using a polystyrene with weight average molecular weight (MW) 280,000 and Tg 100° C. (Aldrich), while product 4 from one having MW 230,000 and Tg 94° C. (Aldrich).

Example 13

Figure 16:
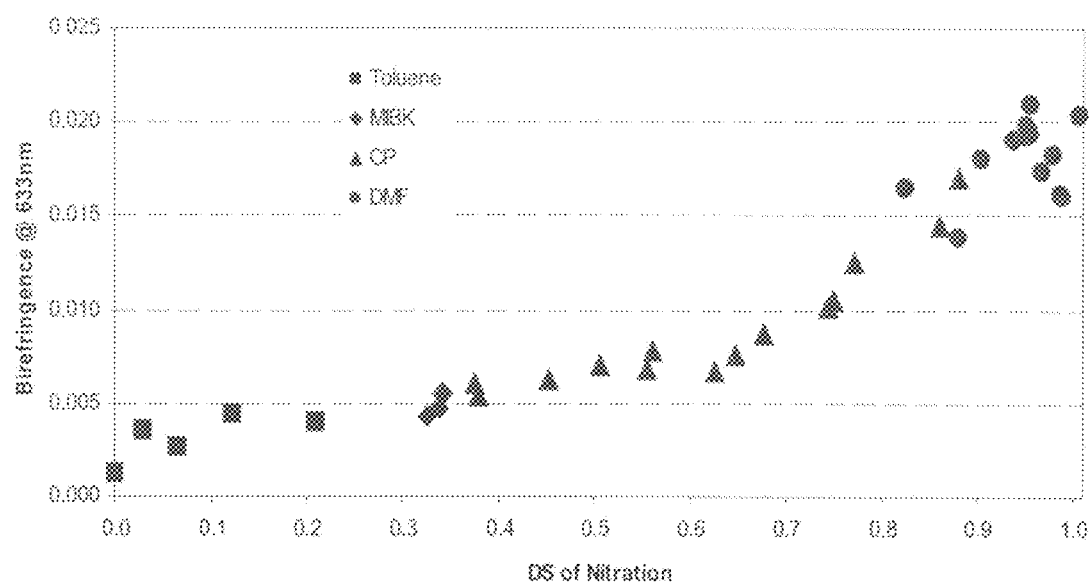
FIG. 16 is a plot showing how birefringence varies with the degree of substitution of Ar-BESs with nitro groups.

The Property Relationship of Poly(Nitrostyrenes) Having Various Degrees of Substitution Using the same method in Example 12, a series of poly (nitrostyrenes) having various degrees of substitution (DS) were prepared by adjusting the nitro/styrene equivalent ratio. Their solubility and birefringence were then determined; the results are plotted in FIG. 16. As illustrated in FIG. 16, the solubility of the poly(nitrostyrene) decreases with increased DS. Those with DS greater than about 0.9 were only soluble in DMF, with DS between about 0.4 and about 0.9 were soluble in Cp and DMF; with DS about 0.35 were soluble in methyl isobutyl ketone (MIBK), Cp, and DMF; and with DS lower than about 0.3 were soluble in toluene, MIBK, Cp, and DMF. FIG. 16 also shows that the birefringence of the poly (nitrostyrene) increases with increased degree of nitration.

Example 14

Preparation of Nitrostyrene Copolymer

A copolymer was prepared by nitration of poly(styrene-co-acrylonitrile) (75% styrene, MW 165K; Aldrich) using the same method as in Example 12 with an equivalent ratio of nitro/styrene, 3/1. The resulting polymer had Tg of 151° C., % N 5.84 (DS 0.62) (excluding CN group), and was soluble in cyclopentanone (Cp). A film was cast from Cp and showed a positive birefringence of 0.0089 at 633 nm.

Example 15

Preparation of Poly(Bromostyrene) by Bromomination of Styrene

Polystyrene (5.0 g) (Mw 280,000; Aldrich) was stirred and dissolved in 1,2-dichloroethane (100 g) in a three-neck round-bottom flask equipped with a mechanical stirrer. To the

TABLE 6

| | | Reaction | | Product | | |
|---|---|---|---|---|---|---|
| Poly(nitrostyrene) | Polystyrene | Nitro/Styrene | Reaction Time, hours | Solubility | % N (DS) | Tg, ° C. | Δn @ 633 nm |
| 1 | Mw 280K, Tg 100° C. | 3/1 | 22 | DMF | 9.63 (1.02) | 189 | +0.0138 |
| 2 | Mw 280K, Tg 100° C. | 2/1 | 22 | Cp, DMF | 8.22 (0.87) | 174 | +0.0161 |
| 3 | Mw 280K, Tg 100° C. | 2/1 | 6 | Cp, DMF | 7.37 (0.78) | 147 | +0.0110 |
| 4 | Mw 230K, Tg 94° C. | 2/1 | 22 | Cp, DMF | 8.69 (0.92) | 177 | +0.0157 |

Product 1 was soluble in DMF but not in Cp, while the others were soluble in Cp. Films of 2, 3, and 4 were cast respectively from their Cp solutions by spreading the solutions on glass slides and allowing to dry at room temperature in air to form thin films (about 15-20 μm). A film of product 1 was cast from DMF and dried under vacuum due to the hygroscopic character of DMF. % N of the polymer was determined by elemental analysis, from which the degree of substitution (DS) of the nitro group was calculated.

stirred mixture was added AlCl$_3$ (0.1 g) followed by the addition of bromine (15.4 g) (Br/styrene equivalent ratio, 2/1) in a period of one hour. The mixture was allowed to react at room temperature under nitrogen for a total of 7 hours. The resulting red mixture was precipitated into methanol, filtered, and washed repeatedly with methanol to give a slightly yellowish fibrous powder (7.2 g). The product was soluble in toluene or Cp and has a Tg of 134° C., 34% of Br (DS 0.78). A film was cast from toluene and measured to have Δn+0.0069@633 nm.

Example 16

Preparation of Bromostyrene Copolymer

A copolymer was prepared by bromination of poly(styrene-co-acrylonitrile) (75% styrene, MW 165K; Aldrich) using the same method as in Example 15 with an equivalent ratio of Br/styrene, 2/1. The resulting polymer had Tg of 141° C., 26% Br (DS 0.65), and was soluble in MIBK. A film cast from MIBK showed a positive birefringence of 0.0024 at 633 nm.

Example 17

Preparation of Poly(Bromo-Nitrostyrene) by Bromination of Poly(Nitrosytrene)

By using the same method as in Example 15, a poly(bromo-nitrostyrene) was prepared by bromination of a poly(nitrostyrene) having DS 0.47 prepared as in Example 11. In the reaction, poly(nitrostyrene) (3.0 g), $AlCl_3$ (0.1 g), and bromine (4.62 g) (Br/styrene 2/1) were used. The mixture was allowed to react for 5 hours to give a slightly yellowish powder (2.5 g); Tg 139° C.; soluble in MIBK or cyclopentanone; film cast from MIBK having $\Delta n+0.0054$@633 nm.

Example 18

Preparation of Poly(Nitro-Bromostyrene) by Nitration of Poly(Bromosytrene)

By using the same method as in Example 12, a poly(nitro-bromostyrene) was prepared by nitration of poly(bromostyrene) prepared in Example 15. In the reaction, poly(nitrostyrene) (2.50 g), $HNO_3$ (2.15 g), and $H_2SO_4$ (2.50 g) were used. The mixture was allowed to react for 5 hours to give a slightly yellowish powder (2.1 g); Tg 144° C.; % N 1.67; soluble in cyclopentanone.

Example 19

Nitration of Poly(2-vinylnaphthalene)

A nitro-substituted polymer was prepared by nitration of poly(2-vinylnaphthalene) (Mw 251 K; Tg 148° C.) using the same method as in Example 12 with an equivalent ratio of nitro/styrene, 2/1. The reaction was carried out by charging poly(2-vinylnaphthalene) (0.25 g), nitrobenzene (4.5 g), 1,2-dichloroethane (1.5 g), $HNO_3$ (0.29 g), and $H_2SO_4$ (0.34 g) to a 50 ml flask equipped with a magnetic stirrer. The mixture was allowed to react for 22 hours to give a powder (0.33 g). The resulting polymer had Tg of 199° C. and % N 2.17 (DS 0.31) and was soluble in cyclopentanone. A film cast from Cp showed a positive birefringence of 0.0088 at 633 nm.

Example 20

Nitration of Poly(4-vinyl biphenyl)

Similar to Example 19, a nitro-substituted polymer was prepared by nitration of poly(4-vinyl biphenyl) (Mw 396K; Tg 150° C.) by using poly(4-vinyl biphenyl) (0.25 g), nitrobenzene (4.5 g), 1,2-dichloroethane (1.5 g), $HNO_3$ (0.25 g), and $H_2SO_4$ (0.29 g). The resulting polymer had Tg of 192° C. and % N 2.30 (DS 0.37) and was soluble in cyclopentanone. A film cast from Cp showed a positive birefringence of 0.0097 at 633 nm.

Example 21

Bromination of Poly(styrene-co-4-vinyl biphenyl)

As in Example 15, a bromo-substituted polymer was prepared by bromination of poly(styrene-co-4-vinyl biphenyl) (Mw 229K) by using poly(styrene-co-4-vinyl biphenyl) (0.5 g), 1,2-dichloroethane (14 g), $AlCl_3$ (0.04 g), and bromine (1.54 g). The resulting polymer had Tg of 161° C., % Br of 35% (DS~1) and was soluble in toluene. A film cast from Cp showed a positive birefringence of 0.0028 at 633 nm.

Example 22

Alkylation and Nitration of Polystyrene

This example illustrates an MIBK-soluble poly(nitrostyrene) with high positive birefringence can be prepared by first reacting polystyrene with t-butylchloride and subsequently reacting with a mixed acid.

Alkylation: Polystyrene (5.20 g) (Mw 280,000; Aldrich) was stirred and dissolved in carbon disulfide (70 g) in a three-neck round-bottom flask equipped with a mechanical stirrer and a water condenser. To the stirred mixture was added $AlCl_3$ (0.01 g), followed by the addition of t-butyl chloride (2.31 g) (t-butyl/styrene equivalent ratio, 1/2). The mixture was allowed to reflux under nitrogen for 2 hours and then allowed to cool to room temperature. The resulting mixture was precipitated into methanol, filtered, washed repeatedly with methanol, and dried under vacuum to give a fibrous powder (6.32 g). The product was soluble in MIBK and has a Tg of 117° C. A film was cast from MIBK and measured to have $\Delta n=0.0027$@633 nm.

Nitration: The above product after alkylation (1.5 g) was stirred and dissolved in nitrobenzene (25 g). To the mixture was added a mixed acid of $HNO_3$ (2.6 g) and $H_2SO_4$ (2.6 g) dropwise in a period of 30 minutes. The mixture was allowed to react at room temperature for 24 hours. After the reaction, the yellow mixture was washed with dilute NaOH in water. The organic layer was separated and precipitated into methanol, filtered, and then dissolved in DMF. The resulting polymer solution was re-precipitated into methanol, filtered, washed repeatedly with methanol, and dried under vacuum to give a yellowish fibrous powder (1.77 g). The product was soluble in MIBK and has a Tg of 171° C. A film was cast from MIBK and measured to have $\Delta n$ 0.0086@633 nm.

Example: 23

Nitration of Poly(4-methylstyrene)

This example illustrates that the nitro group can be incorporated onto positions other than the para position of styrene and still enhance the birefringence of the polymer film.

Poly(4-methylstyrene) (5.0 g; available from Scientific Polymer Products, Inc.; MW 100K) was stirred and dissolved in (100 g) in a three-neck round-bottom flask equipped with a mechanical stirrer. To the stirred mixture was added a mixed acid (nitro/styrene equivalent ratio=2/1) consisting of nitric acid (8.6 g) and concentrated sulfuric acid (17.2 g) dropwise in a period of 30 min. The mixture was allowed to react at room temperature under nitrogen for a total of 20 hours. The resulting yellow mixture was poured into diluted sodium hydroxide in water and organic layer separated, which was subsequently precipitated into methanol to give a solid mass. The solid was dissolved in N,N-dimethylformamide (DMF) and re-precipitated into methanol. The resulting heterogeneous mixture was stirred for two hours, filtered, washed repeatedly with methanol, and dried under vacuum to give a slightly yellowish fibrous powder. The product (about 95% yield) was soluble in cyclopentanone but not in MIBK or toluene. A film cast from cyclopentanone showed a positive birefringence of 0.0060 at 633 nm. (The starting material, poly(4-methylstyrene), was determined to have $\Delta n=0.0017$ at 633 nm.)

Comparative Example 24

Substituted Polystyrenes Having Low Positive Birefringence Values

This example shows that, in contrast to the BES-substituted polystyrenes of the present invention, the following substituted polystyrenes have low positive birefringence values.

TABLE 7

| | Molecular Weight | Birefringence at 633 nm (solvent used for film casting) |
|---|---|---|
| Polystyrene | 280K | 0.0012 (Toluene); 0.0020 (Cp) |
| Poly(4-methylstyrene) | 100K | 0.0017 (Toluene) |
| Poly(4-methoxystyrene) | 400K | 0.0028 (Toluene); 0.0024 (Cp) |
| Poly(4-chlorostyrene) | N/A | 0.0020 (Toluene); 0.0022 (Cp) |

Example 25

Preparation of Poly(4-vinylbiphenyl) by Bulk Polymerization

4-Vinylbiphenyl (1.38 g) was charged to a Schlenk tube. The tube was stoppered, evacuated by pulling vacuum, and then filled with argon gas. The tube was evacuated and then refilled with argon four more times. While under a positive pressure of argon, the tube was immersed into an oil bath maintained at 130° C. for 1.5 hours. After cooling to room temperature, the solid plug of material was dissolved in tetrahydrofuran (THF). The solution was added in a dropwise manner into 500 mL of rapidly stirring methanol, causing the polymer to precipitate. The precipitated polymer was collected by filtration and dried by pulling air through the material on a filter pad. The polymer was then dissolved in fresh THF and reprecipitated by dropwise addition into rapidly stirring methanol. After collection by filtration and drying, the resulting polymer was found to have MW of 396,000 g/mol and a Tg of 150° C. A film cast from cyclopentanone showed a positive birefringence of 0.0071 at 633 nm.

Example 26

Preparation of Poly(4-cyanostyrene) by Solution Polymerization

4-Cyanostyrene (1.65 g), azo-bis-isobuytronitrile (AIBN, 11 mg) and N,N-dimethylacetamide (DMAc, 1.65 g) were charged to a 50 mL round bottom flask containing a Teflon-coated magnetic stirbar. The reaction mixture was degassed by bubbling dry argon gas through the stirring reaction mixture for 15 minutes. The vessel contents were then kept under a positive pressure of argon and immersed into an oil bath maintained at 60° C. for 2.5 hours. The contents of the vessel were diluted with 25 mL of DMAc after cooling the reaction mixture to room temperature. The resulting solution was slowly poured into 500 mL of rapidly stirring methanol, causing the resulting polymer to precipitate. The precipitated polymer was collected by filtration and dried by pulling air through the material on a filter pad. The polymer was then dissolved in fresh DMAc and reprecipitated by dropwise addition into rapidly stirring methanol. After collection by filtration and drying, the resulting polymer was found to have MW of 842,000 g/mol and a Tg of 184° C. A film cast from cyclopentanone showed a positive birefringence of 0.0103 at 633 nm.

Comparative Example 27

Vinyl Polymers Having High Tg and Low Positive Birefringence

Polymers 1-5 were synthesized by free-radical solution polymerization and their Tg and birefringence values determined as listed in the following table:

TABLE 8

| | Polymer | Structure | Tg (° C.) | $\Delta n$ at 633 nm |
|---|---|---|---|---|
| 1 | Poly(2-phenylaminocarbonylstyrene) | | 200 | 0.0032 |
| 2 | Poly(4-cyanophenyl methacrylate) | | 161 | 0.0009 |

TABLE 8-continued

| Polymer | Structure | Tg (° C.) | Δn at 633 nm |
|---|---|---|---|
| 3 Poly(methylcarboxyphenyl methacrylamide) | | 211 | 0.0011 |
| 4 Poly(isobornyl methacrylate) | | 191 | 0.0006 |
| 5 Poly(phenyl methacrylamide) | | 160 | 0.0020 |

As shown in Table 4, Tg and positive birefringence are not directly proportional.

Example 28

Synthesis of Various Mesogen-Jacketed Polymers

The following mesogen-jacketed polymers were made by charging the vinyl mesogen monomers, benzoyl peroxide (BPO, 0.1-0.3% mole of monomers) and toluene or chlorobenzene to a polymerization tube containing a Teflon-coated magnetic stirbar. The reaction mixture was degassed by bubbling argon through for 15 minutes. The tube was then sealed and immersed into an oil bath maintained at 80° C. for one day. After cooling the reaction mixture to room temperature, it was slowly poured into rapidly stirring methanol, causing the resulting polymer to precipitate. The precipitated polymer was collected by filtration and dried in a vacuum oven.

1. Poly[2,5-bis(p-alkoxyphenyl)styrene]

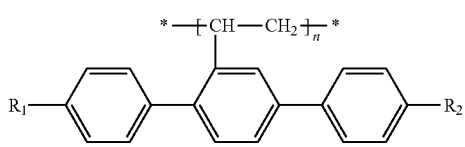

wherein $R_1$=—$OCH_2CH(CH_3)CH_2CH_3$, $R_2$=—$OCH_2CH_2OCH_3$ Δn=0.0082

2. Poly{2,5-bis[5-(4-substituedphenyl)-1,3,4-oxadiazole]styrene}

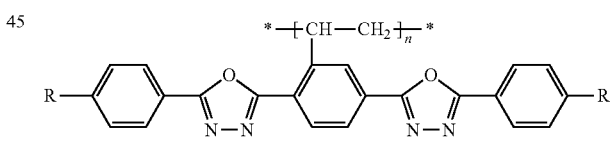

wherein R=—$OC(CH_3)_3$, —$OC_6H_{13}$, —$OC_8H_{17}$, —$OC_{10}H_{21}$, —$OC_{12}H_{25}$

| R | Mn (×10⁻⁴) | Tg (° C.) | Δn |
|---|---|---|---|
| —$OC(CH_3)_3$ | 16 | 201 | 0.0184 |
| —$OC_6H_{13}$ | 16 | — | 0.0355 |
| —$OC_8H_{17}$ | 23 | 141 | 0.0362 |
| —$OC_{10}H_{21}$ | 23 | — | 0.0295 |
| —$OC_{12}H_{25}$ | — | 150 | 0.0229 |

3. Poly{3,5-bis[5-(4-ter-butylphenyl)-1,3,4-oxadiazole]styrene}

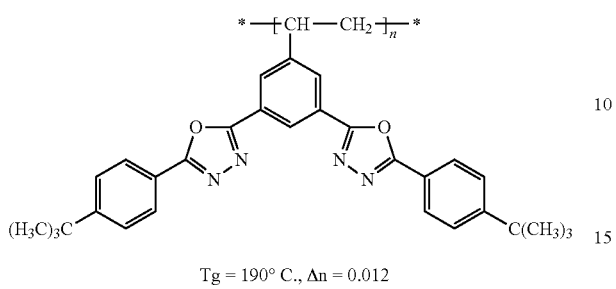

Tg = 190° C., Δn = 0.012

4. Poly{4-[5-(4-substitutedphenyl)-1,3,4-oxadiazole]styrene} and Poly{2-[5-(4-substitutedphenyl)-1,3,4-oxadiazole]styrene}

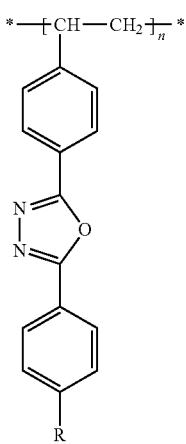

wherein R=phenyl, Δn=0.009

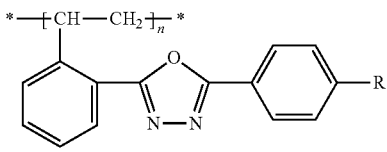

wherein R=—OC$_8$H$_{17}$, Tg=130° C., Δn=0.009; R=phenyl, Δn=0.009

5. Poly{2-(naphthalen-2-yl)-5-(prop-1-en-2-yl)-1,3,4-oxadiazole}

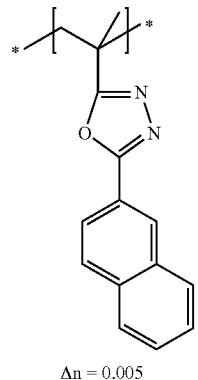

Δn = 0.005

6. Triazole based mesogen-jacketed polymers

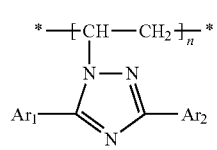

wherein
Ar$_1$=4-(dodecyloxy)phenyl, Ar2=t-butyl; Δn=0.0045
Ar$_1$=4-(octyloxy)phenyl, Ar2=4-(octyloxy)biphenyl; Δn=0.011
Ar$_1$=4-(dodecyloxy)phenyl, Ar$_2$=biphenyl; Δn=0.010
Ar$_1$=4-(dodecyloxy)biphenyl, Ar$_2$=biphenyl; Δn=0.024

The following mesogen-jacketed polymers are suitable for the practice of this invention as well.

7. Poly-2,5-bis[(4-substituedbenzoyl)oxy]styrene

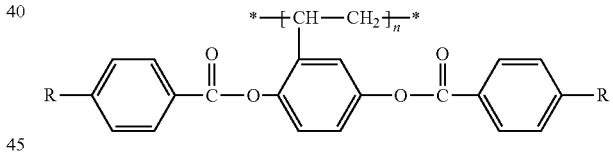

8. Poly-2,5-bis(4-substitutedbenzamido)styrene

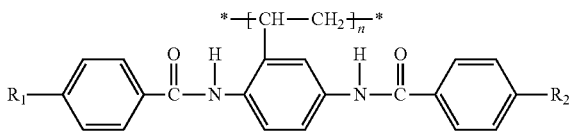

9. Poly-2,5-bis[(4-substitutedphenyloxy)carbonyl]styrene

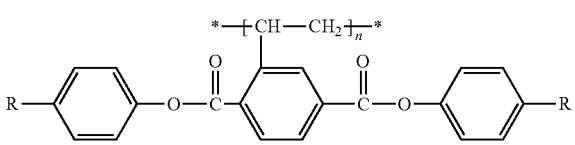

10. Poly{2,5-bis[(4-methoxyphenyloxy)carbonyl]styrene-b-styrene}

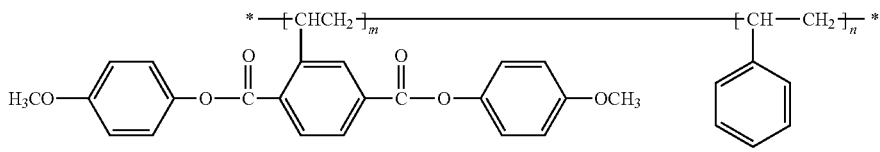

wherein m=2000, n=600, Tg: 100° C. and 120° C., Δn=0.010

Example 29

Poly(2-vinyl naphthalene)

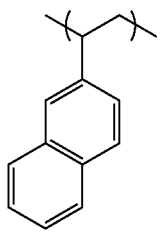

Figure 17:
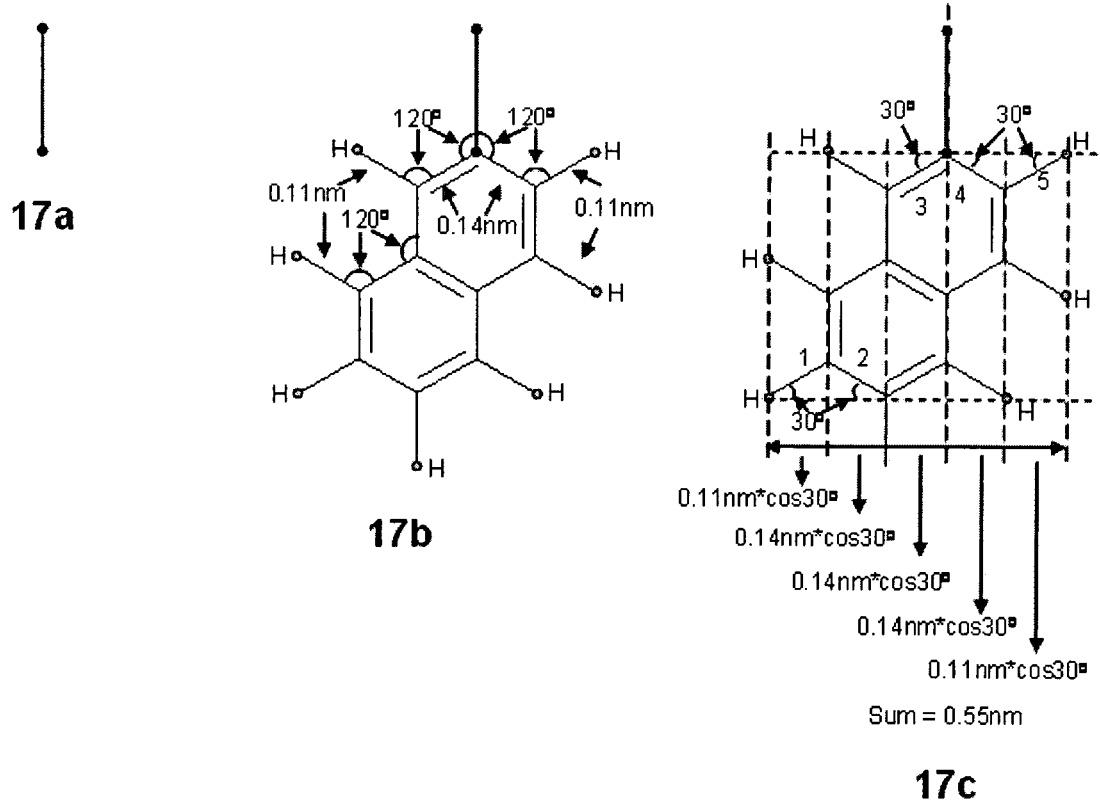
FIG. 17 is a depiction of the framework for calculating the buttressing factor for poly(2-vinyl naphthalene).

The buttressing factor B was calculated for a naphthalene ring OASU. Poly(2-vinyl naphthalene) has the same backbone structure as polystyrene (PS) and thus D is calculated the same as for polystyrene, yielding D=0.25 nm. The attaching atom of the OASU is the 2-position carbon atom on the naphthalene ring. All of the carbon-carbon bond lengths of the naphthalene ring are 0.14 nm, all bond angles of the naphthalene ring are 120°, and all carbon-hydrogen bond lengths of the naphthalene ring are 0.11 nm as shown in FIG. 17b. When parallel lines are drawn through the center of each atom of the OASU, as shown in FIG. 17c, of the bond angles of bonds 1, 2, 3, 4 and 5 with respect to the horizontal length of the OASU are all 30°. The left-most and right-most atoms are hydrogen atoms and have van der waals radii of 0.12 nm. Thus, R is calculated by:

$R$=(0.11 nm*cos 30°)+(0.14 nm*cos 30°)+(0.14 nm*cos 30°)+(0.14 nm*cos 30°+(0.1 nm*cos 30°)+0.12 nm+0.12 nm=0.79 nm.

The buttressing factor is calculated by B=R/D:

$B$=$R/D$=0.79 nm/0.25 nm=3.2.

This R/D value is bigger than PS and thus lead to a stronger buttressing effect and higher positive birefringence as compared to PS. Also, the naphthalene OASU has a bigger $\Delta n^{OASU}$ than PS, which enhanced the overall Δn. The solution cast poly(2-vinyl naphthalene) film showed a positive birefringence of 0.0073 at 633 nm.

Example 30

Polyvinylpyrene (PVPr)

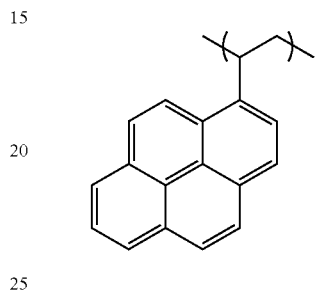

Figure 18:
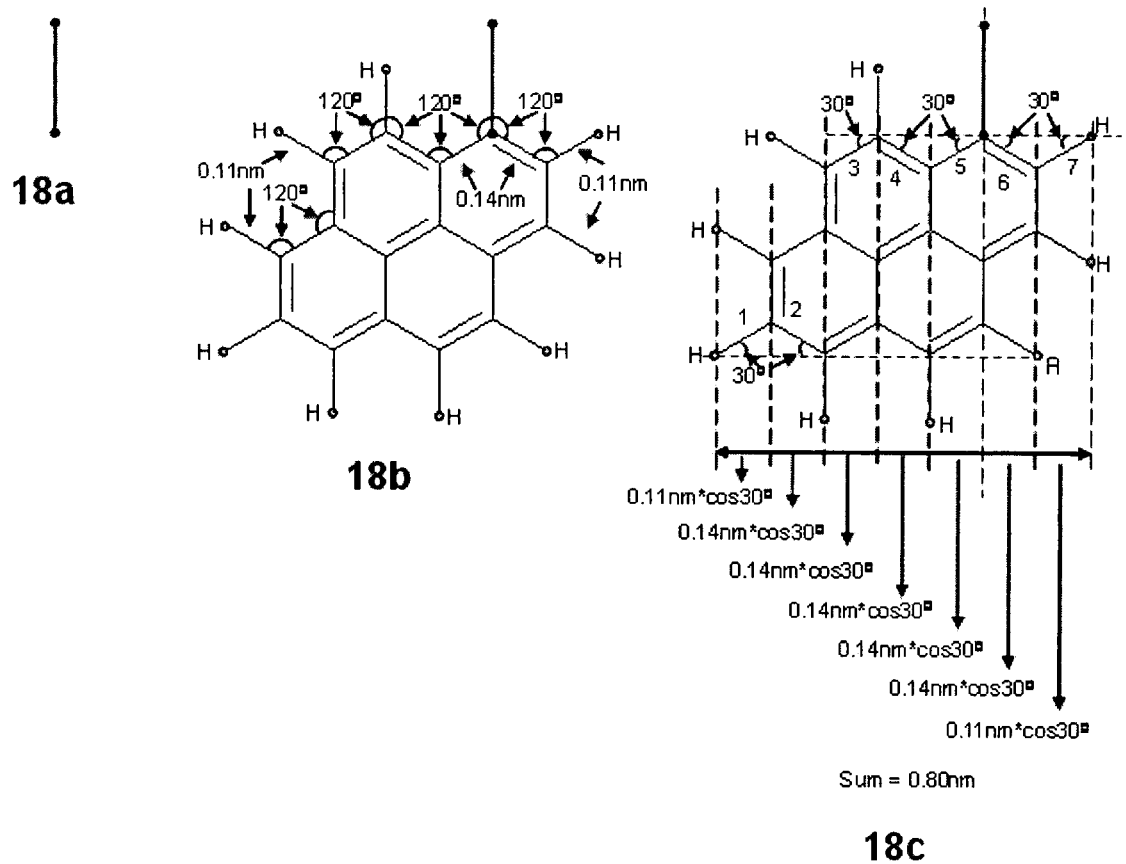
FIG. 18 is a depiction of the framework for calculating the buttressing factor for poly(vinylpyrene).

The buttressing factor B was calculated for a pyrene OASU. PVPr has the same backbone structure as polystyrene (PS) and thus D is calculated the same as for PS, yielding D=0.25 nm. The attaching atom of the OASU is a carbon atom on the pyrene ring. All of the carbon-carbon bond lengths of the pyrene ring are 0.14 nm, all bond angles of the pyrene ring are 120°, and all carbon-hydrogen bond lengths of the pyrene ring are 0.11 nm shown in FIG. 18b. When parallel lines are drawn through the center of each atom of the OASU, the bond angles of bonds 1, 2, 3, 4, 5, 6 and 7 with respect to the horizontal length of the OASU as shown in FIG. 18c are all 30°. The left-most and right-most atoms are hydrogen atoms and have van der waals radii of 0.12 nm. Thus, R is calculated by:

$R$=(0.11 nm×cos 30°)+(0.14 nm×cos 30°)+(0.14 nm×cos 30°)+(0.14 nm×cos 30°)+(0.14 nm×cos 30°)+(0.14 nm×cos 30°)+(0.11 nm×cos 30°)+ 0.12 nm+0.12 nm=1.04 nm The buttressing factor is calculated by B=R/D:

$B$=$R/D$=1.04/0.25=4.1

This R/D value is bigger than PS and thus lead to stronger buttressing effect and higher positive birefringence as compared to PS. Also, the pyrene OASU has a bigger $\Delta n^{OASU}$ than PS, which enhanced the final Δn. The solution cast PVPr film showed a positive birefringence of 0.0051 at 633 nm.

Example 31

Substituted Polystyrene

A BES at the 4-position of benzene ring enhanced the birefringence of polystyrene without changing its buttressing effect. Polystyrene was substituted at the 4-position with the following BES: Cl, Br, I, CN, NO$_2$, and phenyl. Each BES-substituted polystyrene had the same buttressing factor (R/D value) as unsubstituted polystyrene but exhibited enhanced birefringence. Using the highly polarizable and polar NO$_2$ group enhanced the birefringence of BES-substituted polystyrene to as high as 0.0209.

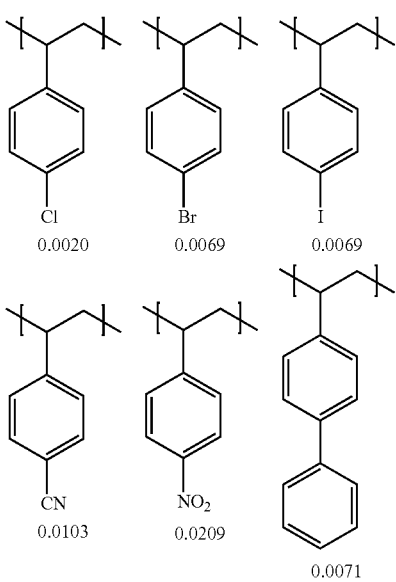

Example 32

Mesogen-Jacketed Polymer

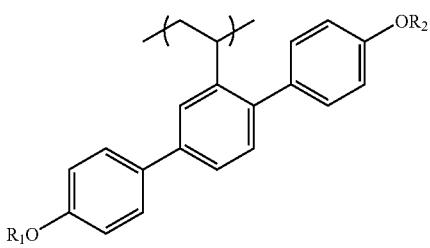

Figure 19:
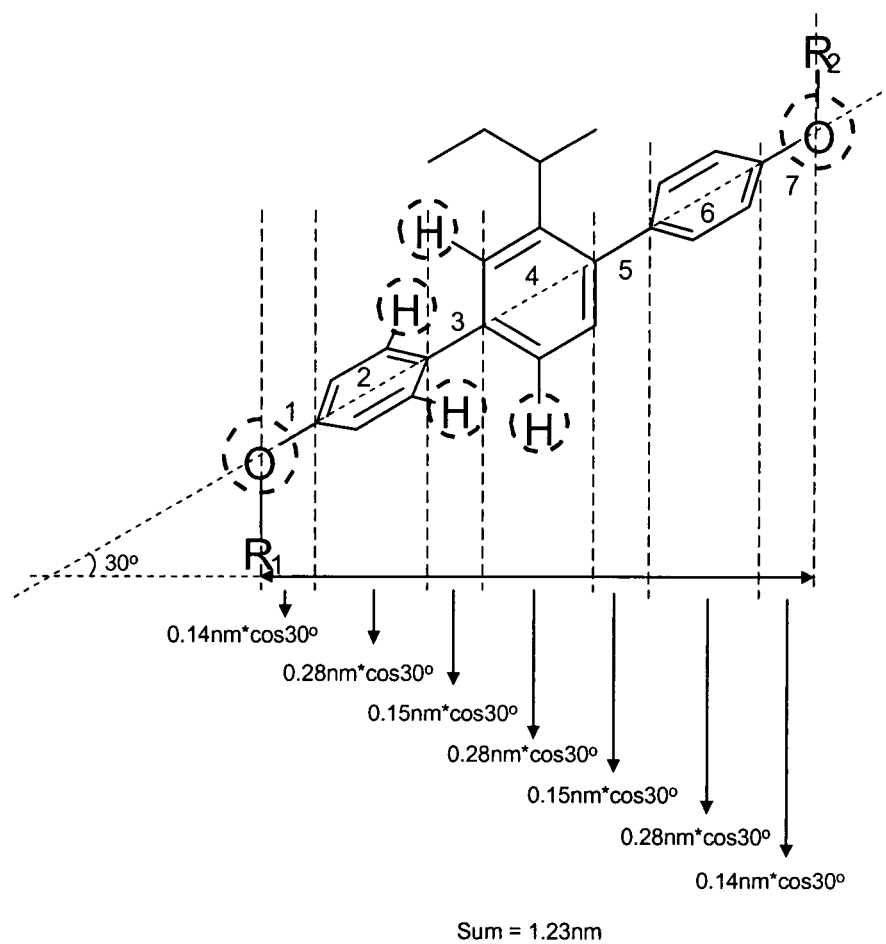
FIG. 19 is a depiction of the framework for calculating the buttressing factor for poly[2,5-bis(p-alkoxyphenyl)styrene].

The buttressing factor was calculated for the mesogen OASU depicted above. The mesogen OASU has the same backbone structure as polystyrene (PS) and thus D is calculated the same as for PS, yielding 0.25 nm. The attaching atom of the OASU is a carbon atom on the middle benzene ring of the mesogen OASU. All of the carbon-carbon bond lengths of the benzene rings are 0.14 nm, all bond angles of the benzene rings are 120°, the carbon-carbon bond between two benzene rings is 0.15 nm, and all carbon-oxygen bond lengths of the mesogen are 0.14 nm shown in FIG. 19. The length between carbon 1 and carbon 4 of the benzene rings (depicted as lines 2, 4 and 6 in FIG. 19) is 0.28 nm. Although the three benzene rings don't lie in the same plane because the OASU may twist on its axis, the benzene rings maintain a linear alignment. When the two oxygen atoms are connected by a straight line as shown in FIG. 19, the 1-, 4-carbon atoms of all three benzene rings lie on that line. When parallel lines are drawn through the center of each atom of the OASU, the bond angles of bonds 1, 3, 5 and 7 and lines 2, 4 and 6 with respect to the horizontal length of the OASU as shown in FIG. 19 are all 30°. The left-most and right-most atoms are oxygen atoms and have van der waals radii of 0.15 nm. The $R_1$ and $R_2$ alkyl groups are not included in the calculation of R because their bonds are flexible. Thus, R is calculated by:

$R$=(0.14 nm×cos 30°)+(0.28 nm×cos 30°)+(0.15 nm×cos 30°)+(0.28 nm×cos 30°)+(0.15 nm×cos 30°)+(0.28 nm×cos 30°)+(0.14 nm×cos 30°)+ 0.15 nm+0.15 nm=1.53 nm The buttressing factor is calculated by B=R/D:

$B=R/D=1.53/0.25=6.1$

This R/D value is bigger than PS and thus lead to stronger buttressing effect and higher positive birefringence as compared to PS. Also, this mesogen OASU has a bigger $\Delta n^{OASU}$ than PS, which enhanced the final $\Delta n$. The solution cast this mesogen jacket polymer film (with $R_1$ as —OCH$_2$CH$_2$OCH$_3$, and $R_2$ as —CH$_2$CH(CH$_3$)CH$_2$CH$_3$) showed a positive birefringence of 0.0082 at 633 nm.

Example 33

Preparation of Poly(N-vinyl-4-tert-butylphthalimide) by Solution Polymerization

N-Vinyl-4-tert-butylphthalimide (2.0 g), chlorobenzene (6.0 g), and benzoyl peroxide (2.1 mg) were charged to a Schlenk tube containing a Teflon-coated magnetic stirbar. The tube was stoppered and degassed through the sidearm by three freeze-pump-thaw cycles. While under a positive pressure of argon, the reaction tube was immersed into an oil bath maintained at 85° C. for 3 hours with constant stirring. After cooling to room temperature, the resulting viscous solution was diluted with 10 mL of tetrahydrofuran (THF) and added in a dropwise manner into 500 mL of rapidly stirring methanol, causing the polymer to precipitate. The precipitated polymer was collected by filtration and dried by pulling air through the material on a filter pad. The polymer was reprecipitated twice more from fresh THF solution by dropwise addition into methanol. After collection by filtration and drying, the resulting polymer was found to be soluble in MIBK and toluene and had a Tg of 215° C. and a weight average molecular weight (Mw): 643,000. A film cast from toluene showed positive birefringence of 0.0094 at 633 nm.

Example 34

UV Spectra of Various Mesogen-Jacketed Polymers

The following table is a collection of the absorption maximum ($\lambda$max) and the birefringence ($\Delta$n) measured at the wavelength of 633 nm for each polymer. The first five polymers (PC6, PC8, PC10, PC12, PCt) are poly{2,5-bis[(4-alkyloxyphenyl)-1,3,4-oxadiazole]styrene} with the following chemical structure:

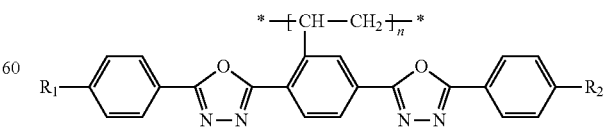

wherein $R_1$ and $R_2$ are defined in Table 5 below.

Sample XCt is poly{3,5-bis[(4-ter-butylphenyl)-1,3,4-oxadiazole]styrene} with the following chemical structure:

TABLE 9

[Structure: polymer with CH-CH2 repeat unit, phenyl ring bearing two 1,3,4-oxadiazole groups, each linked to a 4-tert-butylphenyl group]

| Sample | R₁ = R₂ | λmax, nm | Δn(633) |
| --- | --- | --- | --- |
| PC6 | —OC$_6$H$_{13}$ | 319.8 | 0.0355 |
| PC8 | —OC$_8$H$_{17}$ | 319.1 | 0.0362 |
| PC10 | —OC$_{10}$H$_{21}$ | 315.7 | 0.0295 |
| PC12 | —OC$_{12}$H$_{25}$ | 319.8 | 0.0229 |
| PCt | —C(CH$_3$)$_3$ | 309.6 | 0.0184 |
| XCt | N/A | 281.6 | 0.0117 |

UV-Visible Spectrophotomer (UV-2450) from Shimadzu (Japan) was used to obtain UV spectrum of the above polymers, shown in Figure X. $\lambda_{max}$ is the wavelength of the absorption maximum. $\Delta n_{(633)}$ was measured with Prism Coupler (Model 2010) from Mitricon Corp.

The present invention is not to be limited in scope by the specific embodiments described herein which are intended as single illustrations of individual aspects of the invention, and functionally equivalent methods and components are within the scope of the invention. Indeed, various modifications of the invention, in addition to those shown and described herein will become apparent to those skilled in the art from the foregoing description and accompanying drawings. Such modifications are intended to fall within the scope of the claims. Various publications are cited herein, the contents of which are hereby incorporated, by reference, in their entireties.

What is claimed is:

1. An optical retardation compensation film having a proper wavelength dispersion curve wherein $R_{450}/R_{550}$ is 1.20 to 2.00, $R_{550}/R_{650}$ is 1.10 to 1.60, and $R_{650}/R_{750}$ is 1.00 to 1.40, wherein $R_{450}$, $R_{550}$, $R_{650}$ and $R_{750}$ are the retardation values in the thickness direction of the optical compensation film at the wavelengths 450 nm, 550 nm, 650 nm, and 750 nm, respectively; wherein the optical film has a positive birefringence value throughout the wavelength range of 400 nm<λ<800 nm, wherein the film is cast from a solution comprising a polymer composition having a polymer segment with a polymer backbone, a light stable optically anisotropic sub-unit (OASU) attached directly to the polymer backbone via at least one covalent bond, wherein the OASU is capable of orienting perpendicular to the polymer backbone, and the higher the perpendicularity of the OASU, the larger the value of the positive birefringence of the polymer film.

2. The optical retardation compensation film of claim 1, wherein $R_{450}/R_{550}$ is 1.30 to 1.90, $R_{550}/R_{650}$ is 1.13 to 1.50 and $R_{650}/R_{750}$ is 1.02 to 1.35.

3. The optical retardation compensation film of claim 1, wherein $R_{450}/R_{550}$ is 1.35 to 1.80, $R_{550}/R_{650}$ is 1.15 to 1.45 and $R_{650}/R_{750}$ is 1.04 to 1.30.

4. The optical retardation compensation film of claim 1, which has a positive birefringence value of greater than 0.002 throughout the wavelength range of 400 nm<λ<800 nm.

5. The optical retardation compensation film of claim 1, which has a positive birefringence value of greater than 0.005 throughout the wavelength range of 400 nm<λ<800 nm.

6. The optical retardation compensation film of claim 1, which has a positive birefringence value of greater than 0.01 throughout the wavelength range of 400 nm<λ<800 nm.

7. The optical retardation compensation film of claim 1, which has a positive birefringence value of greater than 0.015 throughout the wavelength range of 400 nm<λ<800 nm.

8. The optical retardation compensation film of claim 1, which has a positive birefringence value of greater than 0.02 throughout the wavelength range of 400 nm<λ<800 nm.

9. The optical retardation compensation film of claim 1, which has a positive birefringence value of greater than 0.025 throughout the wavelength range of 400 nm<λ<800 nm.

10. The optical retardation compensation film of claim 1, which has a positive birefringence value of greater than 0.03 throughout the wavelength range of 400 nm<λ<800 nm.

11. The optical retardation compensation film of claim 1 wherein the film has a UV absorption maximum between the wavelength range of 260 nm and 380 nm.

12. The optical retardation compensation film of claim 1 wherein the film has a UV absorption maximum between the wavelength range of 280 nm and 360 nm.

13. The optical retardation compensation film of claim 1 wherein the film has a UV absorption maximum between the wavelength range of 300 nm and 350 nm.

14. The optical retardation compensation film of claim 1, wherein the polymer composition is a mesogen-jacketed polymer composition comprising at least one or more moieties selected from the group consisting of:

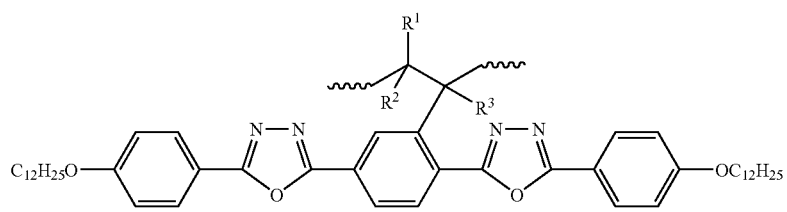

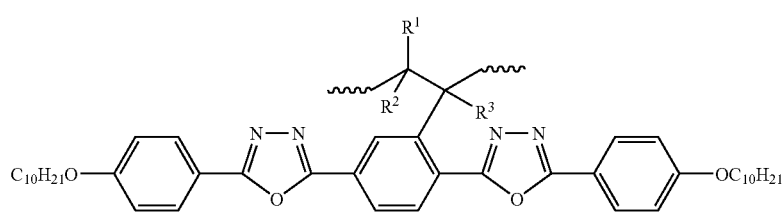

-continued

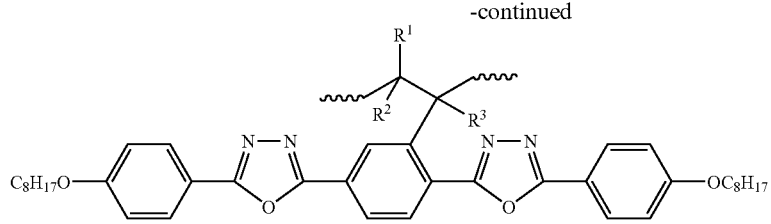

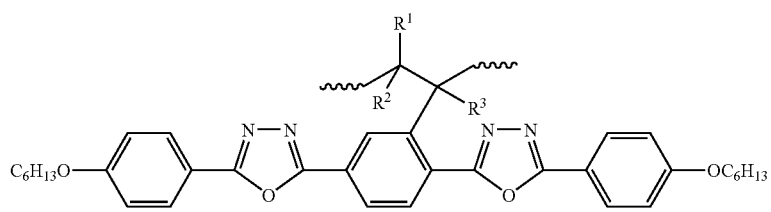

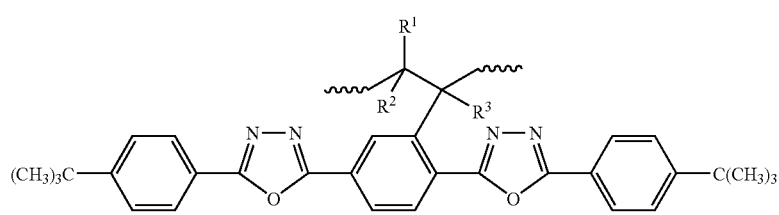

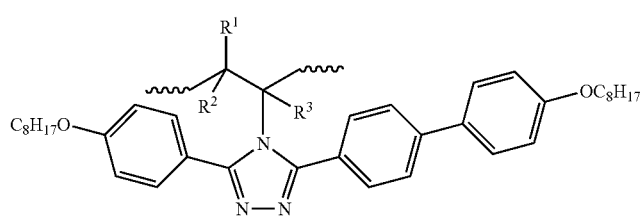

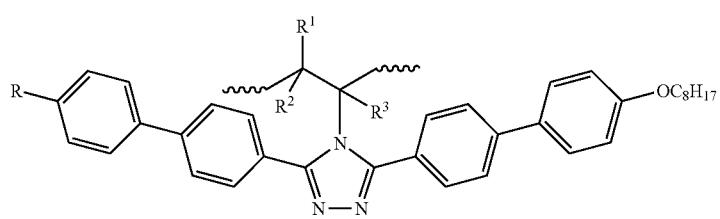

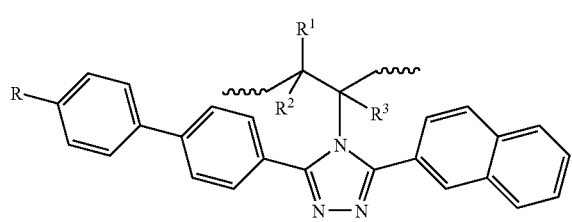
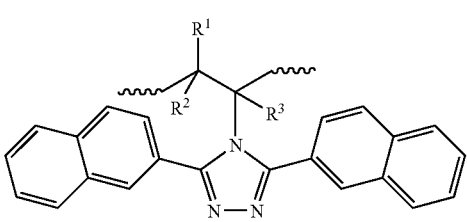

wherein $R^1$, $R^2$, and $R^3$ are hydrogen atoms, alkyl groups, substituted alkyl groups, or halogens.

15. An optical retardation compensation film having a proper wavelength dispersion curve wherein $R_{450}/R_{550}$ is 1.20 to 2.00, $R_{550}/R_{650}$ is 1.10 to 1.60, and $R_{650}/R_{750}$ is 1.00 to 1.40, wherein $R_{450}$, $R_{550}$, $R_{650}$ and $R_{750}$ are the retardation values in the thickness direction of the optical compensation film at the wavelengths 450 nm, 550 nm, 650 nm, and 750 nm, respectively; wherein the optical film has a positive birefringence value throughout the wavelength range of 400 nm<λ<800 nm, wherein the compensation film comprises at least one or more moieties selected from the group consisting of:

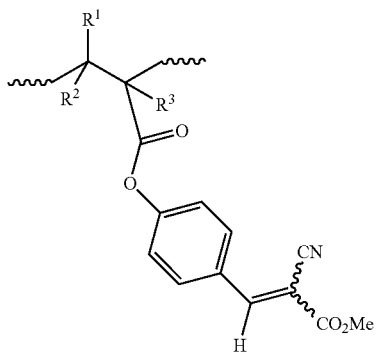

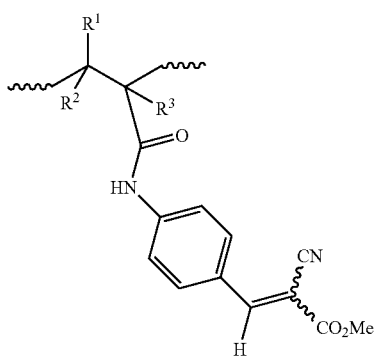

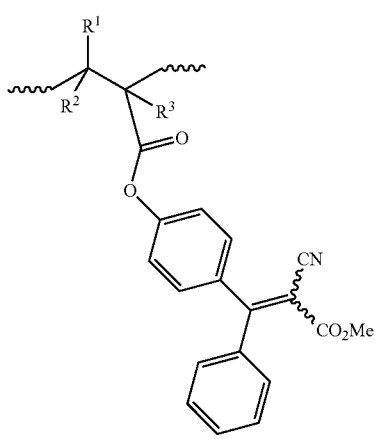

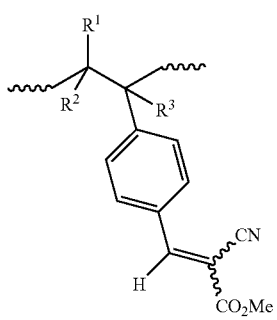

-continued

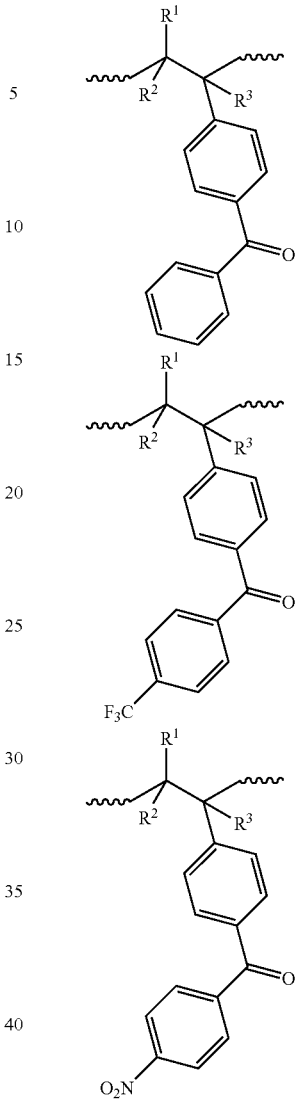

wherein $R^1$, $R^2$, and $R^3$ are hydrogen atoms, alkyl groups, substituted alkyl groups, or halogens.

16. A liquid crystal display device comprising the optical retardation compensation film of claim 1.

17. The liquid crystal display device of claim 16 used as a screen for a television or computer.

18. A multilayer optical retardation compensation film for use in a vertically aligned liquid crystal display device (VA-LCD) comprising:
(a) at least one first layer of the optical retardation compensation film of claim 1; and
(b) at least one second layer of optically anisotropic film having negative out-of-plane birefringence that satisfies the relation $n_z<(n_x+n_y)/2$,
wherein $n_x$ and $n_y$ represent in-plane refractive indices, and nz represents the thickness-direction refractive index of the film,
and wherein the wavelength dispersion curve of the multi-player optical film has a negative retardation and a reversed wavelength dispersion curve throughout the wavelength range of 400 nm<λ<800 nm.

19. The multilayer optical retardation compensation film of claim 18, wherein the first and second layers are contiguous.

20. The multilayer optical retardation compensation film of claim 18, further comprising an intermediate layer between the first and second layers.

21. A VA-LCD comprising the multilayer optical retardation compensation film of claim 18.

22. The VA-LCD of claim 21 wherein the wavelength dispersion curve of the multilayer optical retardation compensation film in combination with the lighted state VA-LCD's LC cell has a retardance ratio, $R_\lambda/R_{550}$, between 0.90 and 1.15 at each wavelength $\lambda$ throughout the wavelength range of 400 nm<$\lambda$<800 nm, wherein $R_\lambda$ and $R_{550}$ are the retardances in the thickness direction of the LCD at the wavelengths $\lambda$ and 550 nm, respectively.

23. The VA-LCD of claim 22 wherein the wavelength dispersion curve of the multilayer optical retardation compensation film in combination with the lighted state VA-LCD's LC cell has a retardance ratio of between 0.93 and 1.10 at each wavelength throughout the wavelength range of 400 nm<$\lambda$<800 nm.

24. The VA-LCD of claim 22 wherein the wavelength dispersion curve of the multilayer optical retardation compensation film in combination with the lighted state VA-LCD's LC cell has a retardance ratio of between 0.95 and 1.05 at each wavelength throughout the wavelength range of 400 nm<$\lambda$<800 nm.

25. The VA-LCD of claim 21 wherein the wavelength dispersion curve of the multilayer optical retardation compensation film in combination with the lighted state VA-LCD's LC cell has zero retardance throughout the wavelength range of 400 nm<$\lambda$<800 nm.

26. The liquid crystal display device of claim 21 used as a screen for a television or computer.

* * * * *